United States Patent
Togawa

[19]

[11] Patent Number: 5,819,279
[45] Date of Patent: *Oct. 6, 1998

[54] OBJECT DATA PROCESSING APPARATUS

[75] Inventor: Yoshifusa Togawa, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 590,740

[22] Filed: Jan. 24, 1996

[30] Foreign Application Priority Data

Apr. 27, 1995 [JP] Japan ........................ 7-103441

[51] Int. Cl.$^6$ ........................................ G06F 17/30
[52] U.S. Cl. .................. 707/103; 707/100; 707/101; 707/102; 395/680
[58] Field of Search ...................... 395/800, 650, 395/700, 200, 701, 614, 680; 364/200; 707/103, 100, 101, 102

[56] References Cited

U.S. PATENT DOCUMENTS

| | | | |
|---|---|---|---|
| 4,315,310 | 2/1982 | Bayliss et al. | 364/200 |
| 5,396,630 | 3/1995 | Banda et al. | 395/700 |
| 5,475,817 | 12/1995 | Waldo et al. | 395/650 |
| 5,479,614 | 12/1995 | Aoe et al. | 395/200 |
| 5,481,718 | 1/1996 | Ryu et al. | 395/700 |
| 5,519,875 | 5/1996 | Yokoyama et al. | 395/800 |
| 5,535,389 | 7/1996 | Elder et al. | 395/700 |
| 5,555,427 | 9/1996 | Aoe et al. | 395/800 |
| 5,560,012 | 9/1996 | Ryu et al. | 395/700 |
| 5,572,733 | 11/1996 | Ryu et al. | 395/701 |
| 5,586,326 | 12/1996 | Ryu et al. | 395/701 |

FOREIGN PATENT DOCUMENTS

| | | |
|---|---|---|
| 2-240771 | 9/1990 | Japan . |
| 3-157729 | 7/1991 | Japan . |
| 3-269731 | 12/1991 | Japan . |
| 4-160894 | 6/1992 | Japan . |
| 4-319744 | 11/1992 | Japan . |
| 4-353932 | 12/1992 | Japan . |
| 4-365171 | 12/1992 | Japan . |
| 5-46569 | 2/1993 | Japan . |
| 5-46570 | 2/1993 | Japan . |
| 5-46571 | 2/1993 | Japan . |
| 5-181814 | 7/1993 | Japan . |
| 6-282433 | 10/1994 | Japan . |

*Primary Examiner*—Thomas G. Black
*Assistant Examiner*—Frantz Coby
*Attorney, Agent, or Firm*—Staas & Halsey

[57] ABSTRACT

An object data processing apparatus of the present invention has a partial object processing unit, a partial object I/O unit and a partial object control unit. The partial object processing unit includes a plurality of object lumps bearing a closed attribute inheritance relationship and carries out data processing by executing transferring/receiving processes of messages between the object lumps and executing the transferring/receiving processes of the messages between the object lumps and I/O devices. The partial object I/O unit executes an interface process with the I/O device. The partial object control unit executes a control process of the partial object processing unit and a control process between the partial object processing unit and the partial object I/O unit.

20 Claims, 52 Drawing Sheets

F I G. 2 0
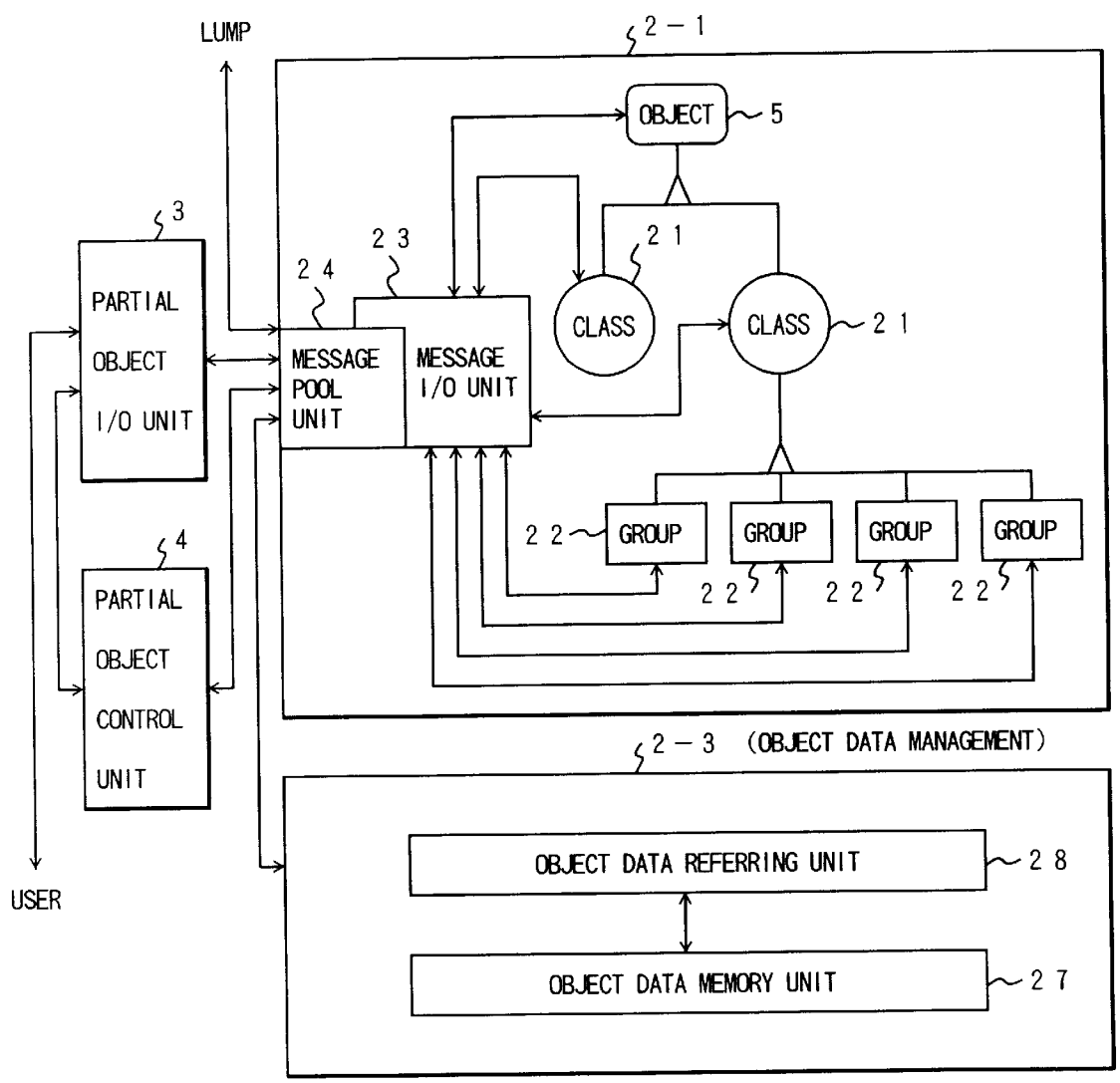

F I G. 28
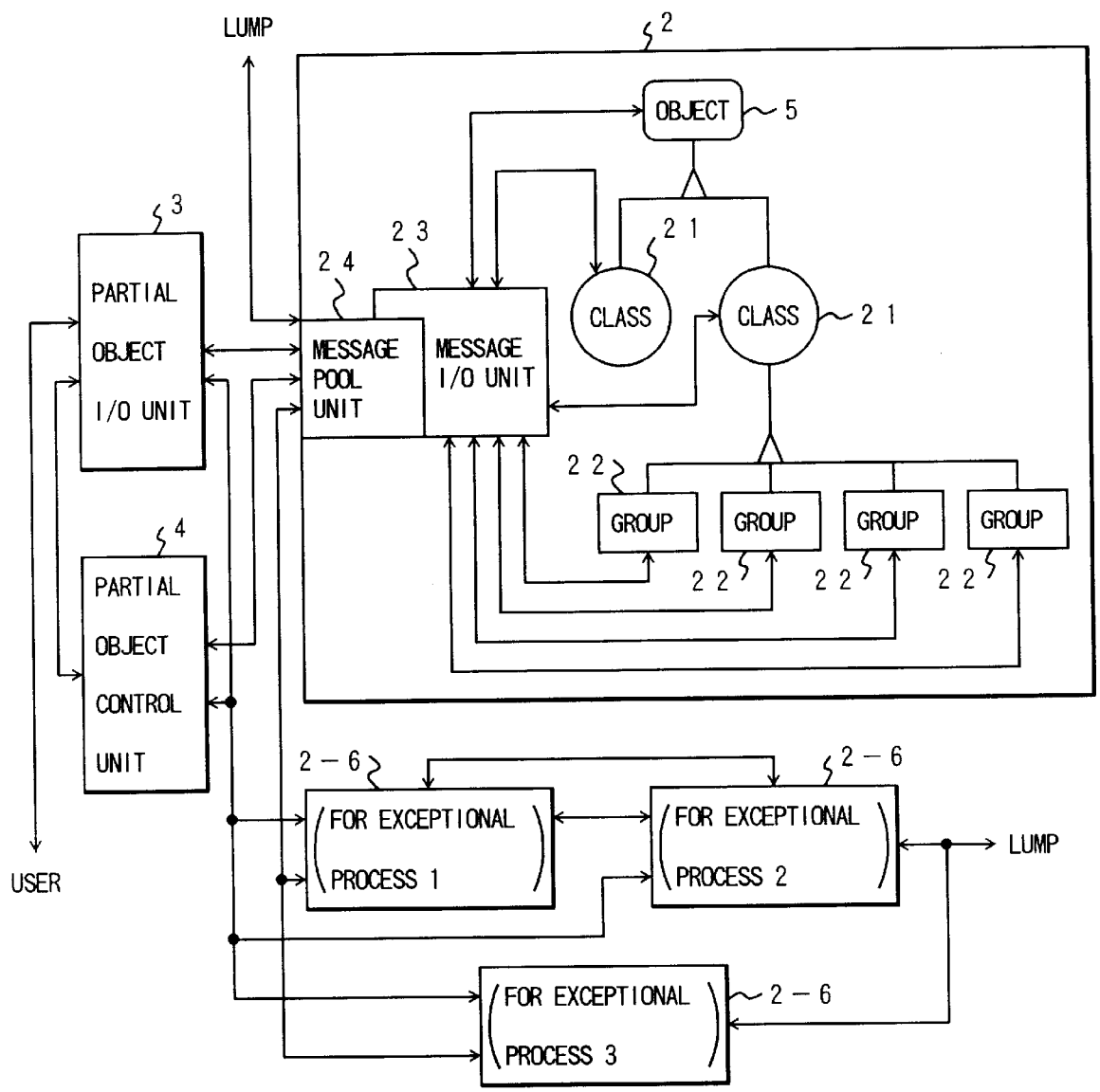

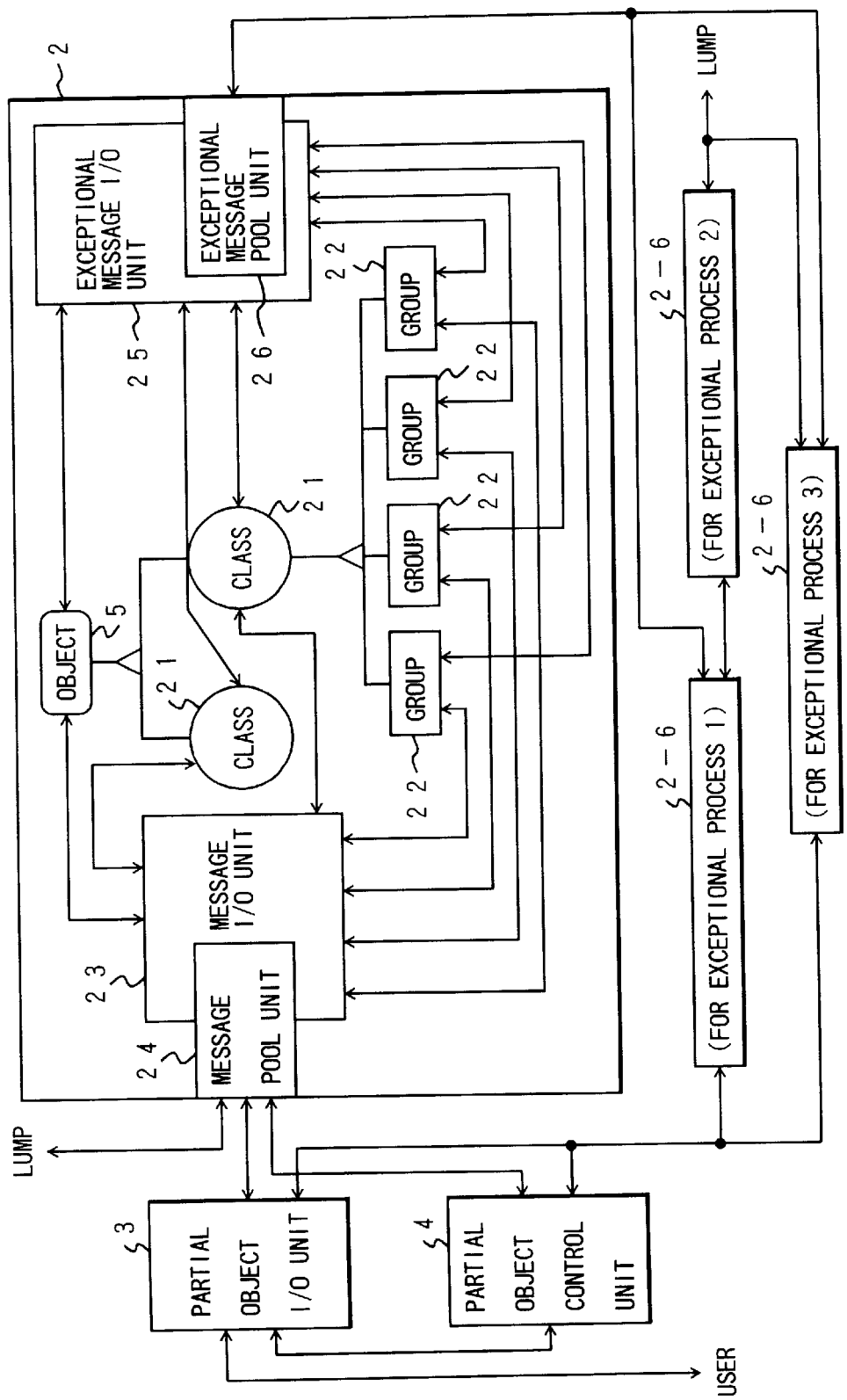
F I G. 2 9

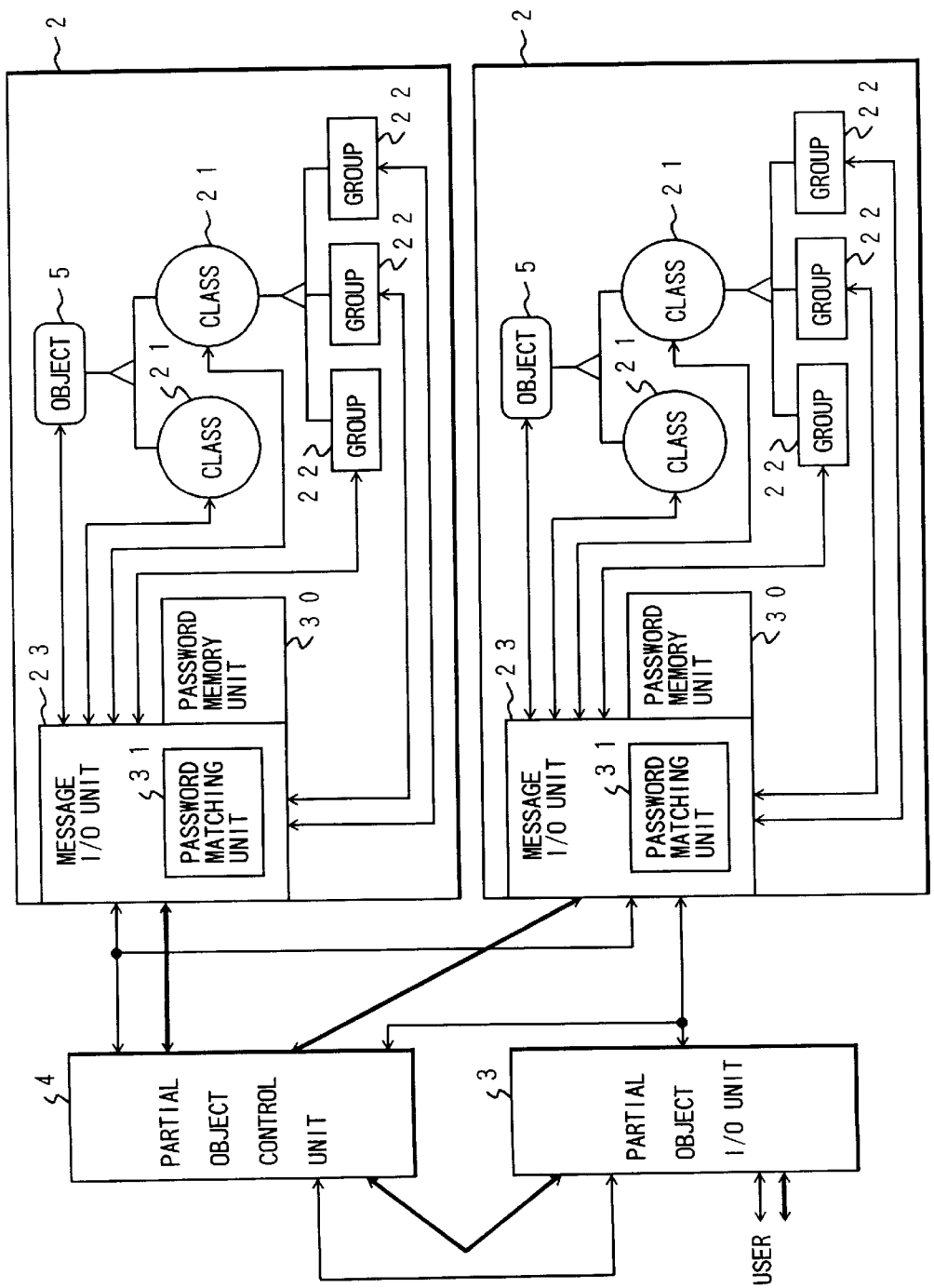

F I G. 4 1
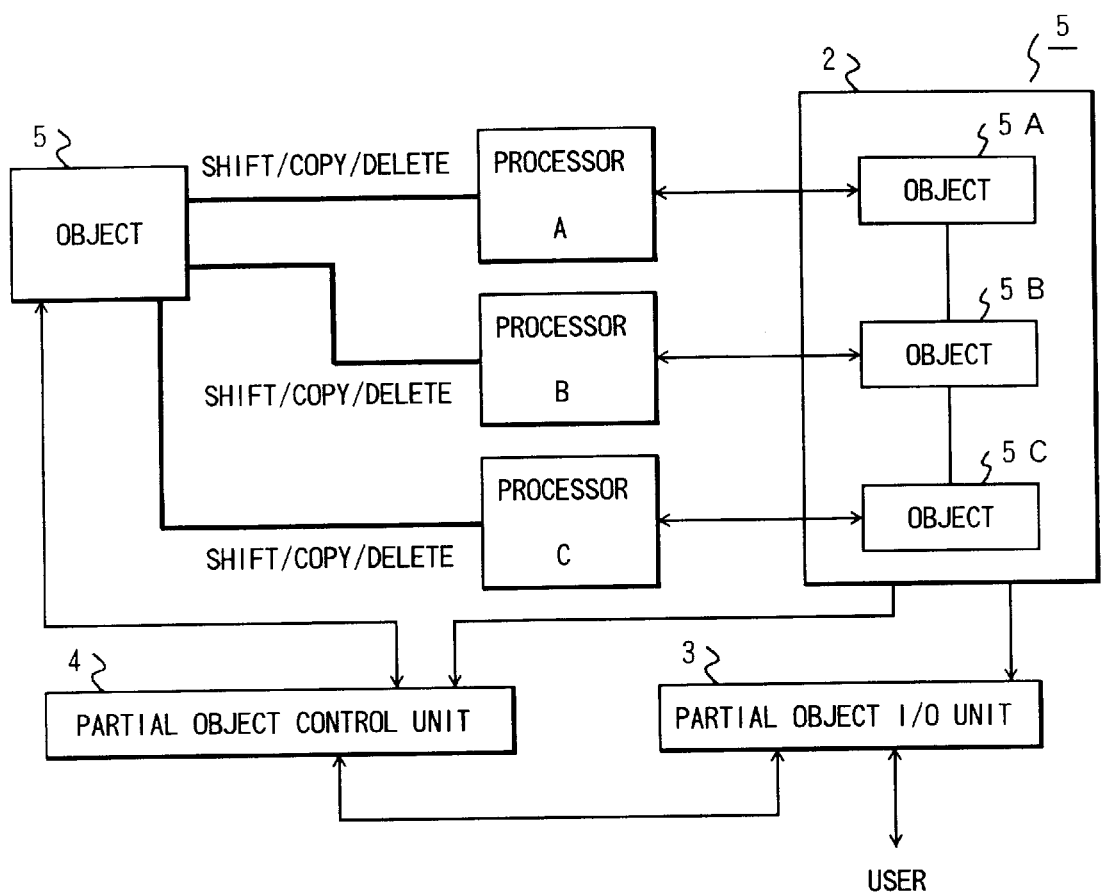

FIG. 48
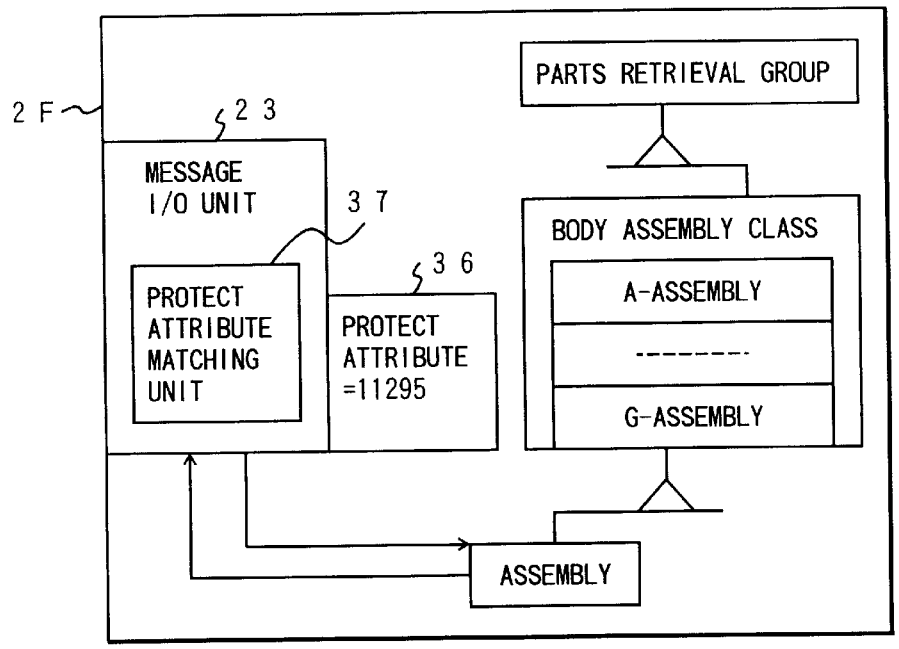
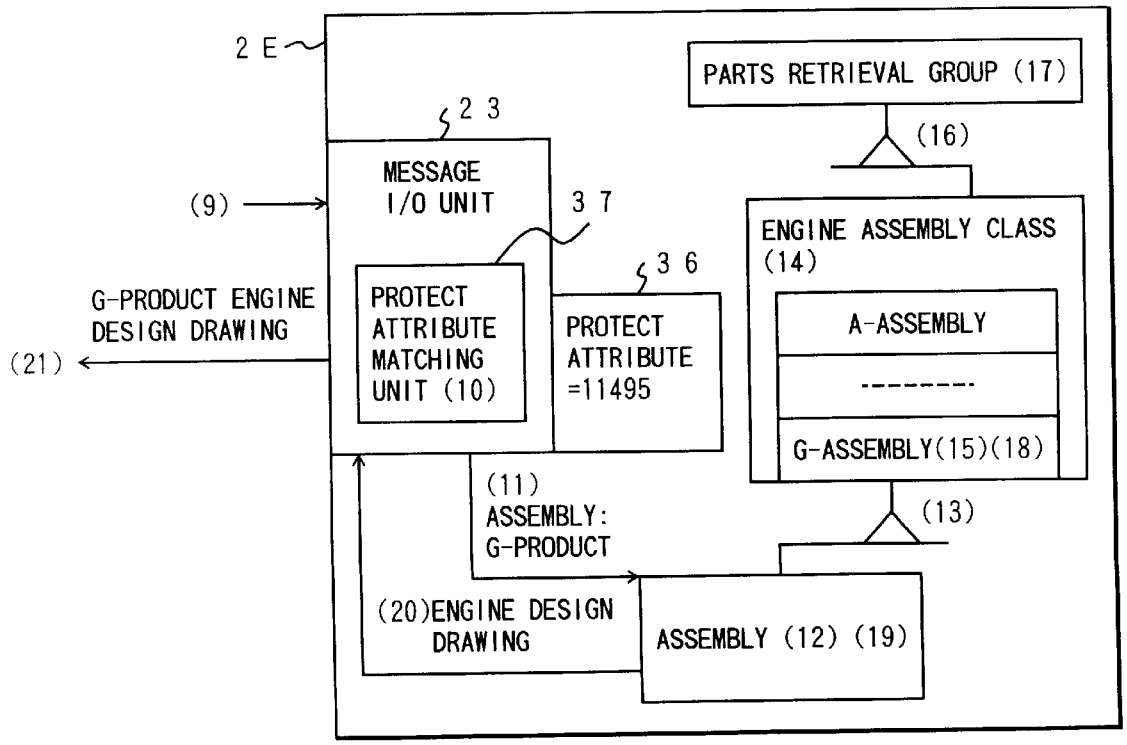

F I G. 49
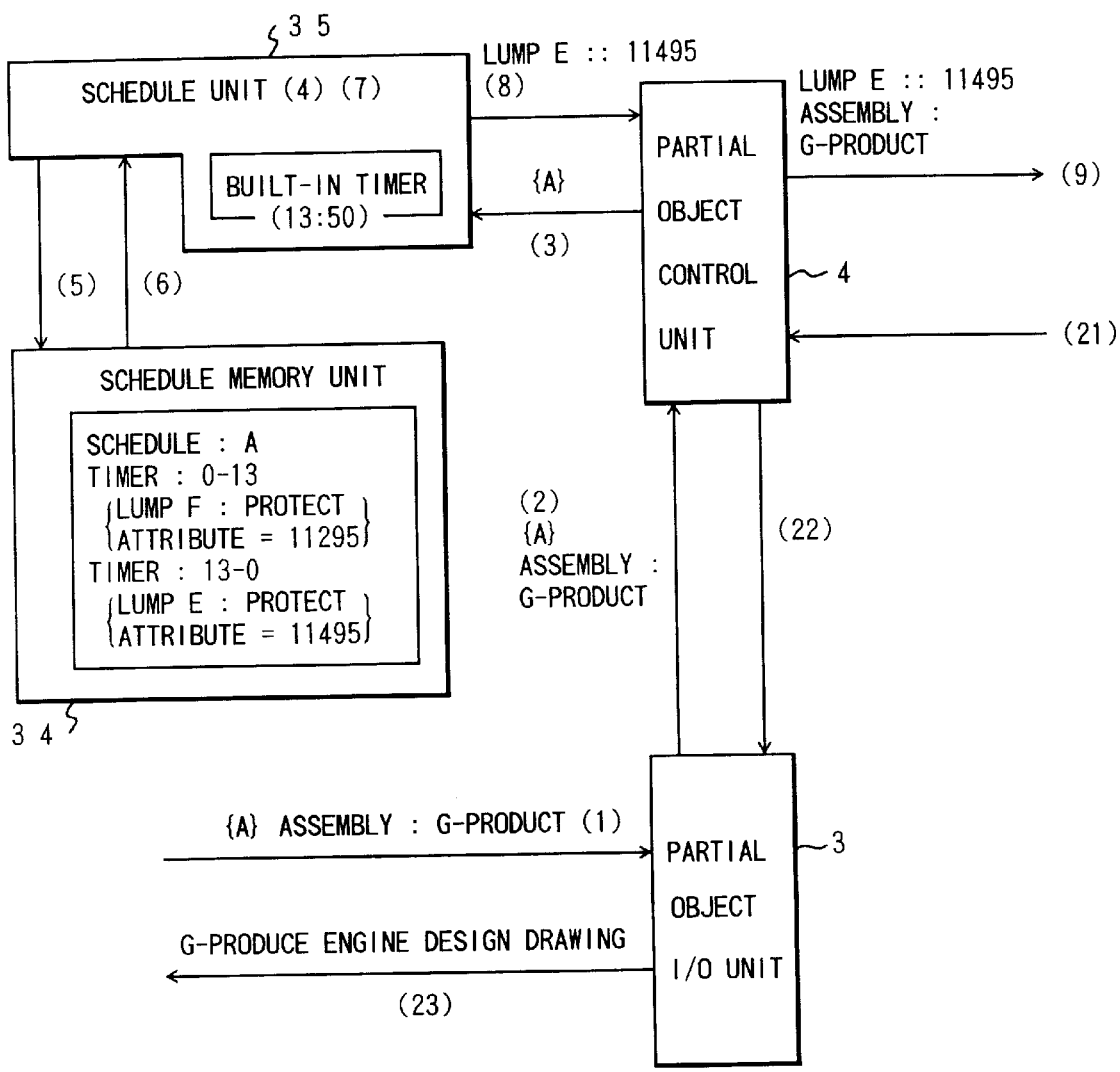

OBJECT DATA PROCESSING APPARATUS

BACKGROUND OF THE INVENTION

The present invention relates generally to an object data processing apparatus for executing data processing in accordance with objects. The present invention relates more particularly to an object data processing apparatus for actualizing efficient and flexible data processing.

A conventional object data processing apparatus registers an object as an execution file and executes the data processing by calling the execution file. In the conventional object data processing apparatus, the objects required for the data processing are not grouped but the individual objects capsulated transfer and receive messages to and from each other, thus executing the data processing.

The prior art object data processing apparatus, however, registers the object as the execution file and executes the data processing by calling the execution file. In this case, if an operator does not know where a running environment is, the work can not be performed.

Further, the object bears such a nature that an attribute is inherited according to a parentage-offspring relationship. If a self-object has not the attribute needed, this attribute is obtained by tracing to a parent object.

Also, in the prior art object data processing apparatus, the individual capsulated objects transfer and receive the messages to and from each other, thus the data processing is executed. In this case, a load of the processing to trace to the attribute inheritance relationship increases, and consequently the efficient data processing can not be executed. Moreover, when a plurality of processors execute the data processing in parallel, it happens that the objects deployed in other processors have to be traced. In this case, the efficient data processing can not be executed.

Further, some problems exist in the prior art as shown the following.

(a) At first, with spreads of multi-processors and networks, resources on the network are used on a file-basis and then shared.

However, if a worker does not know which file the software for performing the work exists in, it is difficult to perform a target work. Therefore, even if the worker does not know which file the software for performing the work exists in, it is necessary to implement the target work by searching the object.

(b) Further, when the work is conducted, the processing has to be done by separately employing the objects according to a working content. A condition for separately employing the objects and correspondence thereof depend on the application, and hence the work can not be flexibly performed.

(c) Moreover, the software for effecting the work is shared and reused, and it is therefore required that the works be rationalized. Since the works are rationalized by the application, a flexible system can not be provided.

(d) Furthermore, when the data such as moving pictures, still pictures and voices in the multimedia are dealt with, there is carried out the work such as an operation of taking the data out of the file in the application. Even when the data are to be operated as part of the control, the data are still treated as an expansion of binary data in the present situation, and therefore the above operation can not be carried out.

(e) Also, the database includes an object-oriented database in addition to the conventional relational database. The data and procedures are closed as one object, and this object is operated. If the priority is given to the object, however, the data and procedures are assimilated into the object too much. This conduces to a problem in which the object is hard to replace.

As a measure against the above problem, the prior art is provided with an interface for transferring/receiving processes as in the case of, e.g., a data retrieval, etc. In this case, there is only a method of coping with the above problem forcibly by unifying the description.

(f) Further, when the works are conducted in one space, virtual addresses can not be allocated to a single machine. In this connection, including the space operating as a server in the network and the multiprocessors, there may be a case of using this as one address space. In the present situation, however, a method thereof does not exist, and therefore the work is conducted in a forcibly operating mode such as executing partial copying of the data or shifting the data to a working area to be used and employing that item of data.

(g) Also, for an agent-orientation, the arrangement is only such that the processor open to the working shares an agent, but there is not considered an arrangement wherein an object group is used as the agent. For this reason, the operation in a static inherited relationship can not be carried out, and a using application is limited.

Furthermore, in a variety of fields exclusive of the above-mentioned filed, there is nothing but to perform the work only in the present confined environment or give up the work.

(h) Moreover, the work has to be done with a separation as a file server on a name-basis of each team and individual. The operations and file formats are not unified depending on application versions, and the same applications exist here and there. In addition, even when the individual user uses the same application, a using method thereof is different. Therefore, it is difficult to effectively utilize the resources and unify the management.

(i) Also, in case a word processor or the like manages a difference between the documents, it is impossible to effect the operation for carrying out a system such as managing the documents on the basis of the difference and modify-managing a predetermined document form and a part of document content.

(j) Further, in the case of obtaining the data dynamically and in real time, it is required that each processing and control are set all independently.

SUMMARY OF THE INVENTION

It is a primary object of the present invention to provide an object data processing apparatus for actualizing efficient and flexible data processing.

An object data processing apparatus according to the present invention comprises a partial object processing unit, a partial object I/O unit and a partial object control unit.

The partial object processing unit includes a plurality of object lumps bearing a closed attribute inheritance relationship and carries out data processing by executing transferring/receiving processes of messages between the plurality of object lumps and executing the transferring/receiving processes of the messages between the object lumps and I/O devices.

The partial object I/O unit executes an interface process with the I/O device such as a keyboard, a loud speaker, a microphone and a communication device.

The partial object control unit executes a control process of the partial object processing unit and executes a control process between the partial object processing unit and the partial object I/O unit.

The object lump includes, in addition to so-called objects, the objects composed of only data, a class of object aggregation and a group of class aggregation.

A message I/O unit possessed by the object lump serves as a message I/O port. A single piece of message I/O unit may be prepared, or a plurality of message I/O units may also be prepared corresponding to an object configuration.

An exceptional message I/O unit possessed by the object lump serves as an exceptional process message I/O port. A single piece of exceptional message I/O unit may be prepared, or a plurality of exceptional message I/O units may also be prepared corresponding to exceptional events.

A memory unit possessed by the object lump manages the data possessed by the objects constituting the lump. As the object lump, there may be prepared another object lump which does not include the above memory unit but stores the object data managed by the memory unit. In this case, the prepared object lump has the above memory unit.

A referring unit possessed by the object lump is prepared as a referring mechanism for an exclusive use for referring to the memory unit. When another object lump for managing the object data is prepared, the prepared object lump includes the referring unit.

A managing unit possessed by the object lump manages a protect attribute described while being made corresponding to a using schedule of the object lump and manages a level and a version of the object lump. Further, the managing unit manages an identifier and a password that are allocated to the object lump and also a priority for indicating a priority of using the object lump.

A determining unit possessed by the object lump determines whether or not management data managed by the managing unit is coincident with a value designated from outside and determines a permission or non-permission of the process designated by the message.

An exceptional process execution unit is provided separately from the partial object processing unit and executes an exceptional process of the object operation. There may be prepared one or more object lumps for executing the exceptional process of the object operation without providing the exceptional process executing unit.

In the object data processing apparatus according to the present invention, the partial object processing unit having the plurality of object lumps bearing the closed attribute inheritance relationship carries out the data processing by executing the transferring/receiving processes of the messages between the object lumps and also executing the transferring/receiving processes of the messages between the object lumps and the I/O devices.

Thus, according to the present invention, the work to be processed is executed by designating a name of the object lump serving as a fundamental unit for the data processing. Accordingly, even if the user does not know where a running environment of the object is, the work is executable, and the efficient data processing can be also actualized.

The object lump serving as the fundamental unit for the data processing bears the closed attribute inheritance relationship. Therefore, according to the present invention, the load of the process to trace to the attribute inheritance relationship can be reduced to a greater degree than by the conventional method of executing the data processing which involves the transfer and receipt of the messages between the individual capsulated objects, and the efficient data processing can be thereby actualized.

Furthermore, when the plurality of processors execute the data processing in parallel, there is no necessity for tracing to the objects deployed in other processors. Accordingly, the efficient data processing can be realized.

Besides, according to the present invention, the object lump serving as the fundamental unit for the data processing has the closed attribute inheritance relationship. Therefore, even when a variety of interfaces exist, a flexible correspondence to the data processing can be attained. When the objects are changed, an influence by this changing process is not exerted outside the object lump. Consequently, the data can be flexibly processed, and the objects can be easily changed.

The message I/O unit possessed by the object lump performs exclusive control of the messages, whereby the exclusive control of the messages can be simply executed. Further, the exceptional message I/O unit possessed by the object lump carries out the exclusive control of the exceptional process messages, whereby the exclusive control of the exceptional process messages can be simply implemented.

Also, when the memory unit is prepared, a starting-up element is capable of obtaining a position of a processing target object and an attribute of this object's own by referring to the memory unit without tracing to the interior of the object lump to be started up.

Additionally, when the referring unit is prepared, the object lump is capable of retrieving the memory unit without decreasing a primary processing efficiency. Also, when the managing unit and the determining unit are prepared, the object lump is capable of going into an execution of the process designated by the message on condition of coincidences in terms of the protect attribute, the identifier, the password and the priority as well.

BRIEF DESCRIPTION OF THE DRAWINGS

Other objects and advantages of the present invention will become apparent during the following discussion in conjunction with the accompanying drawings, in which:

FIG. 6 is a diagram illustrating a data structure of the object lump shown in FIG. 6;

FIG. 20 is a diagram showing an example 13 of the object lump;

FIG. 28 is a diagram illustrating an example 5 of the construction for executing the exceptional process;

FIG. 29 is a diagram illustrating an example 6 of the construction for executing the exceptional process;

FIG. 30 is a diagram illustrating an example 19 of the object lump;

FIG. 41 is a diagram of assistance in explaining an execution mode 2 of the object lump;

FIG. 48 is a diagram showing a specific operation example 3 of the example illustrated in FIG. 33;

FIG. 49 is a diagram showing the specific operation example 3 of the example illustrated in FIG. 33;

DETAILED DESCRIPTION OF THE PREFERRED EMBODIMENT

Figure 1:
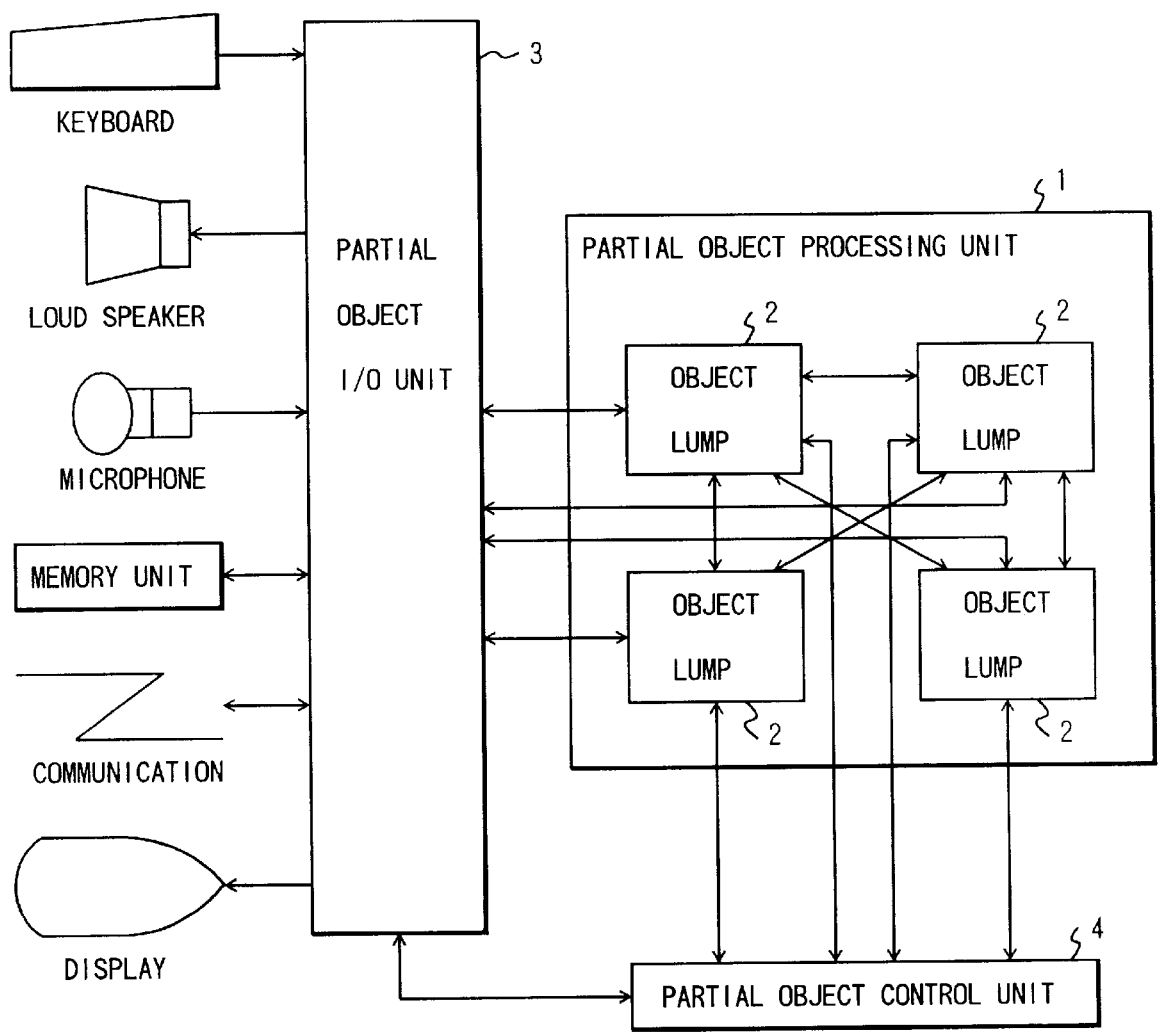
FIG. 1 is a diagram illustrating a construction of an embodiment of an object data processing apparatus according to the present invention.

An embodiment of an object data processing apparatus according to the present invention will be described in detail. FIG. 1 is a block diagram illustrating an embodiment of the object data processing apparatus of the present invention. Referring to FIG. 1, the object data processing apparatus includes a partial object processing unit 1, a partial object I/O unit 3 and a partial object control unit 4.

The partial object processing unit 1 has a plurality of object lumps 2 bearing a closed attribute inheritance relationship, wherein messages are transferred and received between the object lumps 2, and the message are also transferred and received between I/O devices and the objects lumps 2, thus implementing the data processing.

The partial object I/O unit 3, as illustrated in FIG. 1, executes interface processing with respect to the I/O devices such as a keyboard, a loud speaker, a microphone and a communication equipment.

The partial object control unit 4 executes control processing of the partial object processing unit 1 and also implements control processing between the partial object processing unit 1 and the partial object I/O unit 3.

In the object data processing apparatus, the partial object processing unit 1 including the plurality of object lumps 2 bearing the close attribute inheritance relationship executes the transferring/receiving processes of the messages between the object lumps 2 and also carries out the data processing by executing the transferring/receiving processes of the messages between the object lumps 2 and the I/O devices.

As described above, according to the present invention, a work to be processed is executed by designating a name of the object lump 2 as a fundamental unit for the data processing. Accordingly, the work can be carried out even if the operator does not know where the object running environment exists, and the efficient data processing can be actualized.

<Example 1 of Object Lump 2>

Figure 2:
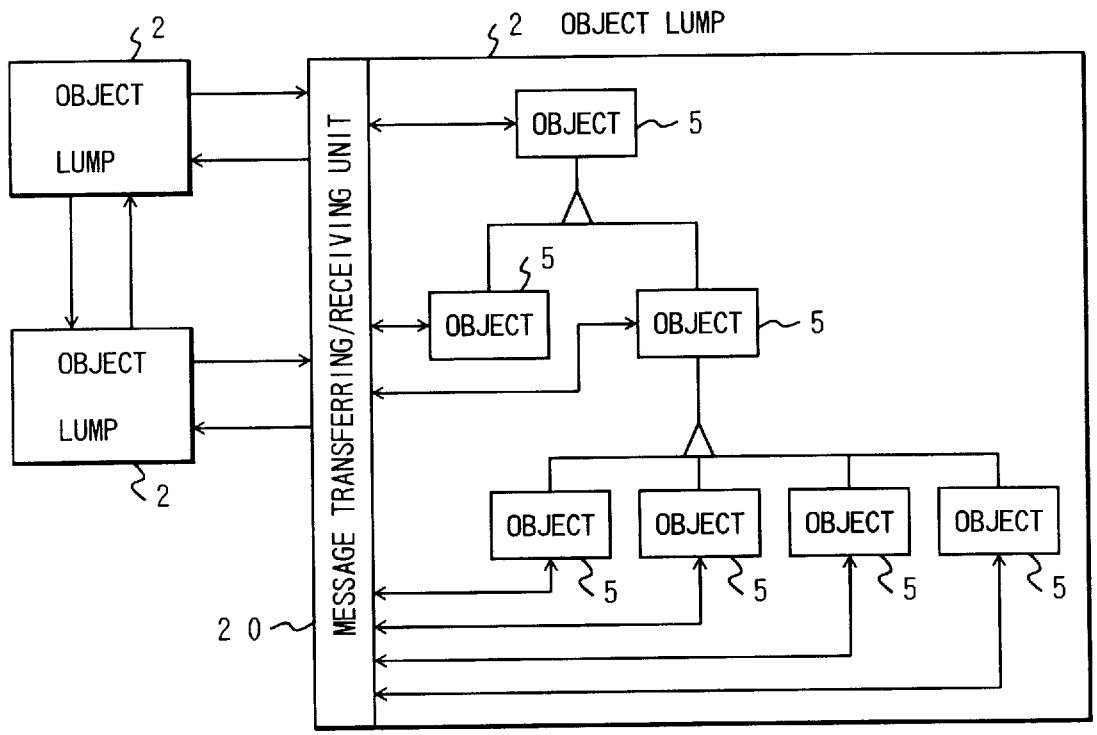
FIG. 2 is a diagram showing an example 1 of an object lump.

FIG. 2 is a diagram showing an example 1 of the object lump 2 constituting the partial object processing unit 1 that has been explained in FIG. 1.

Herein, arrowheads in FIG. 2 indicates the transfer/receipt of the data between objects 5. A triangle represents an attribute inheritance relationship. This attribute inheritance relationship is not that all the works are carried out by the object itself but that the operation is actualized based on such a difference that the object 5 higher by one performs the work when there is no content for working in the object itself.

The object lump 2 in this example 1 is composed of an aggregation of the objects 5. The inheritance relationship (single inheritance, multiple inheritance) of the attribute possessed by those objects 5 is closed in that object lump 2. That is, the object 5 is capable of obtaining a required attribute simply by tracing within the object lump 2 to which the object itself belongs. The object lump 2 specifically manages a structure of the objects dominated by the lump 2 itself in accordance with a data structure shown in FIG. 3.

The object lump 2 in this example 1 has no unified message I/O port. Each object 5 executes the transferring/receiving processes of the message to and from other object lump 2 via a message transferring/receiving unit 20.

In the example 1 of the object lump 2, the partial object processing unit 1 illustrated in FIG. 1 is constructed by preparing a plurality of object lumps 2 shown in FIG. 2. The object lumps 2 constituting this partial object processing unit 1 transfer and receive the messages to and from the I/O devices or between the object lumps 2 each other, thus performing the work.

The respective object lumps 2 independently transfer and receive the messages and are therefore capable of carrying out the work in parallel. The partial object I/O unit 3 for executing the interface processing with respect to the I/O devices is prepared, and hence, even when the plurality of object lumps 2 perform the works in parallel, the user operating the I/O device is capable of not only receiving it for a response process of the massage but also effecting a variety of control processes with respect to the partial object I/O unit 3.

In the example 1 illustrated in FIG. 2, the object lump 2 is constructed of the objects 5. For instance, the object lump 2 may be composed of data as in the form of documents. That is, the object lump 2 for managing the data as in the form of the documents and document contents by use of differences may be prepared. In the following examples, when the object 5 is referred, this includes the one consisting of only data.

<Example 2 of Object Lump 2>

Figure 4A:
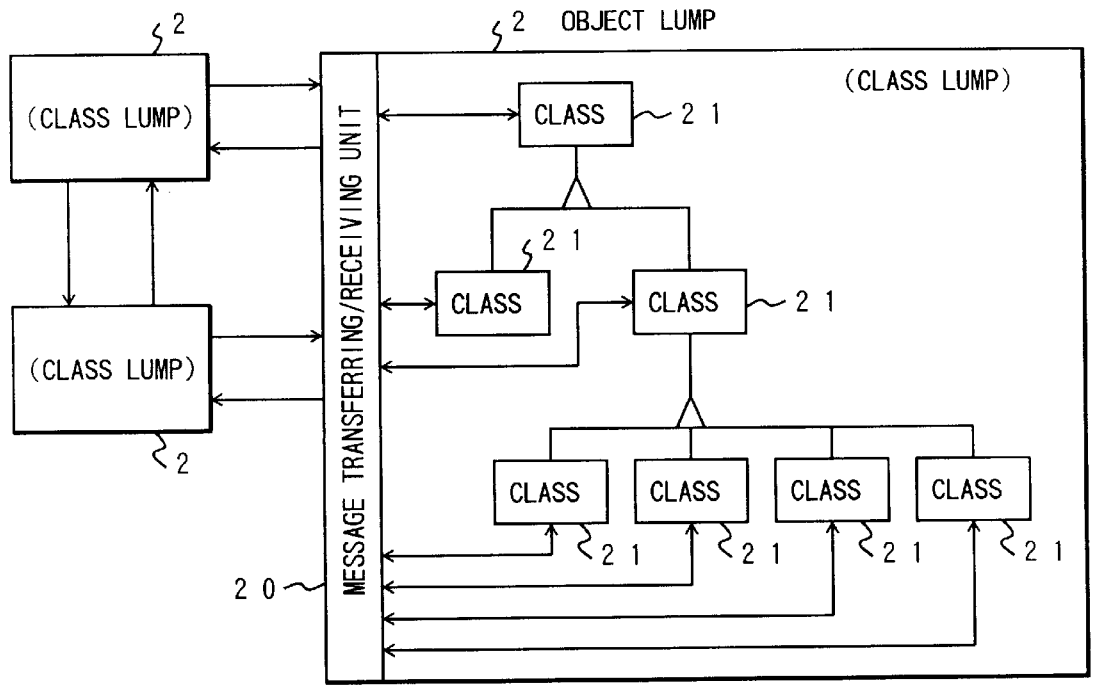
FIG. 4A is a diagram illustrating an example 2 of the object lump.

FIG. 4A is a diagram showing an example 2 of the object lump 2. The object lump 2 in this example 2 is constructed of an object-aggregation class 21, which should be essentially called a class lump.

Figure 4B:
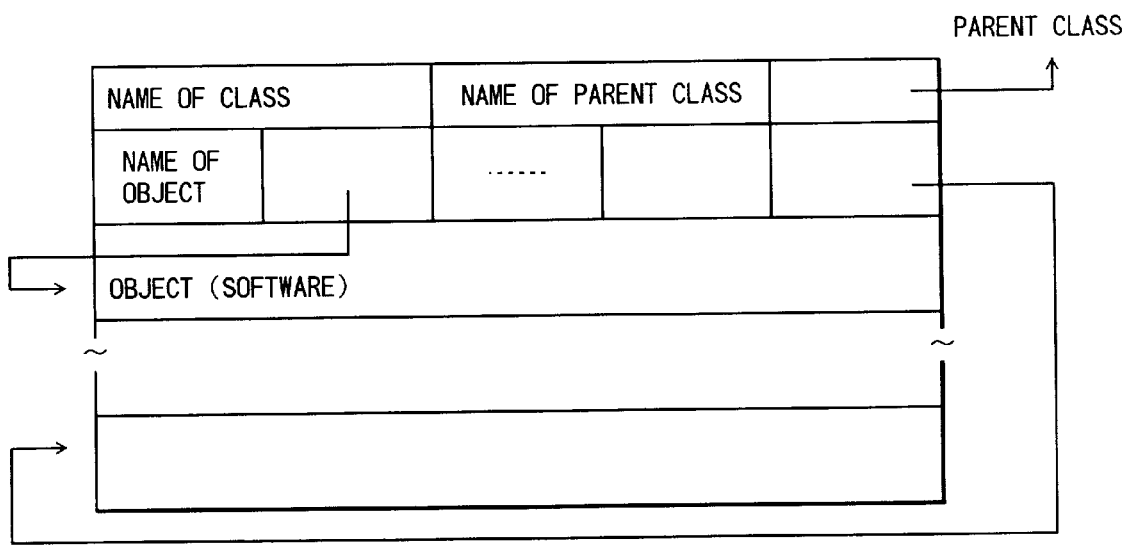
FIG. 4B is a diagram illustrating a data structure of the object lump shown in FIG. 4A.

An inheritance relationship (single inheritance, multiple inheritance) of the attribute possessed by those classes 21 is closed in that object lump 2. The object lump 2 specifically manages a structure of the class 21 dominated by the lump 2 itself in accordance with a data structure shown in FIG. 4B. Herein, the same table does not include all the classes, and it is also possible to make the management with a separation of the classes by increasing the number of pointers.

Each class 21 includes the object 5 and operates on executing the object 5. Each class 21 executes the object 5 and, when an operation that is not possessed by that class 21 is performed, has an attribute inheritance relationship between the classes 21. Therefore, each class 21 operates while searching the object 5 operable in accordance with a high-and-low relationship within the object lump 2.

According to the example 2 of the object lump 2, the partial object processing unit 1 illustrated in FIG. 1 is constructed by preparing the plurality of object lumps 2 shown in FIG. 4A. The object lumps 2 constituting this partial object processing unit 1 transfer and receive the messages to and from the I/O devices or between the object lumps 2 each other, thus performing the work. According to the construction, the same effect as that in the example 1 is obtained.

<Example 3 of Object Lump 2>

Figure 5A:
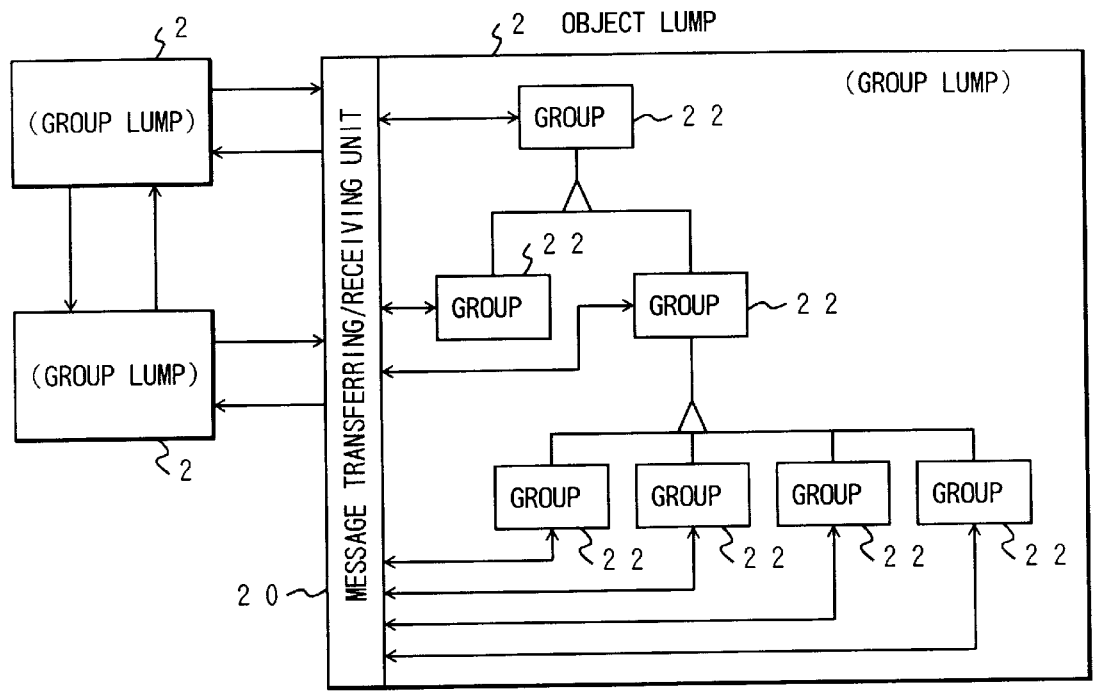
FIG. 5A is a diagram illustrating an example 3 of the object lump.
Figure 5B:
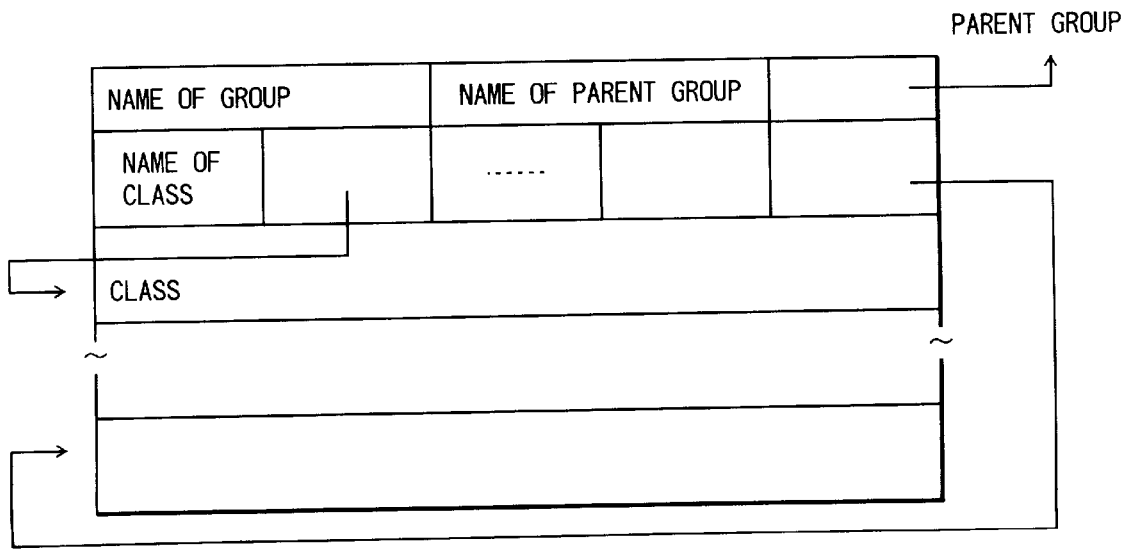
FIG. 5B is a diagram illustrating a data structure of the object lump shown in FIG. 5A.

FIG. 5A is a diagram showing an example 3 of the object lump 2. The object lump 2 in this example 3 is constructed of a class-aggregation group 21, which should be essentially called a group lump. An inheritance relationship (single inheritance, multiple inheritance) of the attribute possessed by those groups 22 is closed in that object lump 2. The object lump 2 specifically manages a structure of the group 22 dominated by the lump 2 itself in accordance with a data structure shown in FIG. 5B. Herein, the same table does not include all the groups, and it is also possible to make the management with a separation of the groups by increasing the number of pointers.

Each group 22 includes the object 5 through the class 21 and operates on executing the object 5. Each group 22 executes the object 5 and, when an operation that is not possessed by that group 22 is performed, has an attribute inheritance relationship between the groups 22. Therefore, each group 22 operates while searching the object 5 operable in accordance with a high-and-low relationship within the object lump 2.

According to the example 3 of the object lump 2, the partial object processing unit 1 illustrated in FIG. 1 is constructed by preparing the plurality of object lumps 2 shown in FIG. 5A. The object lumps 2 constituting this partial object processing unit 1 transfer and receive the messages to and from the I/O devices or between the object lumps 2 each other, thus performing the work. According to this construction, the same effect as that in the example 1 is obtained.

<Example 4 of Object Lump 2>

Figure 6:
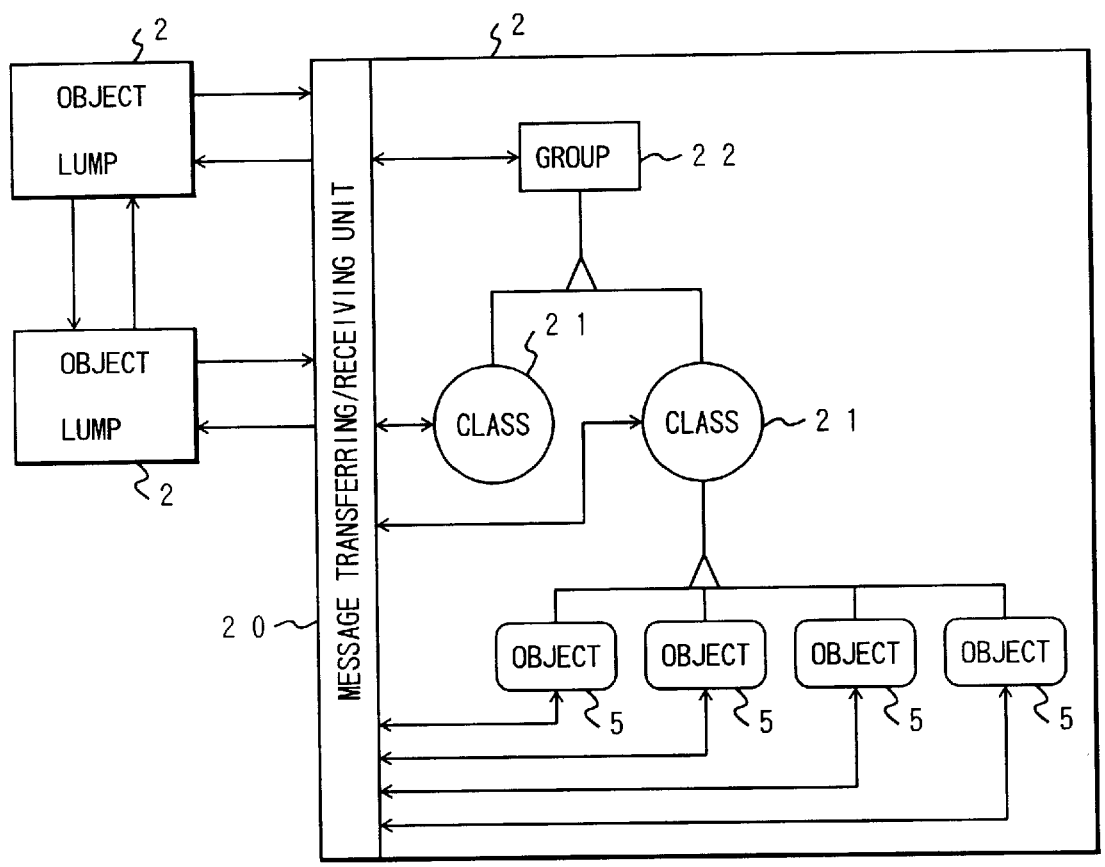
FIG. 6 is a diagram illustrating an example 4 of the object lump.

FIG. 6 is a diagram showing an example 4 of the object lump 2. The object lump 2 in the example 4 is constructed in the form of mixtures of the objects 5, the classes 21 and the groups 22. The group 22 and the class 21 have a parentage-offspring attribute inheritance relationship with each other, while the class 21 and the object 5 have a parentage-offspring attribute inheritance relationship with each other.

The object lump 2 taking the mixture form transfers and receives the messages to and from the I/O devices and operates by executing the transferring/receiving processes of the messages with respect to other object lump 2.

Figure 3:
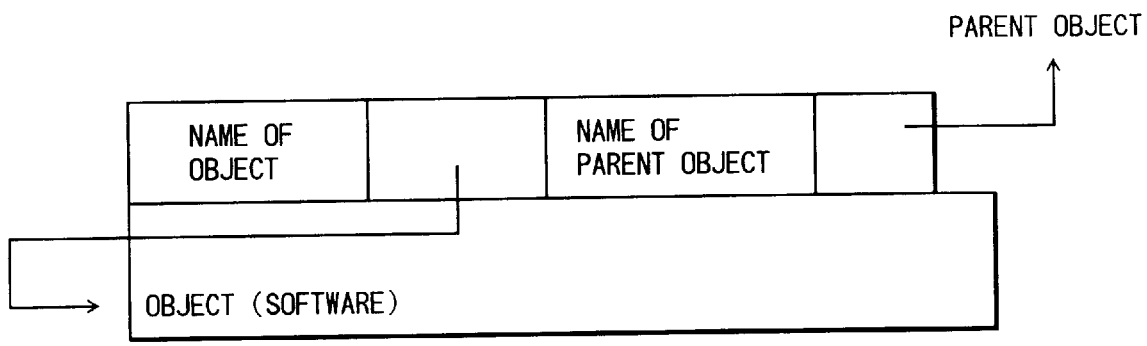
FIG. 3 is a diagram illustrating a data structure of the object lump shown in FIG. 2.

The object lump 2 taking the mixture form bears the attribute inheritance relationship and thereby functions as a much larger object lump 2 than each of the object lumps 2 in the examples 1–3 illustrated in FIGS. 3 through 5. Further, the object 5 is at the lowest-order level. Therefore, a partial change can be simply actualized by adding the object 5 to a portion of the group 22 or the class 21 that is to be partially changed.

In the example 4 shown in FIG. 6, the group 22 and the class 21 have the parentage-offspring attribute inheritance relationship with each other, while the class 21 and the object 5 have the parentage-offspring attribute inheritance relationship with each other. For instance, the form where the object 5, the classes 21 and the groups 22 are mixed may be more complicated.

<Example 5 of Object Lump 2>

Figure 7A:
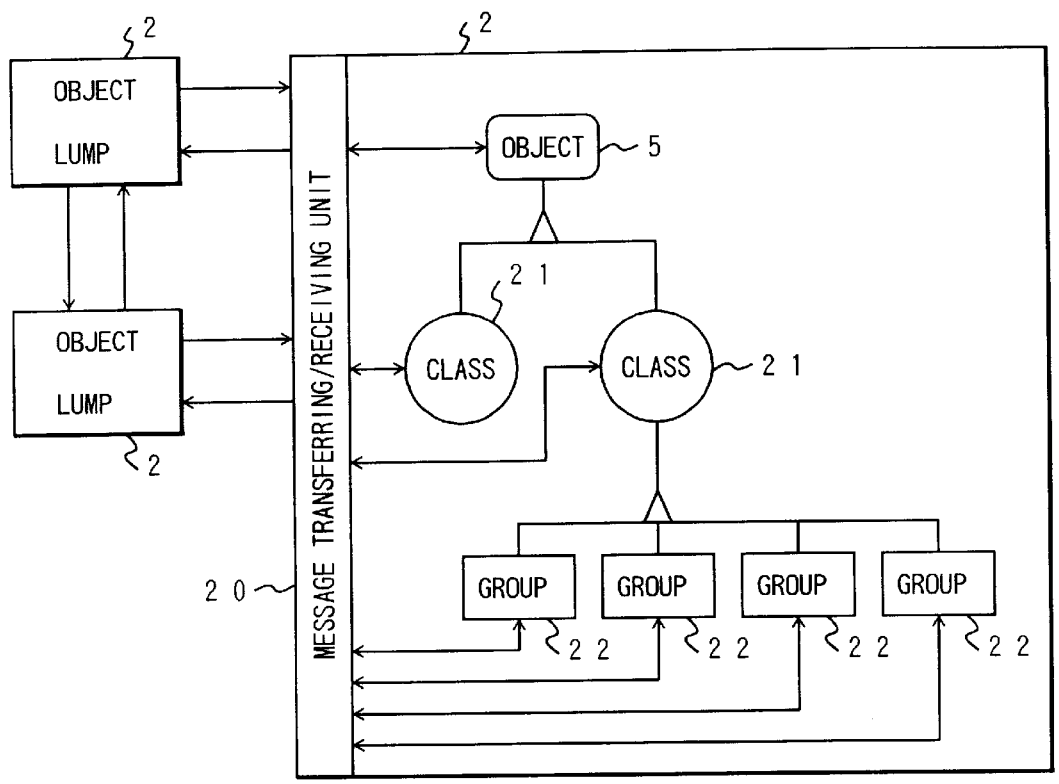
FIG. 7A is a diagram illustrating an example 5 of the object lump.

FIG. 7A is a diagram showing other example 5 of the object lump 2. The object lump 2 in the example 5 is constructed in the form wherein the object 5, the classes 21 and the groups 22 are mixed. The object 5 and the class 21 have the parentage-offspring attribute inheritance relationship with each other, while the class 21 and the group 22 have the parentage-offspring attribute inheritance relationship with each other. The object lump 2 taking the mixture form transfers and receives the messages to and from the I/O devices and operates by executing the transferring/receiving processes of the messages with respect to other object lump 2.

The object lump 2 taking the mixture form bears the attribute inheritance relationship and thereby functions as a still larger object lump 2 than each of the object lumps 2 in the examples 1–3 illustrated in FIGS. 3 through 5. Further, the object 5 is at a high-order level. Therefore, new large classes 21 and groups 22 are linked under the object 5 according to the attribute inheritance relationship. The new large class 21 and group 22 inherit the attribute inheritance relationship possessed by the object 5, whereby the operation can be expanded.

Figure 7B:
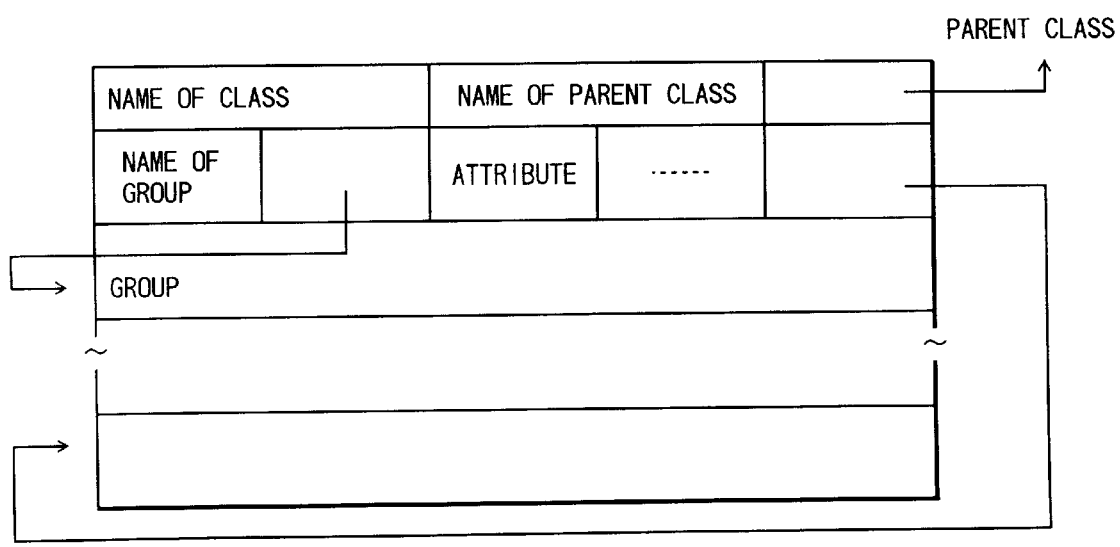
FIG. 7B is a diagram illustrating a data structure of the object lump shown in FIG. 7A.

In the example 5 shown in FIG. 7A, the object 5 and the class 21 have the parentage-offspring attribute inheritance relationship with each other, while the class 21 and the group 22 have the parentage-offspring attribute inheritance relationship with each other. The form where the object 5, the classes 21 and the groups 22 are mixed may be more complicated. For example, as shown in a data structure of FIG. 7B, a name of group exists in a name of class. Further, the group itself contains a plurality of classes and inherits difference classes thereunder, whereby a portion that can not be supplemented by the group may be supplemented by the classes.

<Example 6 of Object Lump 2>

Figure 8:
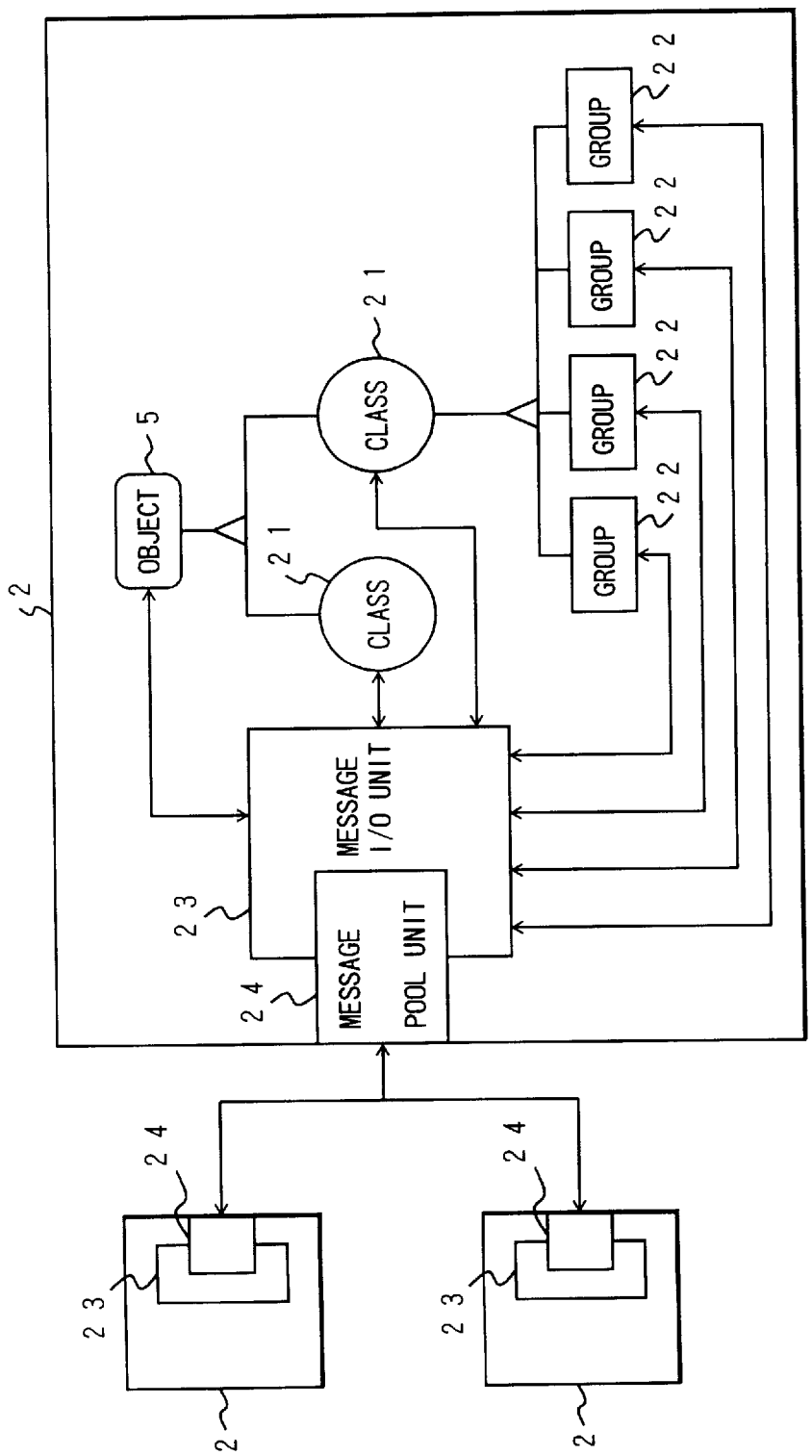
FIG. 8 is a diagram showing an example 6 of the object lump.

FIG. 8 is a diagram illustrating an example 6 of the object lump 2. The object lump 2 in the example 6 is provided with a message I/O unit 23 as one port through the messages are transferred and received to and from other object lump 2. A message pool unit 24 pools the messages which the message I/O unit 23 deals with.

According to this construction, the plurality of object lumps 2 transfer and receive the messages in parallel. In this case, the operation is not that the object lumps 2 transfer and receive the messages directly to and from the objects 5 but that the message I/O unit 23 as a representative of the object lumps 2 inputs and outputs the messages. Consequently, the parallel process and exclusive control including the transfer/receipt of other messages are simplified. If the object lump 2 exists as one large function, the exclusive control on a functional basis is easily performed.

<Example 1 of Data Processing>

Figure 9:
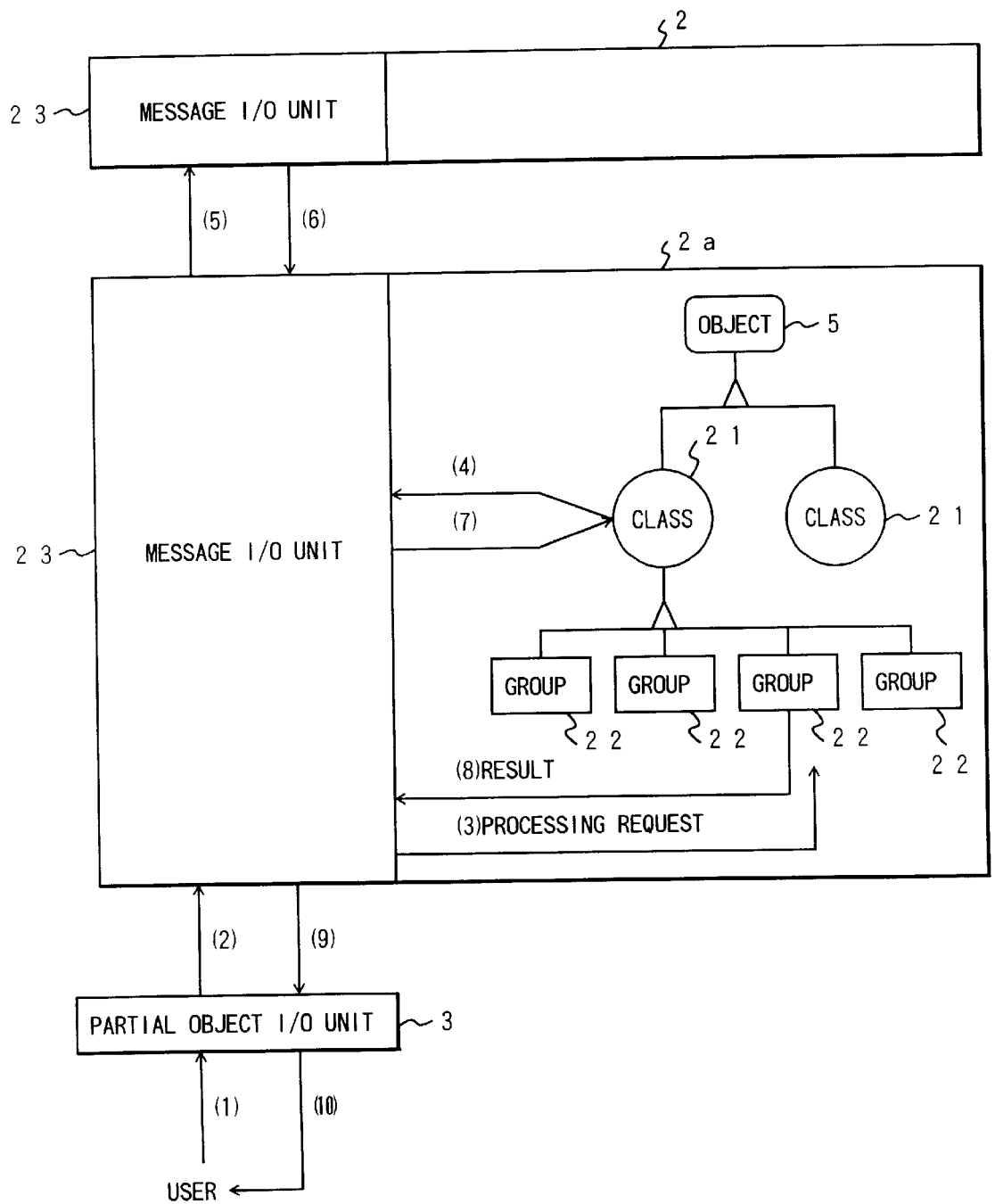
FIG. 9 is a diagram illustrating an example 1 of data processing according to the present invention.

Next, an example 1 of the data processing executed by use of the object lump 2 shown in FIG. 8 will be explained with reference to FIG. 9. Referring to FIG. 9, the numerals with parentheses indicate a processing sequence.

When the user uses an object lump 2a, as indicated by (1), (2) of FIG. 9, the message is transferred to the object lump 2a via the partial object I/O unit 3.

The object lump 2a requests the group 22 that the user wants to employ for processing by sending the message thereto, as shown (3) by FIG. 9. The group 22 accepting the processing request starts the work within the group itself. If there is no content of the work, the group 22 requests a high-order class 21 to perform the processing, and this class 21 executes the processing.

At this time, the class 21, if necessary, as shown by (4), (5) of FIG. 9, requests the outside object lump 2 to perform the processing by sending the message thereto. As indicated by (6), (7) of FIG. 9, the class 21 continues the processing by making use of a result sent back in response to this request. The group 22 receives the processing result in the class 21 and performs remaining works. As indicated by (8), (9), (10) of FIG. 9, the processing is ended up with informing the user of the processing result.

<Example 1 of Exceptional Process>

Figure 10:
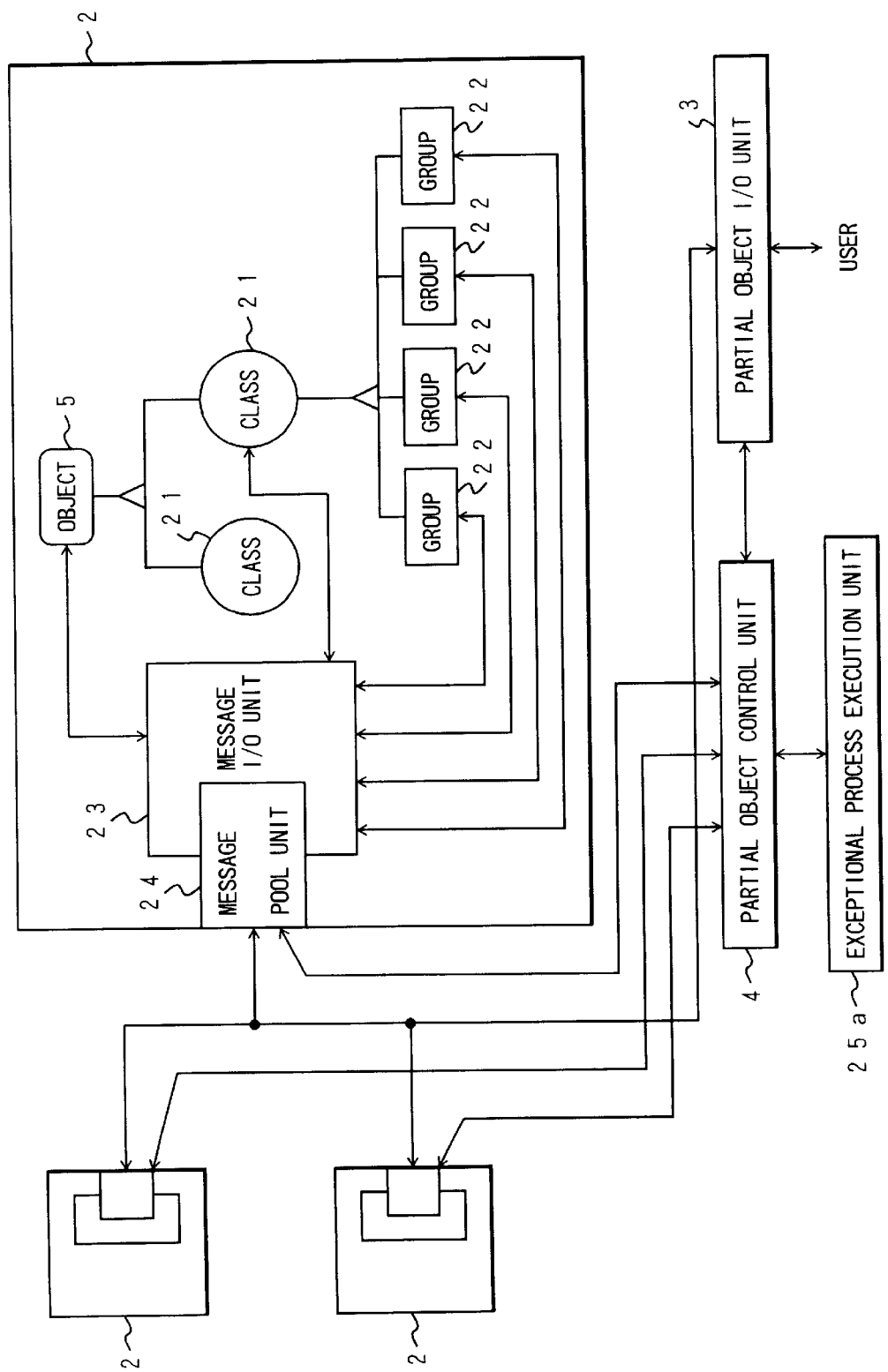
FIG. 10 is a diagram showing an example 1 of a construction for executing an exceptional process.

If an exceptional process occurs during the operation of the object lump 2, FIG. 10 illustrates an example 1 of a construction for executing the above exceptional process.

In the example 1 of this exceptional process, an exceptional process executing unit 25a is provided separately from the object lump 2. If the exceptional process occurs during the operation of the object lump 2, the message I/O unit 23 transfers a message of the exceptional process to the partial object control unit 4. The partial object control unit 4 receives the message of the exceptional process and starts up the exceptional process execution unit 25a. The exceptional process execution unit 25a executes the above exceptional process and, according to a content thereof, transfers and receives the message to and from the partial object I/O unit 3, thus informing the user of data about the occurrence of the exceptional process.

Based on this construction, the object lump 2 is capable of, when executing in parallel for transferring and receiving the messages to and from other object lumps 2 and other users, proceeding the work without interrupting the processing even when the exceptional process occurs.

Figure 25:
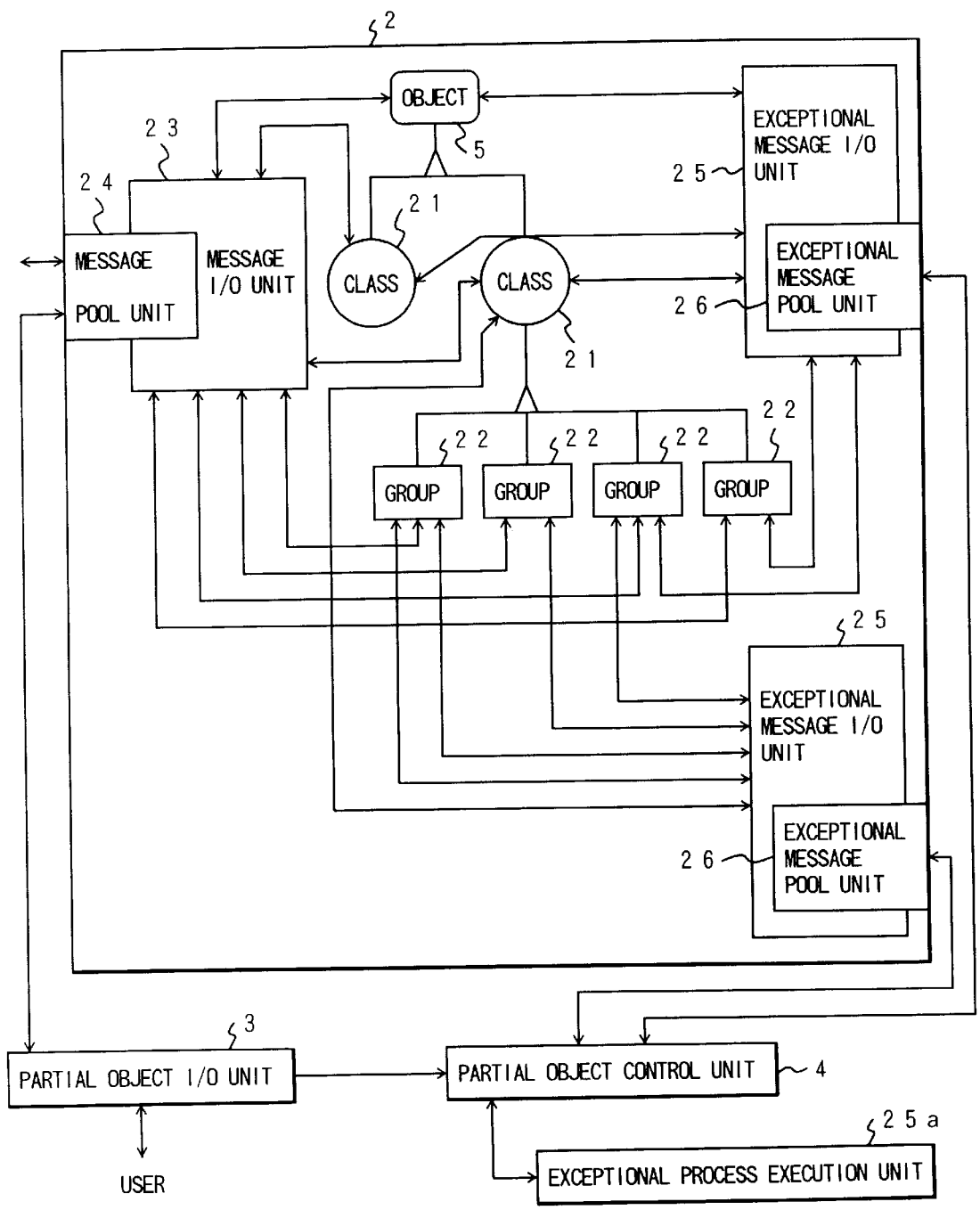
FIG. 25 is a diagram illustrating an example 18 of the object lump.

Note that the exceptional process execution unit 25a illustrated in FIG. 25 transfers and receives a notice of the exceptional operation to and from the partial object I/O unit 3 via the partial object control unit 4. For example, the exceptional process execution unit 25a may give the notice to the user by transferring and receiving the message directly to and from the partial object I/O unit 3.

Further, FIG. 10 shows a single piece of exceptional process execution unit 25a. For instance, according to functions, a plurality of the exceptional process execution units 25a are provided and the exceptional processes may be allocated. When the partial object control unit 4, when the message of the exceptional process is received, may call and operate the exceptional process execution unit suited to that message. A processing efficiency of the exceptional process can be thereby increased. Also, the partial object control unit 4 may incorporate a function of the exceptional process execution unit 25a.

<Example 2 of Exceptional Process>

Figure 11:
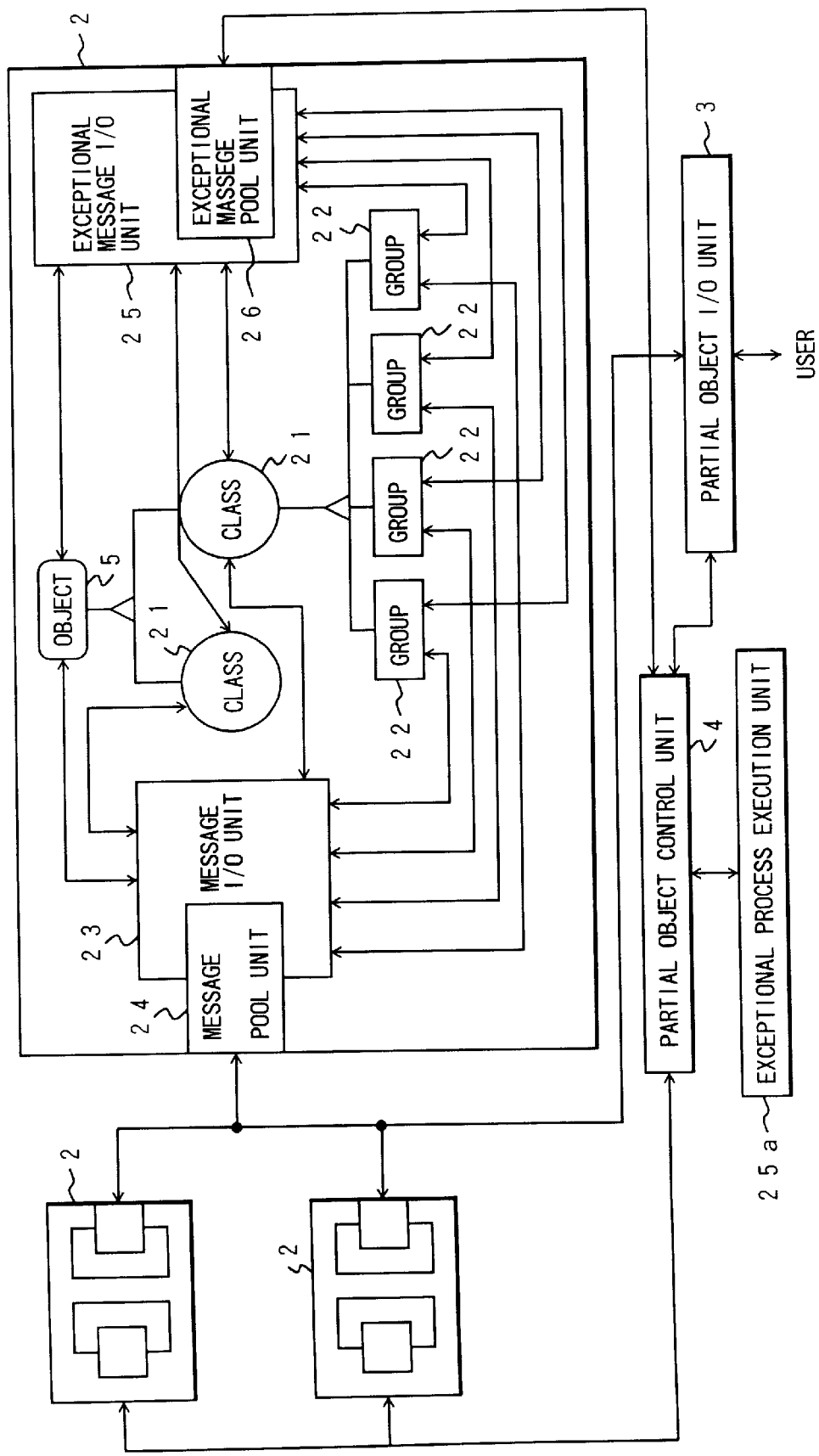
FIG. 11 is a diagram illustrating an example 2 of the construction for executing the exceptional process.

If the exceptional process occurs during the operation of the object lump 2, FIG. 11 illustrates an example 2 of the construction for executing this exceptional process.

The object lump 2 shown in FIG. 10 transfers the message of the exceptional process to the partial object control unit 4 via the message I/O unit 23. The object lump 2 shown in FIG. 11 is provided with an exceptional message I/O unit 25 for dealing with only the message of the exceptional process as a new port separately from the message I/O unit 23. An exceptional message pool unit 26 pools the message of the exceptional process which the exceptional message I/O unit 25 deals with.

When the plurality of object lumps 2 transfer and receive the messages in parallel, the operation is not that the object lumps 2 transfer and receive the messages directly to and from the objects 5 but that the exceptional message I/O unit 25 as a representative of the object lumps 2 inputs and outputs the messages of the exceptional process. Consequently, the executions of the parallel process and exclusive control including the transfer/receipt of other messages are simplified.

<Example 2 of Data Processing>

Next, an example 2 of the data processing executed by use of the object lump 2 shown in FIG. 11 will be explained with reference to FIG. 12.

Figure 12:
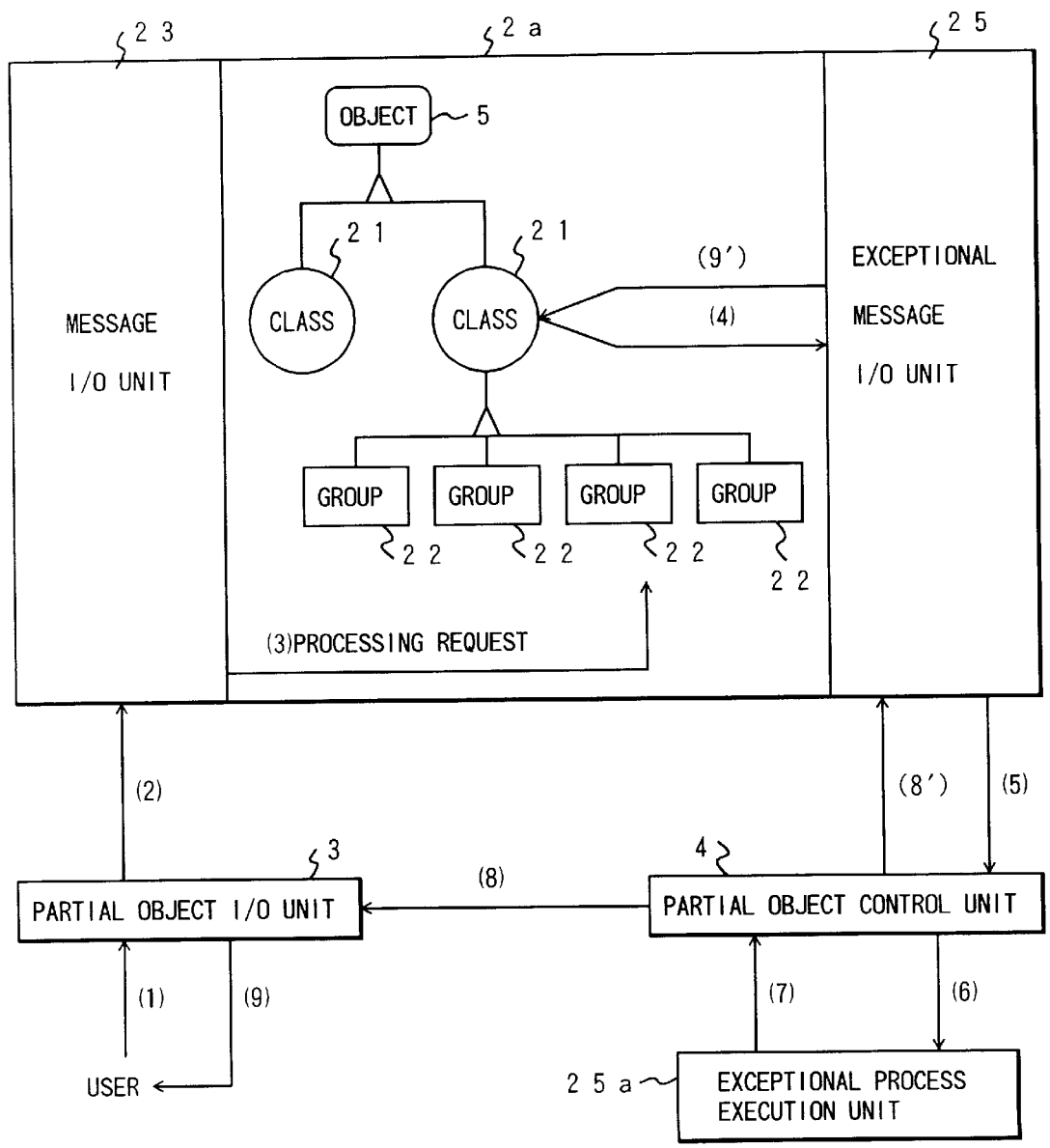
FIG. 12 is a diagram illustrating an example 2 of the data processing according to the present invention.

When the user employs the object lump 2a, as indicated by (1), (2) of FIG. 12, the message is transferred to the object lump 2a via the partial object I/O unit 3.

The object lump 2a requests, as shown by (3) of FIG. 12, the group 22 that the user wants to employ for processing by sending the message thereto. The group 22 starts the work within the group itself. If there is no content of the work, the group 22 requests a high-order class 21 to perform the processing. The class 21 executes the processing requested. In case an exceptional event happens, as indicated by (4), (5) of FIG. 12, the exceptional message is transferred via the exceptional message I/O unit 25 to the partial object control unit 4.

The partial object control unit 4, as shown by (6), (7) of FIG. 12, transfers the message to the exceptional process execution unit 25a. The partial object control unit 4 receives a result of the processing from the exceptional process execution unit 25a which has performed the exceptional process. The partial object control unit 4, as indicated by (8), (9) of FIG. 12, notifies the use of the exceptional event via the partial object I/O unit 3 and, as shown by (8'), (9') of FIG. 12, notifies the object lump 2 of a result of the exceptional process. The processing is thus ended.

<Example 7 of Object Lump 2>

Figure 13:
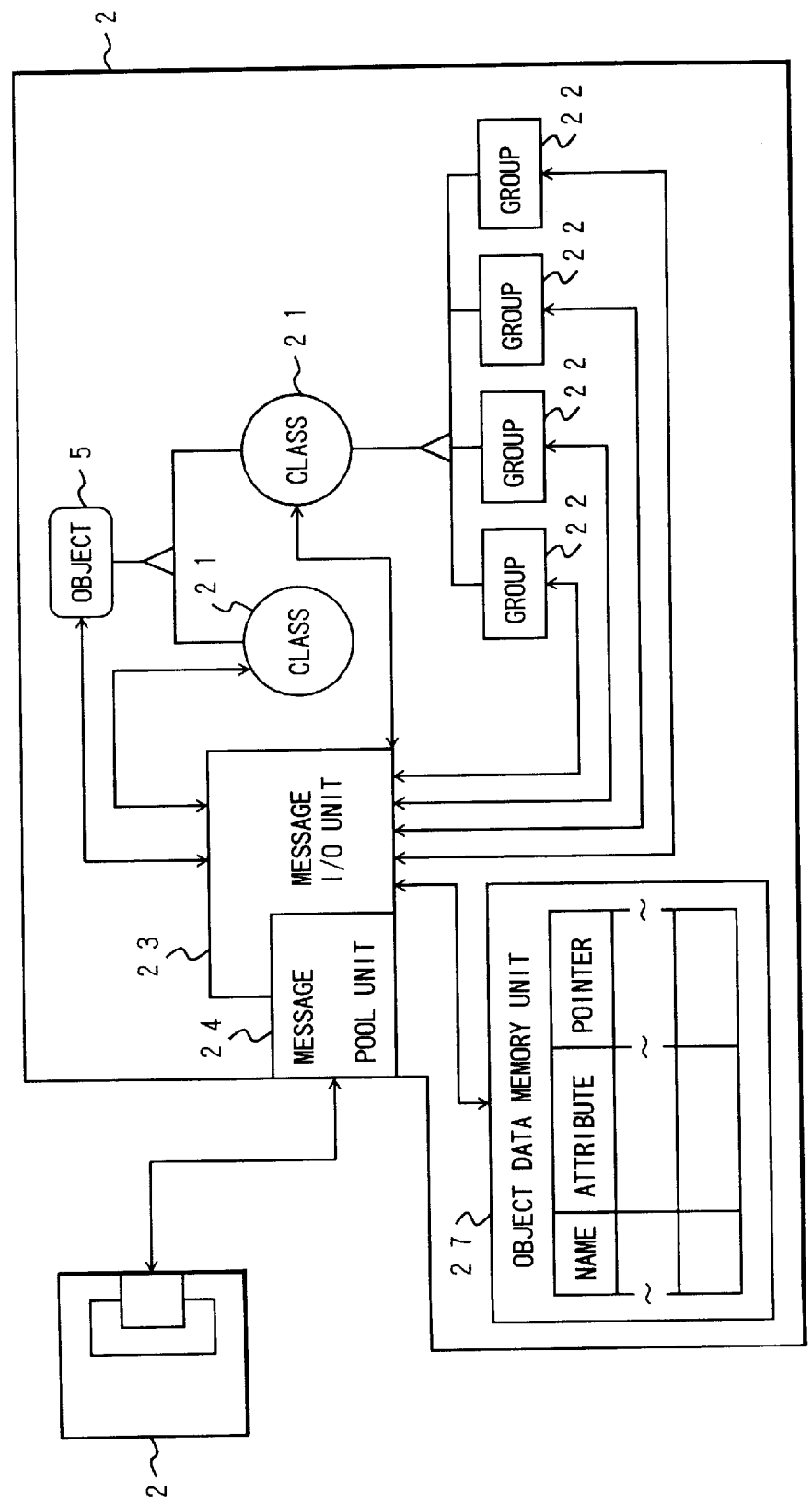
FIG. 13 is a diagram showing an example 7 of the object lump.

FIG. 13 is a diagram illustrating an example 7 of the object lump 2. The object lump 2 illustrated in FIG. 13 includes an object data memory unit 27 for managing pieces of data possessed by the objects 5 constituting the lump. The user obtains, if the user wants to use the object 5 in the lump from outside, the object data needed for using that object 5 by referring to the object data memory unit 27 without tracing to the interior of the lump. In accordance with the embodiment, the message I/O unit 23 refers to the object data memory unit 27.

The object data memory unit 27 manages the names of the groups 22, the classes 21 and the objects 5 constituting the object lump 2, items of restrictions to the operations of the objects 5, the attributes for managing the data about the operations of the objects 5 and pointers for pointing to deploying addresses of the objects 5. Herein, the inheriting operation may involve the use of an operation of the inheritance relationship as done by C++, etc. Further, usages of a memorandum and the message may also be managed.

Note that the object data memory unit 27 may be provided in one of the memory mechanism for an exclusive use, the message pool unit 24 and the object 5. Furthermore, the pointer managed by the object data memory unit 27 gives an indication to execute the object 5 from a pointer destination thereof. For example, there may be performed a process of informing a starting element of the pointer without entering the execution of the object. Further, the management data of the object data memory unit 27 contain identification data and do not therefore necessarily have all items of data. The processing can be carried out by having the required data as the necessity arises.

<Example 8 of the Object Lump 2>

Figure 14:
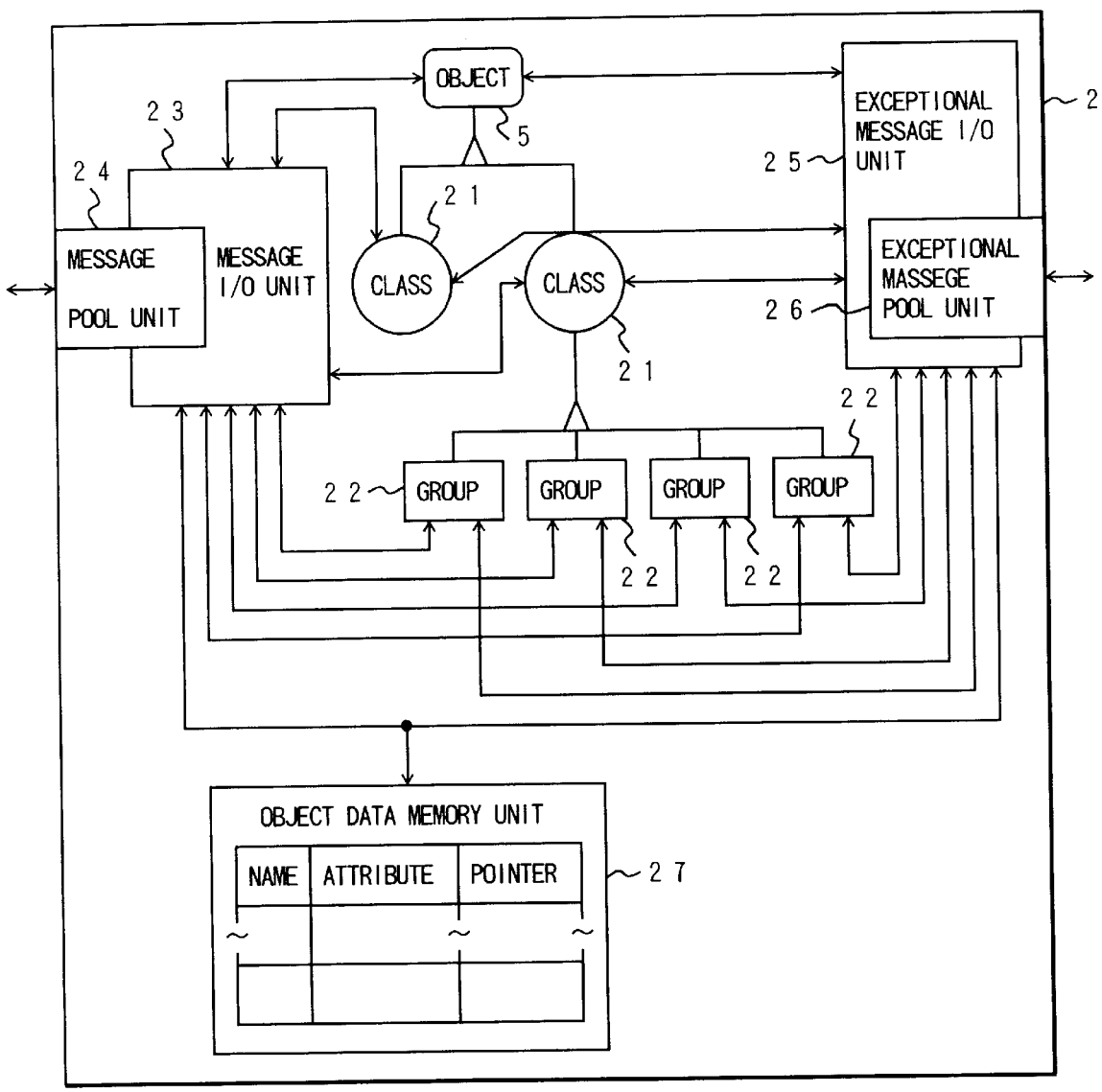
FIG. 14 is a diagram illustrating an example 8 of the object lump.

FIG. 14 is a diagram showing an example 8 of the object lump 2. The object lump 2 illustrated in FIG. 14 includes the message I/O unit 23, the exceptional message I/O unit 25 and the object data memory unit 27. The message I/O unit 23 and the exceptional message I/O unit 25 refer to the object data memory unit 27. The user obtains, if the user wants to use the object 5 in the lump from outside, the object data needed for using that object 5 by referring to the object data memory unit 27 without tracing to the interior of the lump.

It is to be noted that the object data managed by the object data memory unit 27 can be also managed with a separation into normal processing data to which the message I/O unit 23 refers and exceptional processing data to which the exceptional message I/O unit 25 refers. Further, the object data memory unit 27 may be provided in one of the exclusive-use memory mechanism, the message pool unit 24, the exceptional message pool unit 26 and the object 5.

<Example 9 of the Object Lump 2>

Figure 15:
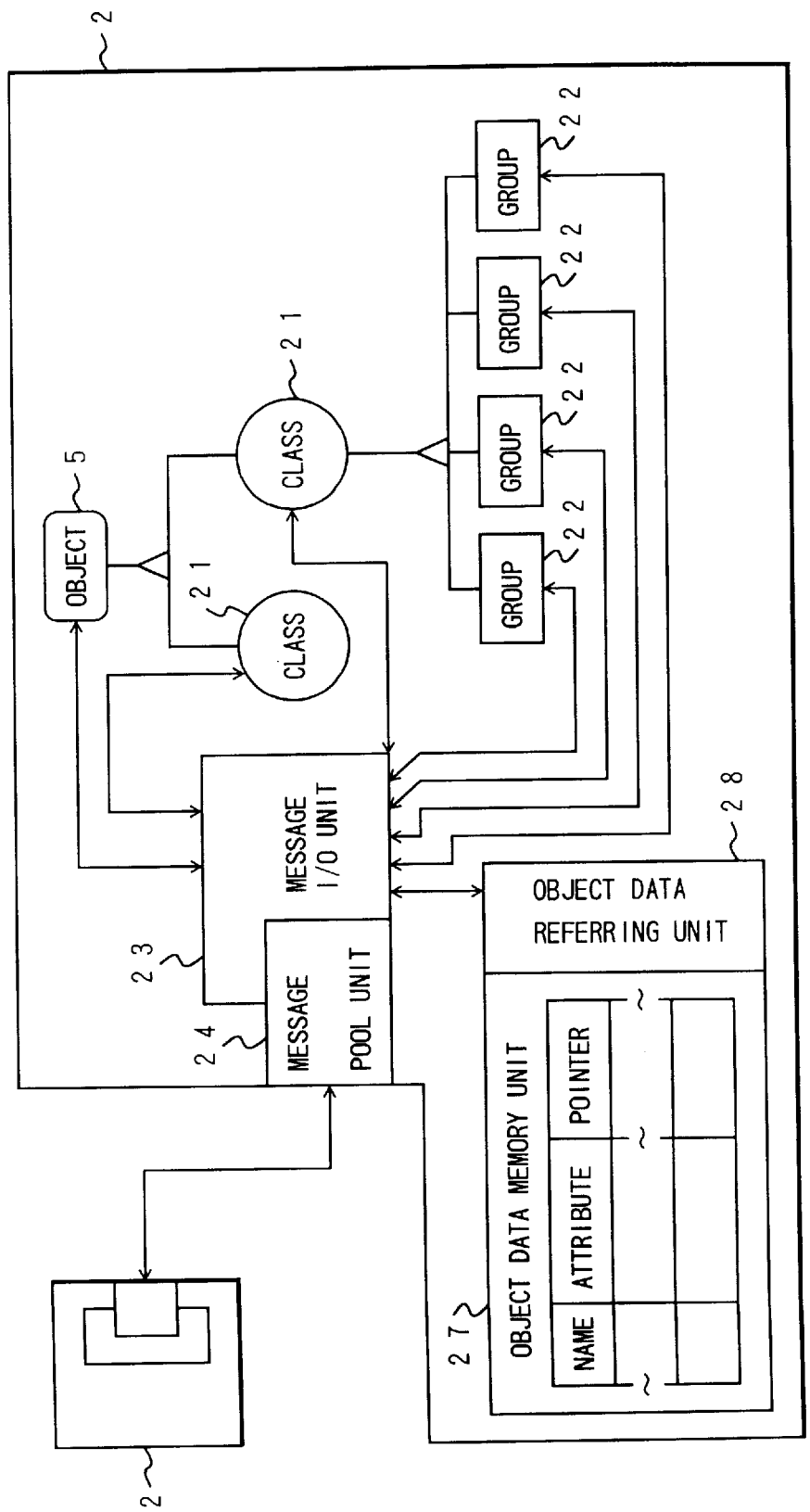
FIG. 15 is a diagram illustrating an example 9 of the object lump.

FIG. 15 is a diagram illustrating an example 9 of the object lump 2. The object lump 2 shown in FIG. 15 includes the object data memory unit 27 and an object data referring unit 28 dedicated to perform a referring process to the object data memory unit 27. The object data referring unit 28 effects the referring process to the object data memory unit 27 in parallel to the message I/O process executed by the message I/O unit 23.

Note that the message I/O unit 23 starts up the object data referring unit 28 which in turn obtains necessary object data from the object data memory unit 27 in this embodiment. The object data referring unit 28 is independently provided in the lump. Therefore, other object lumps 2 and the user are also capable of obtaining the required object data by transferring and receiving the message directly to and from the object data referring unit 28. Further, the object data referring unit 28 may refer to the object data memory unit 27 and the message I/O unit 23.

<Example 3 of Data Processing>

Figure 16:
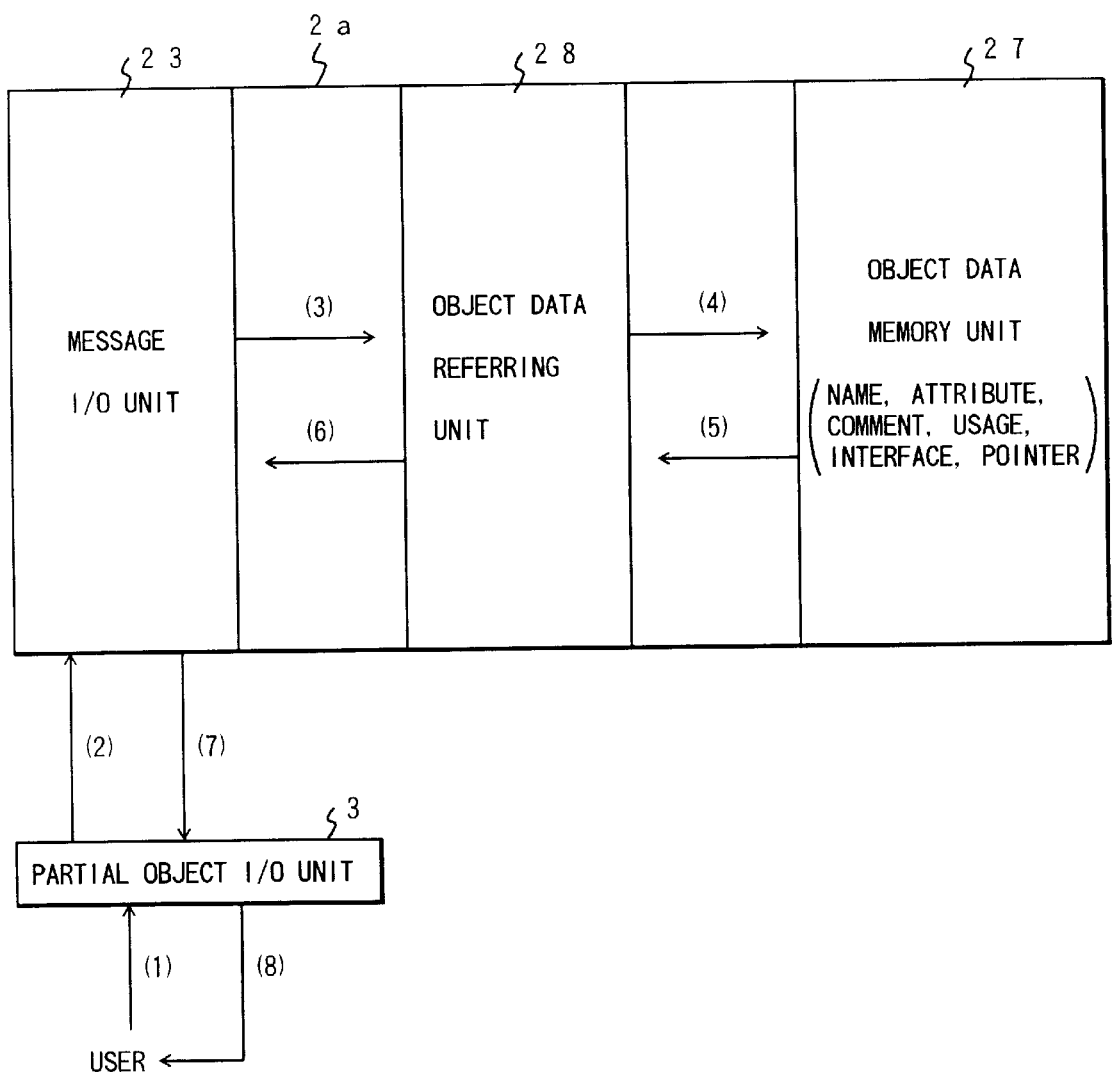
FIG. 16 is a diagram showing an example 3 of the data processing according to the present invention.

Given next is an explanation of an example 3 of the data processing executed by use of the object lump 2 shown in FIG. 15 with reference to FIG. 16.

When the user employs the object lump 2a and wants to know a name and a usage of the specified object 5 possessed by the lump 2a, the user transfers a message with this effect to the object lump 2a via the partial object I/O unit 3 as indicated by (1), (2) of FIG. 16.

In the object lump 2a, as indicated by (3), (4) of FIG. 16, the object data referring unit 28 refers to the object data memory unit 27, thereby obtaining the data about the name and the usage of the object 5 needed by the user as shown by (5), (6) of FIG. 16. As indicated by (7), (8) of FIG. 16, the user is informed of the obtained data via the partial object I/O unit 3, and the processing is thus ended.

<Example 10 of Object Lump 2>

Figure 17:
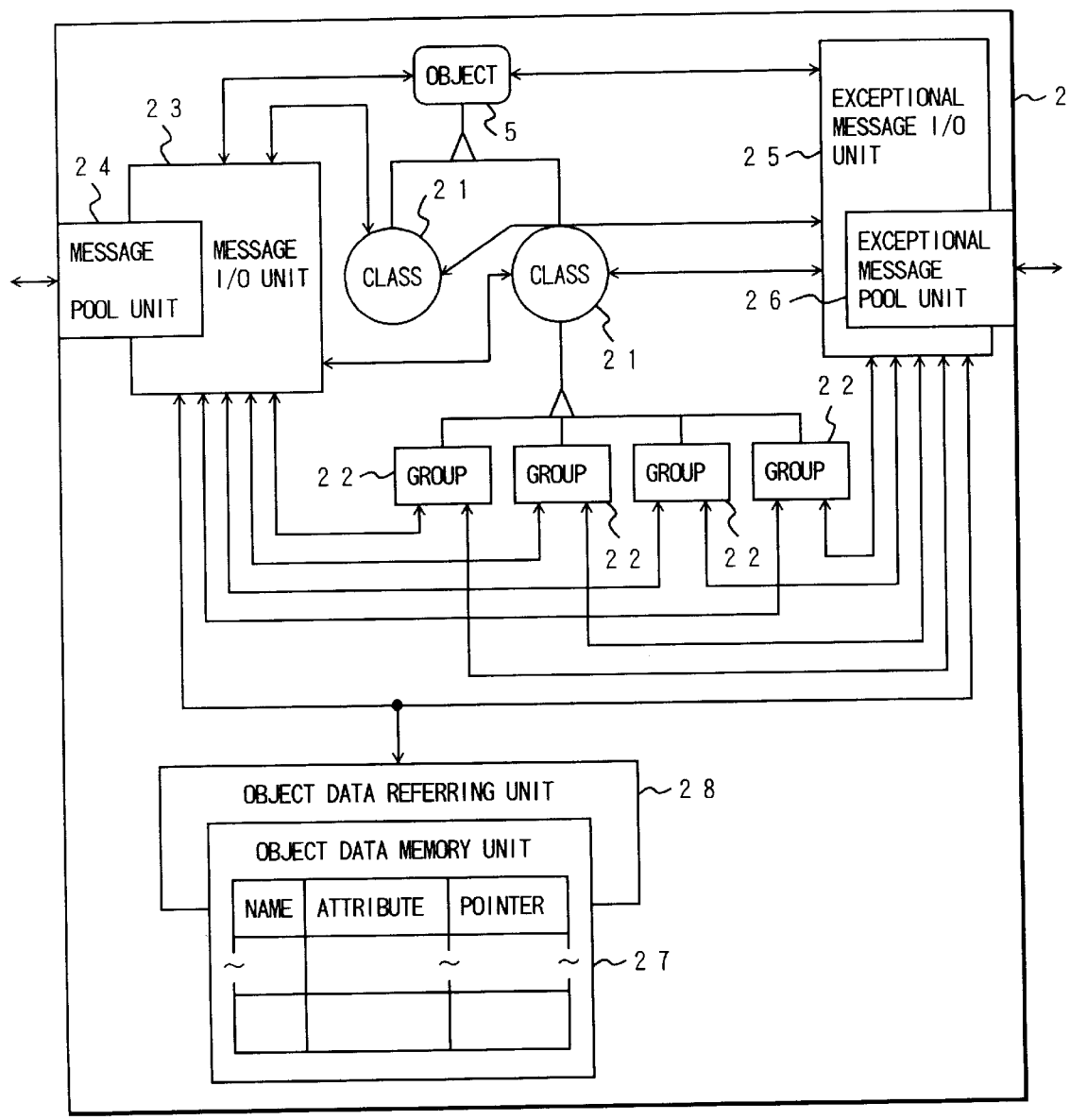
FIG. 17 is a diagram showing an example 10 of the object lump.

FIG. 17 is a diagram illustrating an example 10 of the object lump 2. The object lump 2 shown in FIG. 17 includes the message I/O unit 23, the exceptional message I/O unit 25, the object data memory unit 27 and the object data referring unit 28. The object data referring unit 28 refers to the object data memory unit 27 in parallel to the message I/O process effected by the message I/O unit 23 and the exceptional message I/O process conducted by the exceptional message I/O unit 25.

Note that the message I/O unit 23 and the exceptional message I/O unit 25 start up the object data referring unit 28. The object data referring unit 28 obtains a necessary item of object data from the object data memory unit 27. The object data referring unit 28 is provided independently in the lump. Other object lumps 2 and the user are also capable of acquiring the required object data by transferring and receiving the message directly to and from the object data referring unit 28.

Further, the object data referring unit 28 may also refer to the object data memory unit 27, the message I/O unit 23 and the exceptional message I/O unit 25. Additionally, the object data managed by the object data memory unit 27 can be also managed with the separation into the normal processing data to which the message I/O unit 23 refers and the exceptional processing data to which the exceptional message I/O unit 25 refers. Corresponding thereto, the object data referring unit 28 may also be separated into two subunits.

<Example 11 of Object Lump 2>

Figure 18:
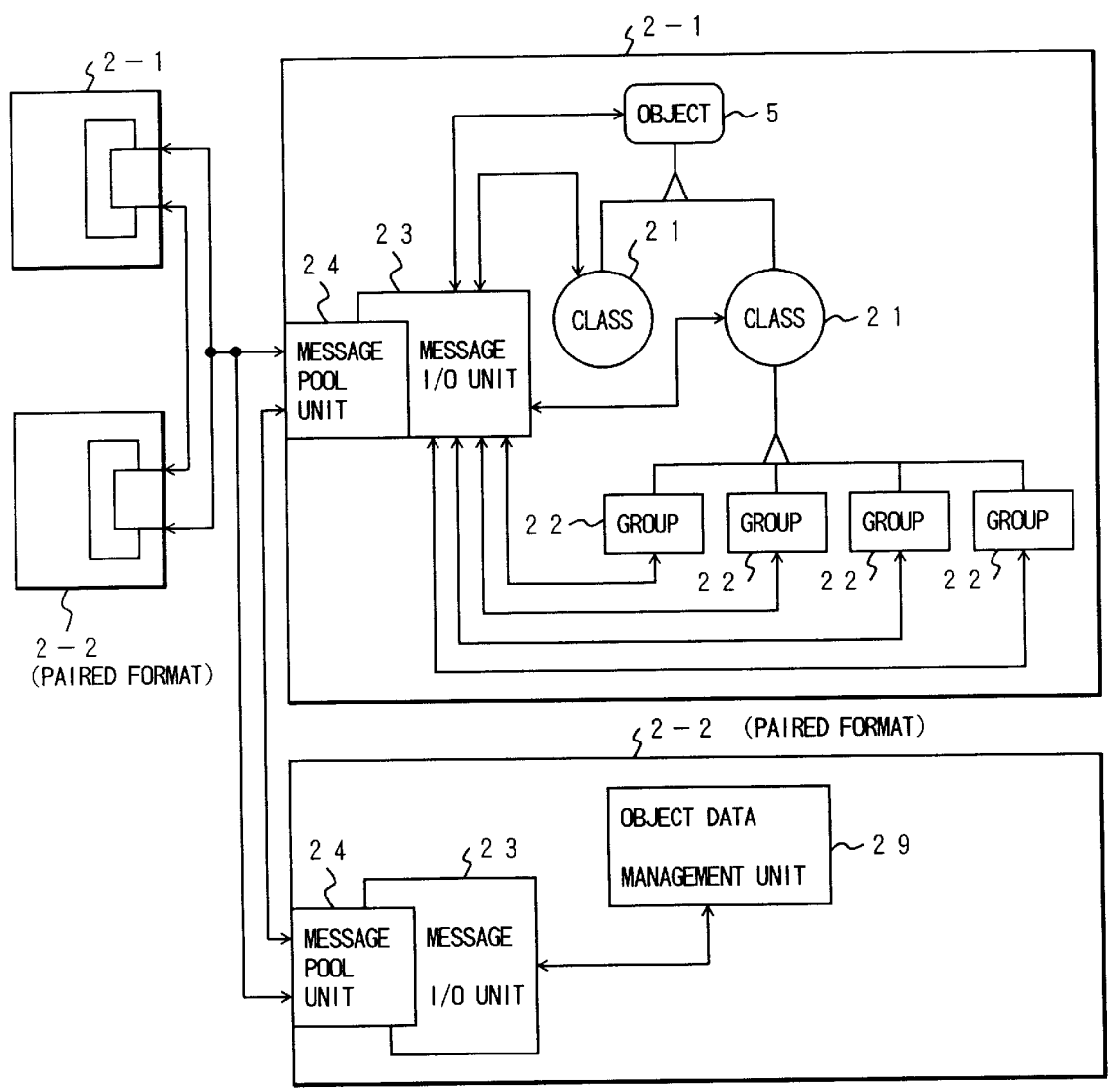
FIG. 18 is a diagram illustrating an example 11 of the object lump.

FIG. 18 is a diagram illustrating an example 11 of the object lump 2. An object lump 2-2 illustrated in FIG. 18 is paired with a specified object lump 2-1. The object lump 2-2 manages pieces of object data (name, attribute, pointer and comment, etc.) possessed by the object lump 2-1 paired therewith by use of the closed attribute inheritance relationship. The object lump 2-2 includes the object data memory unit 27 and an object data management unit 29 incorporating the function of the object data referring unit 28.

More specifically, there is prepared the object lump 2-2 for managing the object data for knowing the object 5 constituting the lump separately from the object lump 2-1 for performing the operation. These two object lumps 2-1, 2-2 are operable in parallel by independently transferring and receiving the messages.

Note that the object lump 2-2 is also capable of causing the message pool unit 24 and the objects 5 of its own to have some items of the object data managed by the object lump 2-1 paired therewith.

<Example 12 of Object Lump 2>

Figure 19:
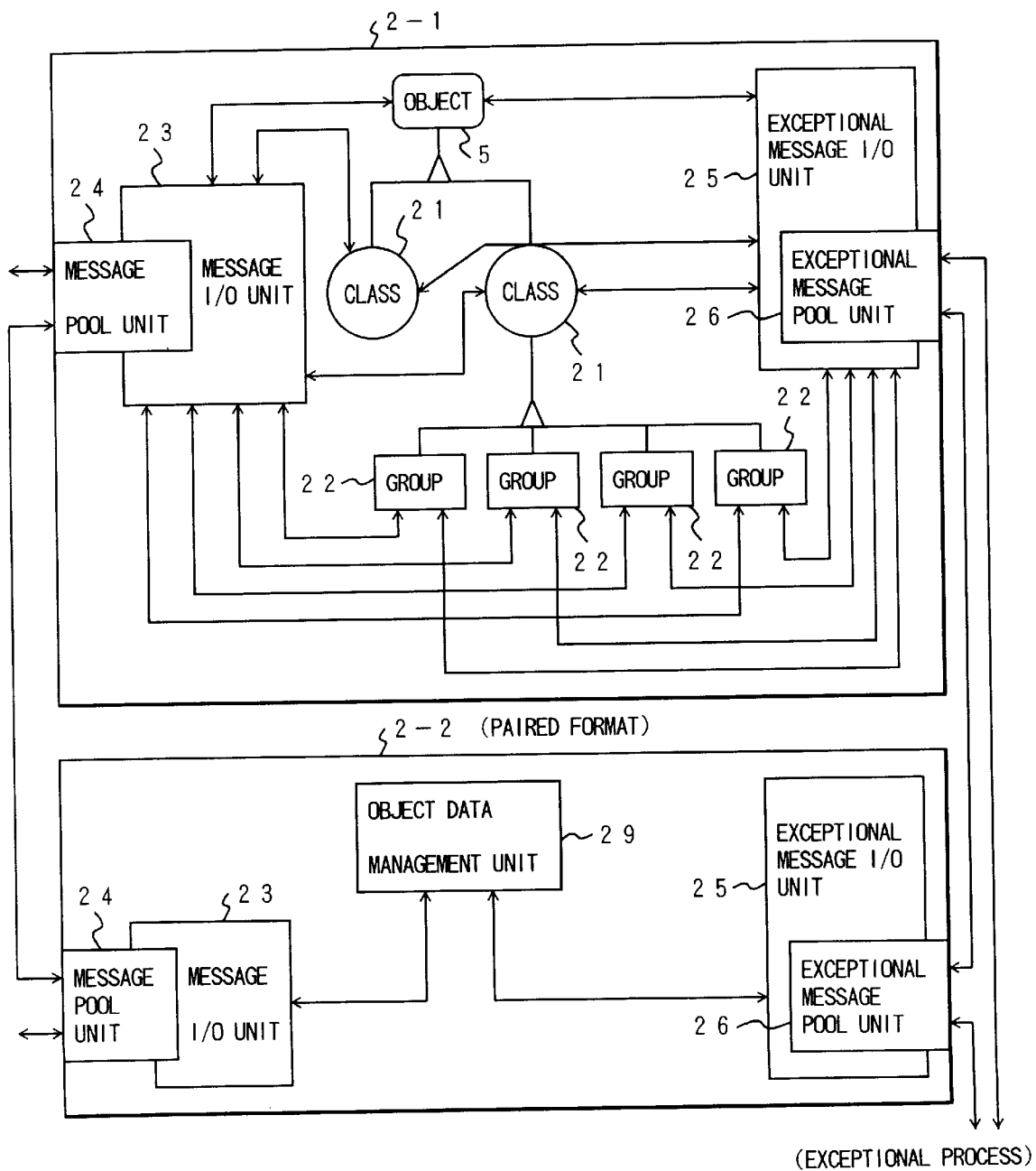
FIG. 19 is a diagram illustrating an example 12 of the object lump.

FIG. 19 is a diagram showing an example 12 of the object lump 2. The object lumps 2-1, 2-2 shown in FIG. 19 further includes, in addition to the constructive example illustrated in FIG. 18, the exceptional message I/O unit 25 and the exceptional message pool unit 26.

That is, in accordance with this embodiment, when the message is transferred and received by use of the exceptional message I/O unit 25, another object lump 2-2 is paired with the specified object lump 2-1. Another object lump 2-2 manages the object data possessed by the object lump 2-1 by use of the closed attribute inheritance relationship.

Note that the object lump 2-2 may cause the message pool unit 24, the exceptional message pool unit 26 and the objects 5 of its own to have some items of the object data managed by the object lump 2-1 paired therewith. Further, the object lump 2-2 managing the object data does not include the exceptional message I/O unit 25 but is also capable of directly transferring and receiving the exceptional message to and from the object data management unit 29.

<Example 13 of Object Lump 2>

FIG. 20 is a diagram illustrating an example 13 of the object lump 2. In this embodiment, the paired-form shown in FIG. 18 is not adopted, but another object lump 2-3 managing the object data possessed by a plurality of object lumps 2-1 by use of the closed attribute inheritance relationship is prepared. Another object lump 2-3 includes the above object data memory unit 27 and the object data referring unit 28. A plurality of object lumps 2-3 may be prepared.

In the embodiment illustrated in FIG. 20, a larger number of object lumps 2-3 for managing the object data than in the embodiments shown in FIGS. 18 and 19 can be reduced.

It is to be noted that all the object lumps 2-3 for managing the object data are preferably registered in a machine (server) for an exclusive use and then controlled but may be dispersed and registered in a plurality of machines. Further, the object lump 2-1 may cause the message pool unit 24 and the objects 5 of its own to have some items of object data managed by another object lump 2-3.

<Example 14 of Object Lump 2>

Figure 21:
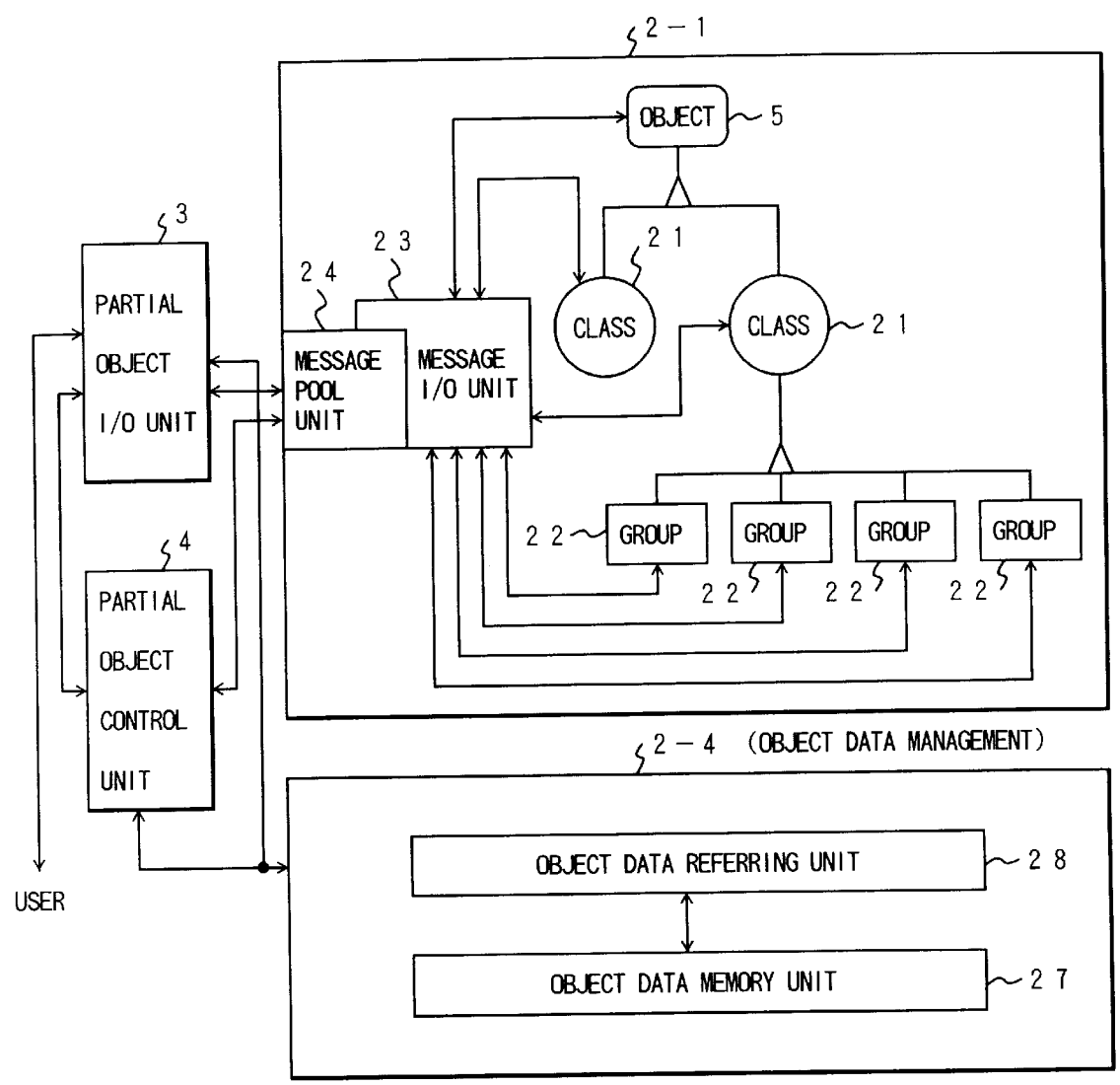
FIG. 21 is a diagram illustrating an example 14 of the object lump.

FIG. 21 is a diagram showing an example 14 of the object lump 2. In the embodiment shown in FIG. 20, the object lump 2-1 itself, which requires the object data, transfers and receives the messages directly to and from the object lump 2-3 for managing the object data, thereby obtaining the object data.

In an embodiment illustrated in FIG. 21, the partial object control unit 4 manages an object lump 2-4 for managing the object data. The object lump 2-4 has the object data memory unit 27 and the object data referring unit 28. The object lump 2-1 requiring the object data obtains the object data from the object lump 2-4 via the partial object control unit 4.

<Example 15 of Object Lump 2>

Figure 22:
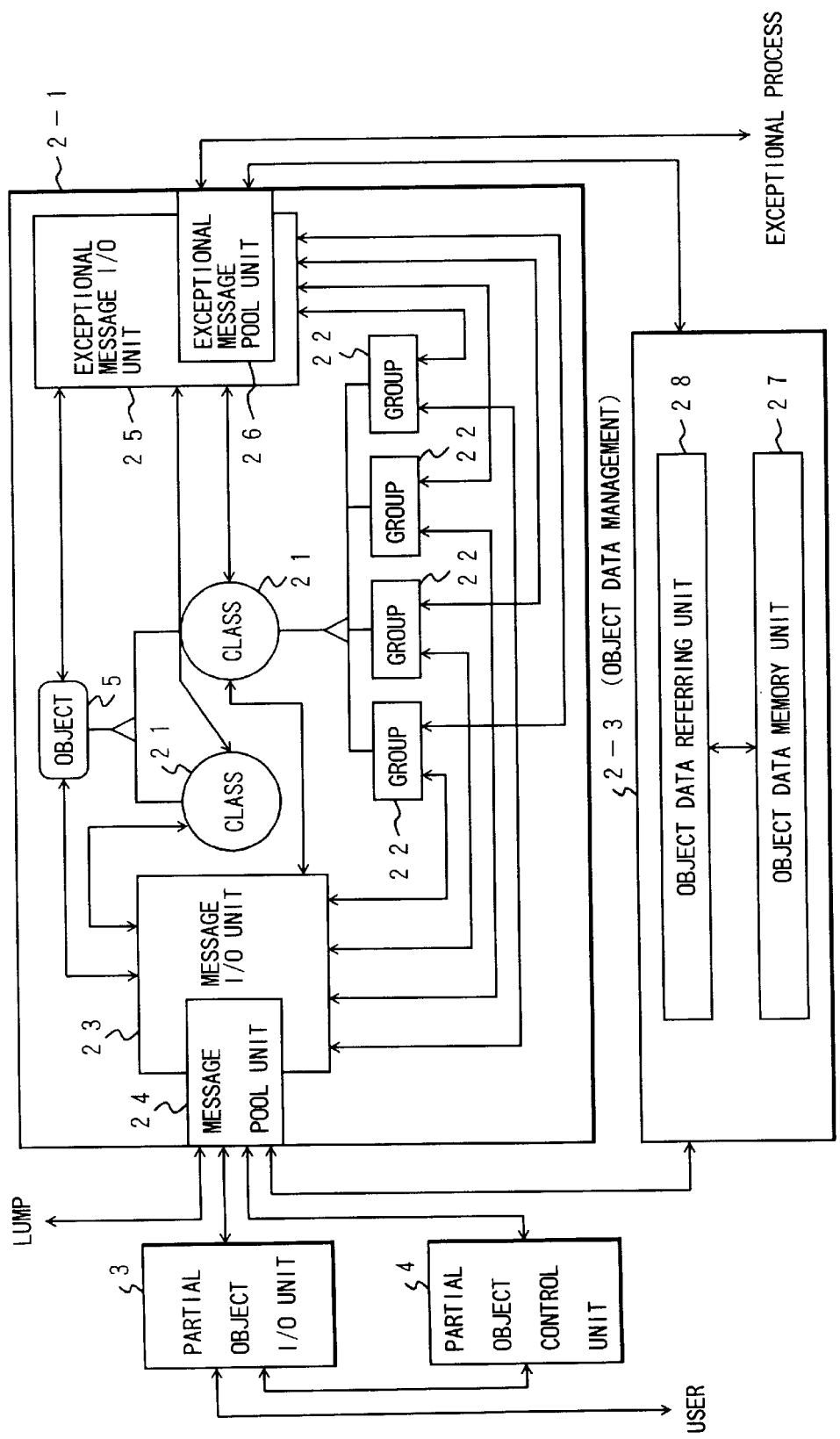
FIG. 22 is a diagram illustrating an example 15 of the object lump.

FIG. 22 is a diagram illustrating an example 15 of the object lump 2. In an embodiment shown in FIG. 22, the object lump 2-1 includes, in addition of the construction shown in FIG. 20, the exceptional message I/O unit 25 and the exceptional message pool unit 26. That is, in this embodiment, when the exceptional message I/O unit 25 transfers and receives the exceptional process message, another object lump 2-3 manages the object data possessed by the plurality of object lumps 2 by use of the closed attribute inheritance relationship without taking the paired-form.

Note that the object lump 2-1 may cause of the message pool unit 24, the exceptional message pool unit 26 and the objects 5 of its own to have some items of object data managed by another object lump 2-3.

<Example 16 of Object Lump 2>

Figure 23:
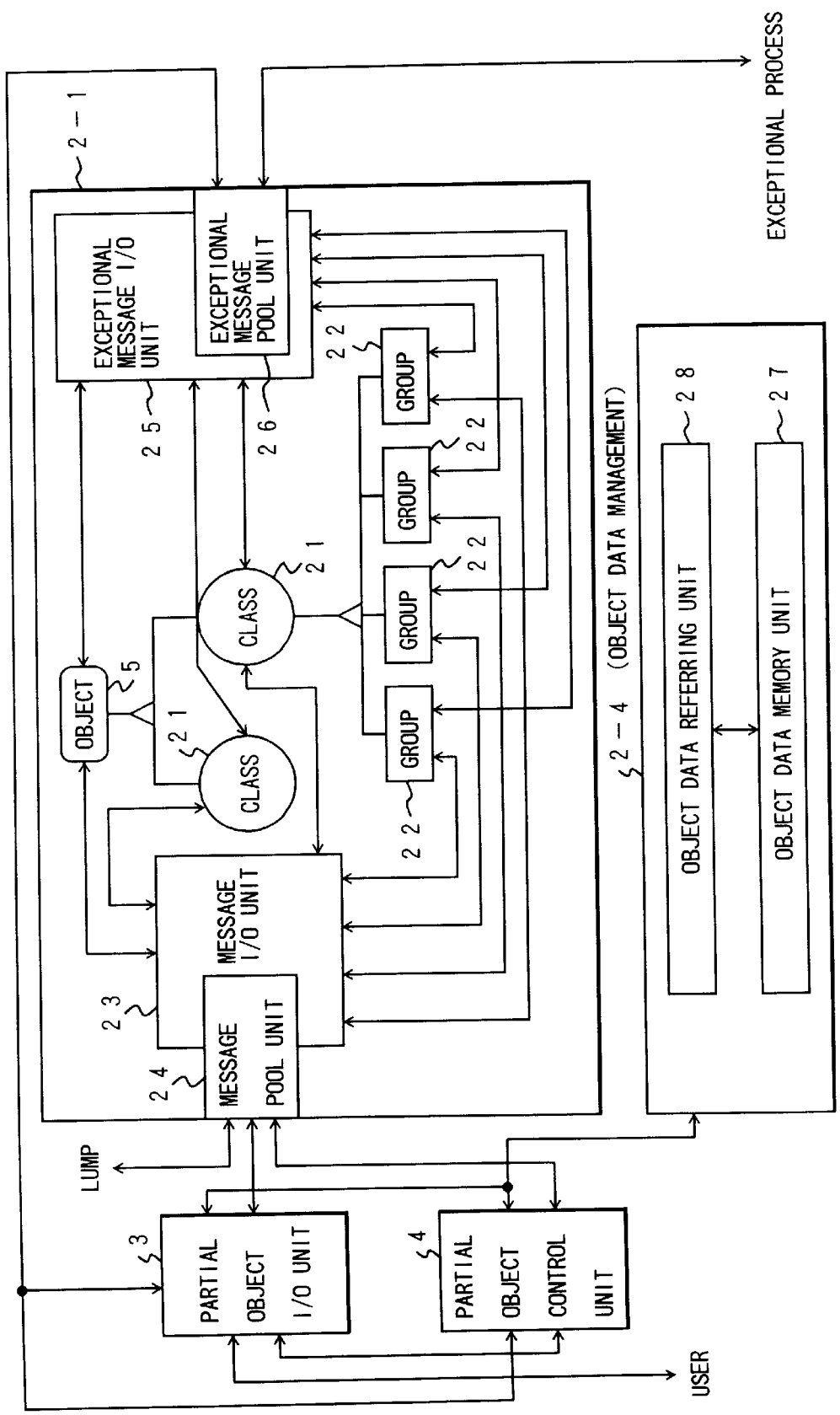
FIG. 23 is a diagram showing an example 16 of the object lump.

FIG. 23 is a diagram showing an example 16 of the object lump 2. In accordance with an embodiment illustrated in FIG. 23, the object lump 2-1 includes, in addition of the construction shown in FIG. 21, the exceptional message I/O unit 25 and the exceptional message pool unit 26.

That is, in this embodiment, when the exceptional message I/O unit 25 transfers and receives the exceptional process message, another object lump 2-4 manages the object data possessed by the plurality of object lumps 2-1 by use of the closed attribute inheritance relationship without taking the paired-form.

<Example 17 of Object Lump 2>

Figure 24:
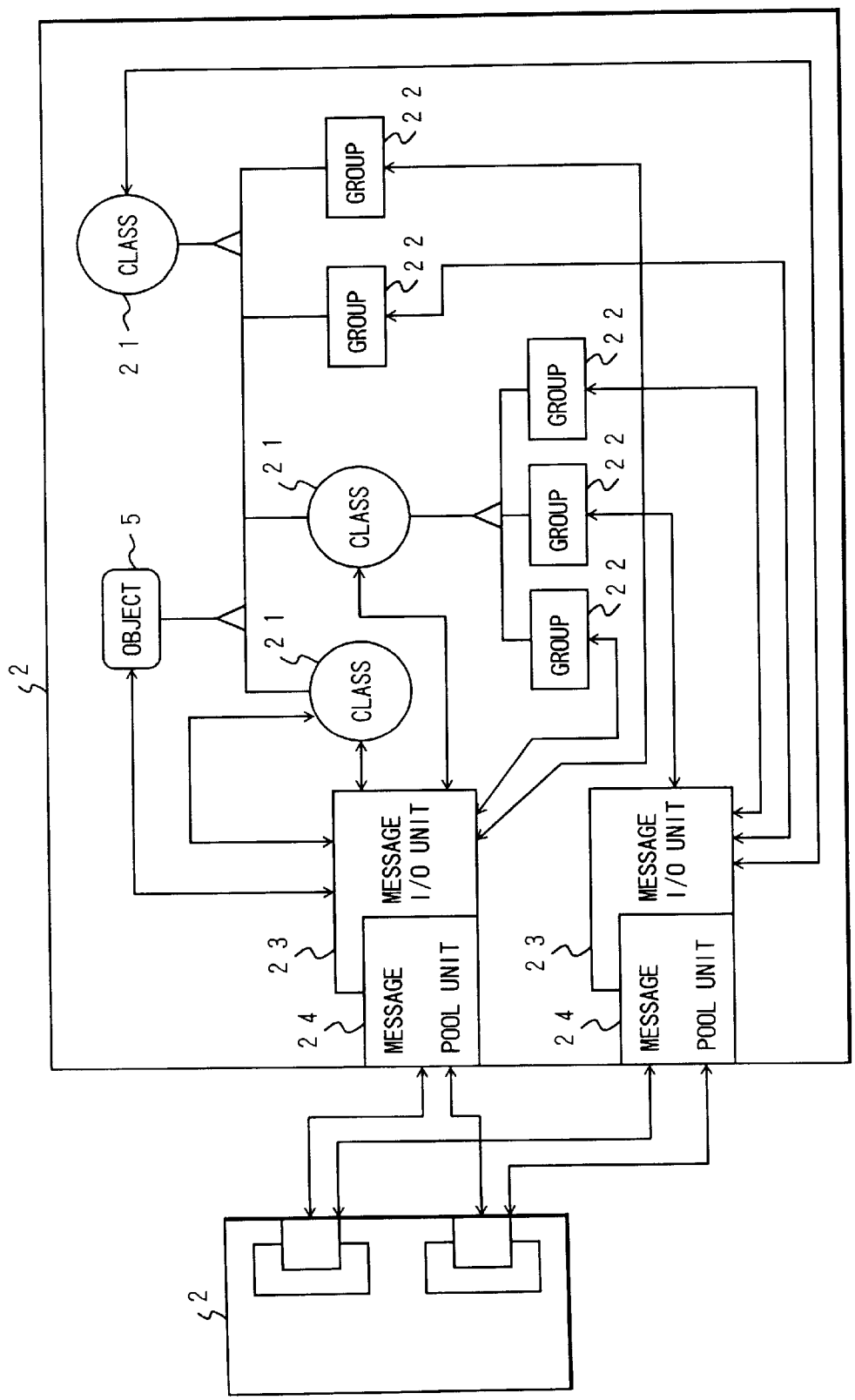
FIG. 24 is a diagram showing an example 17 of the object lump.

FIG. 24 is a diagram showing an example 17 of the object lump 2. In an embodiment shown in FIG. 8, the object lump 2 has the single piece of message I/O unit 23 and the single message pool unit 24. In accordance with an embodiment illustrated in FIG. 24, the object lump 2 includes the plurality of message I/O units 23 and the plurality of message pool units 24 and separately employs the message I/O unit 23 and the message pool unit 24 according to a content of the work.

In this case, it is possible to transfer and receive the messages to and from the plurality of object lumps 2 in parallel. If the same object lump 2 has a plurality of works in mixture, the message is transferred and received by using the message I/O unit 23 corresponding to the worker. Accordingly, the data of the worker can be unified.

<Example 18 of Object Lump 2>

FIG. 25 is a diagram illustrating an example 18 of the object lump 2. In the embodiment illustrated in FIG. 11, the object lump 2 includes one exceptional message I/O unit 25 and one exceptional message pool unit 26. In an embodiment illustrated in FIG. 25, the object lump 2 includes the plurality of exceptional message I/O units 25 and the plurality of exceptional message pool units 26 and separately employs the exceptional message I/O units 25 to be used corresponding to exceptional events.

If the exceptional event happens, pieces of exceptional occurrence data can be classified in the object lump 2, and the exceptional process can be executed in accordance with a degree of necessity. The operations of the exceptional process can be performed in parallel by taking a correspondence relationship between the exceptional message I/O unit 25 and a content of the work conducted by the exceptional process execution unit 25a.

<Example 3 of Exceptional Process>

Figure 26:
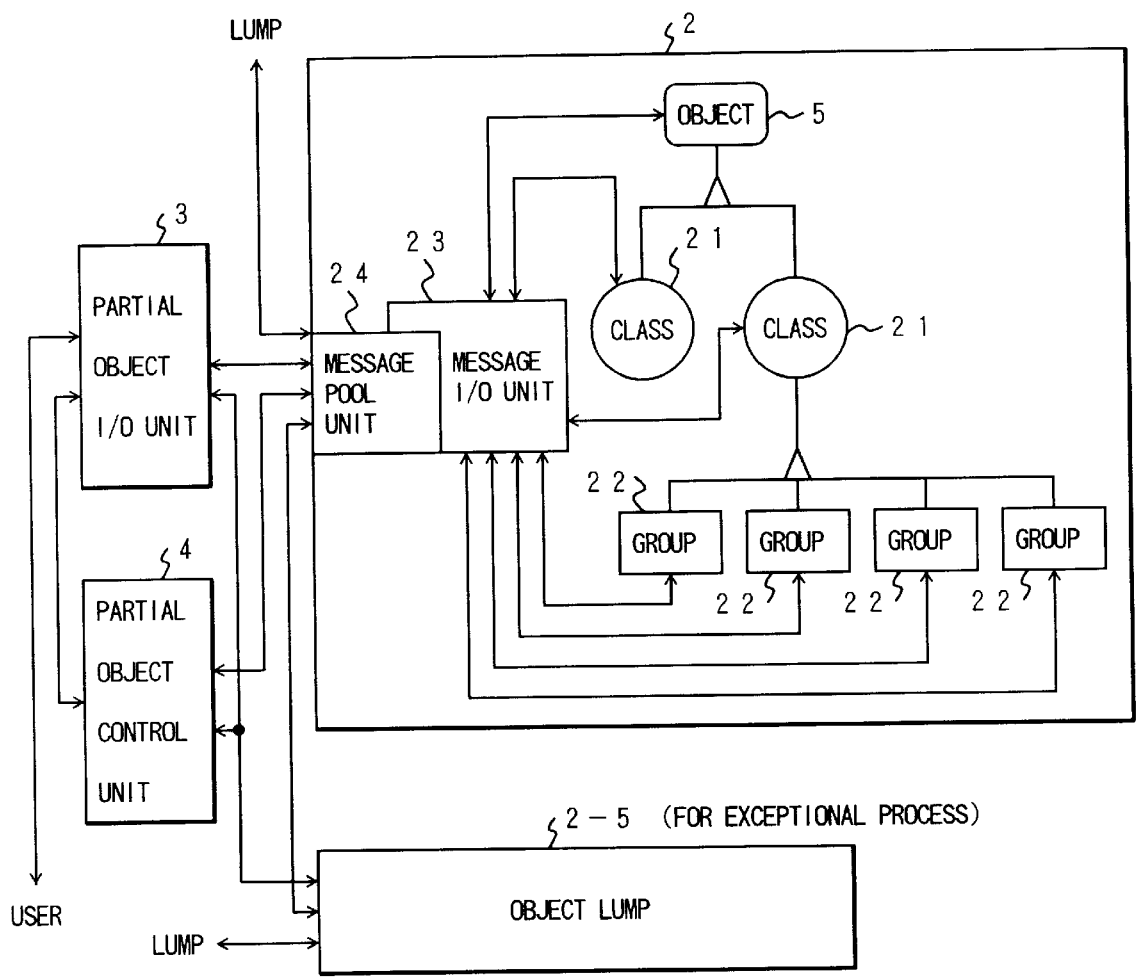
FIG. 26 is a diagram illustrating an example 3 of the construction for executing the exceptional process.

FIG. 26 is a diagram showing, if an exceptional process is produced during the operation of the object lump 2, an example 3 of the construction for executing this exceptional process.

In the embodiment shown in FIG. 10, the exceptional process is executed by using the exceptional process execution unit 25a. In accordance with an embodiment illustrated in FIG. 26, an object lump 2-5 for performing the exceptional process that has the closed attribute inheritance relationship is prepared.

Thus, the exceptional process is also treated as the object lump 2 and operates by transferring and receiving the message. It is possible to perform the processing in parallel to other object lump 2. The exceptional process is capable of operating while bearing the attribute inheritance relationship. Further, when a new exceptional process is added, an added portion is registered. A basic process exclusive of the added portion is carried out by use of the attribute inheritance relationship, and, therefore, the new exceptional process can be easily added.

<Example 4 of Exceptional Process>

Figure 27:
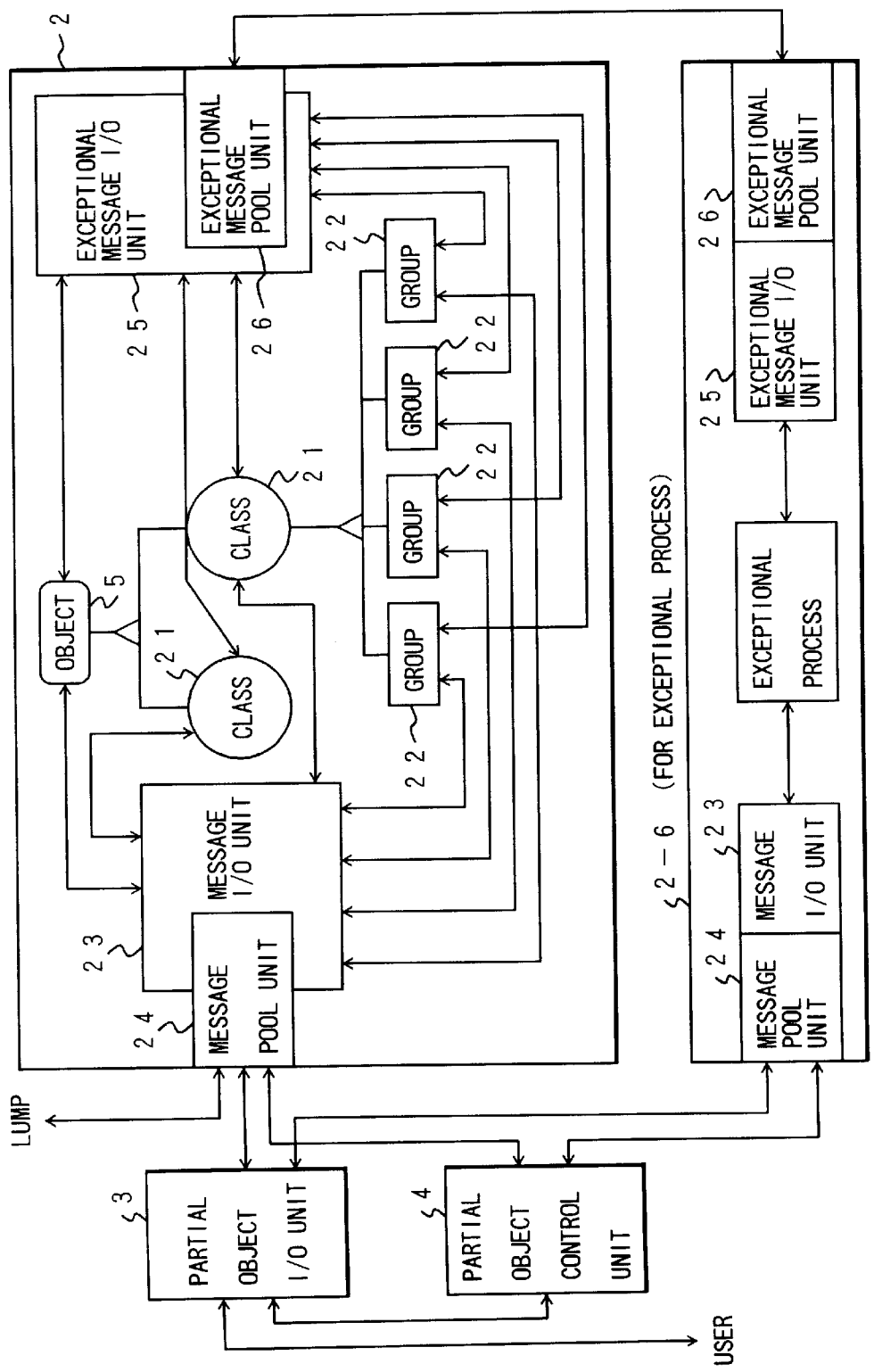
FIG. 27 is a diagram showing an example 4 of the construction for executing the exceptional process.

FIG. 27 is a diagram showing, if the exceptional process is produced during the operation of the object lump 2, an example 4 of the construction for executing this exceptional process. In the embodiment shown in FIG. 26, the object lump 2 transfers the message of the exceptional process to the object lump 2-5 for performing the exceptional process employing the message I/O unit 23.

In accordance with an embodiment illustrated in FIG. 27, the object lump 2 and an object lump 2-6 include the exceptional message I/O unit 25 and the exceptional message pool unit 26. The object lump 2 transfers the message of the exceptional process to the object lump 2-6 for executing the exceptional process by sue of the exceptional message I/O unit 25 of its own.

The object lump 2 is capable of notifying the user of the exceptional event and transferring the exceptional process message to the object lump 2-6 for effecting the exceptional process in parallel.

<Example 5 of Exceptional Process>

FIG. 28 is a diagram showing, if the exceptional process is produced during the operation of the object lump 2, an example 5 of the construction for executing this exceptional process. In the embodiment shown in FIG. 26, one object lump 2-6 for performing the exceptional process is only provided. In accordance with an embodiment illustrated in FIG. 27, a plurality of object lumps 2-6 for executing the exceptional process are provided corresponding to the exceptional events.

Thus, the exceptional process is also treated as the object lump 2 and operates by transferring and receiving the message. It is therefore possible to perform the processing in parallel to the object lump 2-6 for another exceptional process as well as to other object lump 2.

Further, the plurality of object lumps 2, for effecting the exceptional process, bearing the attribute inheritance relationship perform the exceptional process while transferring and receiving the messages to and from each other. Therefore, a plurality of exceptional events and a single exceptional event are operable while combining the processes. Further, the messages are transferred and received with combinations of the plurality of exceptional processes, and hence a new exceptional process can be carried out.

<Example 6 of Exceptional Process>

FIG. 29 is a diagram showing, if the exceptional process is produced during the operation of the object lump 2, an example 6 of the construction for executing this exceptional process. In the embodiment shown in FIG. 27, the single object lump 2 for executing the exceptional process is provided. In accordance with an embodiment illustrated in FIG. 29, a plurality of object lumps 2-6 for executing the exceptional processes corresponding to the exceptional events are prepared.

<Example 19 of Object Lump>

FIG. 30 is a diagram showing an example 19 of the object lump 2. In this embodiment, the object lump 2 has an ID password memory unit 30 and an ID password matching unit 31.

The ID password memory unit 30 manages an identifier (ID) and a password. The ID password matching unit 31 determines whether or not an ID and a password that are designated from outside are identical with an ID and a password that are stored in the ID password memory unit 30. If the ID and the password that are designated from outside are identical with the ID and the password that are stored in the ID password memory unit 30, the ID password matching unit 31 permits the operation of the object lump 2. A fine line in FIG. 30 indicates a flow of the message. Bold lines indicate flows of registering and controlling the ID and the password as well.

In this case, if the users who should use the object lump 2 are limited, and when making an attempt not to cause the object lump 2 to easily operate, the ID and the password are designated. Hence, only the specified users whose ID and password are identical therewith are allowed to operate the object lump 2.

Note that the ID and the password are checked on an object lump 2 basis in this example. For instance, on the units of the object 5, the class 21 and the group 22, the ID and the password may be checked.

Also, the ID and the password may be controlled by a man or by the object lump 2. Further, in this embodiment, the ID and the password are controlled through the partial object control unit 4. For example, the ID and the password can be checked between the object lumps 2 and between the users via the partial object I/O unit 3 by making use of the management through the transfer and receipt of the messages of the ID and the password. Moreover, the IDs and the passwords can be controlled en bloc by providing the object lump 2 for controlling the ID and the password.

Additionally, the mechanism for checking the ID and the password may be provided in the partial object control unit 4 and the partial object I/O unit 3. In this case, the IDs and the passwords are controlled en bloc.

Furthermore, the ID and the password may involve the use of character strings or the use of moving pictures, still pictures and voices. For example, voice data, differential data by an ADPCM, voice pitch data and characteristic points in terms of variations by power spectrum may also be employed as the IDs and passwords themselves. Alternatively, functions of the IDs and of the passwords can be enhanced by adding those elements to the ID and the password. A point-of-variation in the moving picture and variation data of a body which appears may also be available as the IDs and passwords themselves. It is to be noted that data about a command name, a software name and a comment may also involve the use of the moving picture, the still picture and the voices.

<Example 4 of Data Processing>

Figure 31:
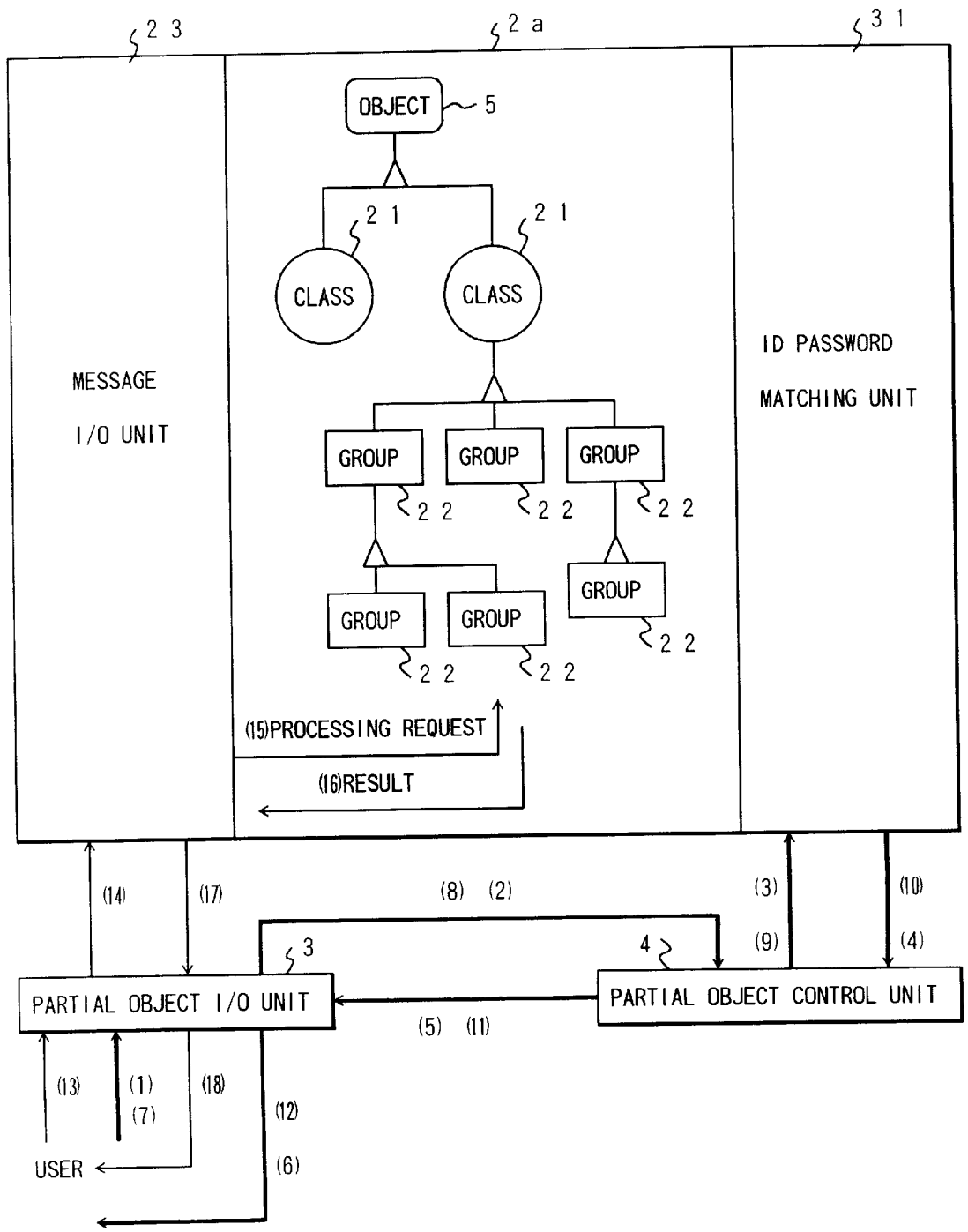
FIG. 31 is a diagram showing an example 4 of the data processing according to the present invention.

Next, with reference to FIG. 31, there will be described an example 4 of the data processing executed by use of the object lump 2 in accordance with the construction of the embodiment of FIG. 30. A fine line in FIG. 31 indicates a flow of the message, while bold lines indicate flows of approvals of the ID and the password. Encircled numeric values represent a sequence of processing.

When the user employs the object lump 2a, an approval of using the object lump 2a is acquired by the ID and the password via the partial object I/O unit 3 and the partial object control unit 4. When the approval of use is acquired, a message of a request for the processing is transferred via the partial object I/O unit 3 to the object lump 2a.

The object lump 2a executes the processing by transferring the message to the object 5 the user wants to use and obtains a result thereof. The user is informed of the thus obtained processing result via the partial object I/O unit 3, and the processing comes to an end. Herein, the object lump 2a may also be employed by a man or other object lump 2.

Figure 32:
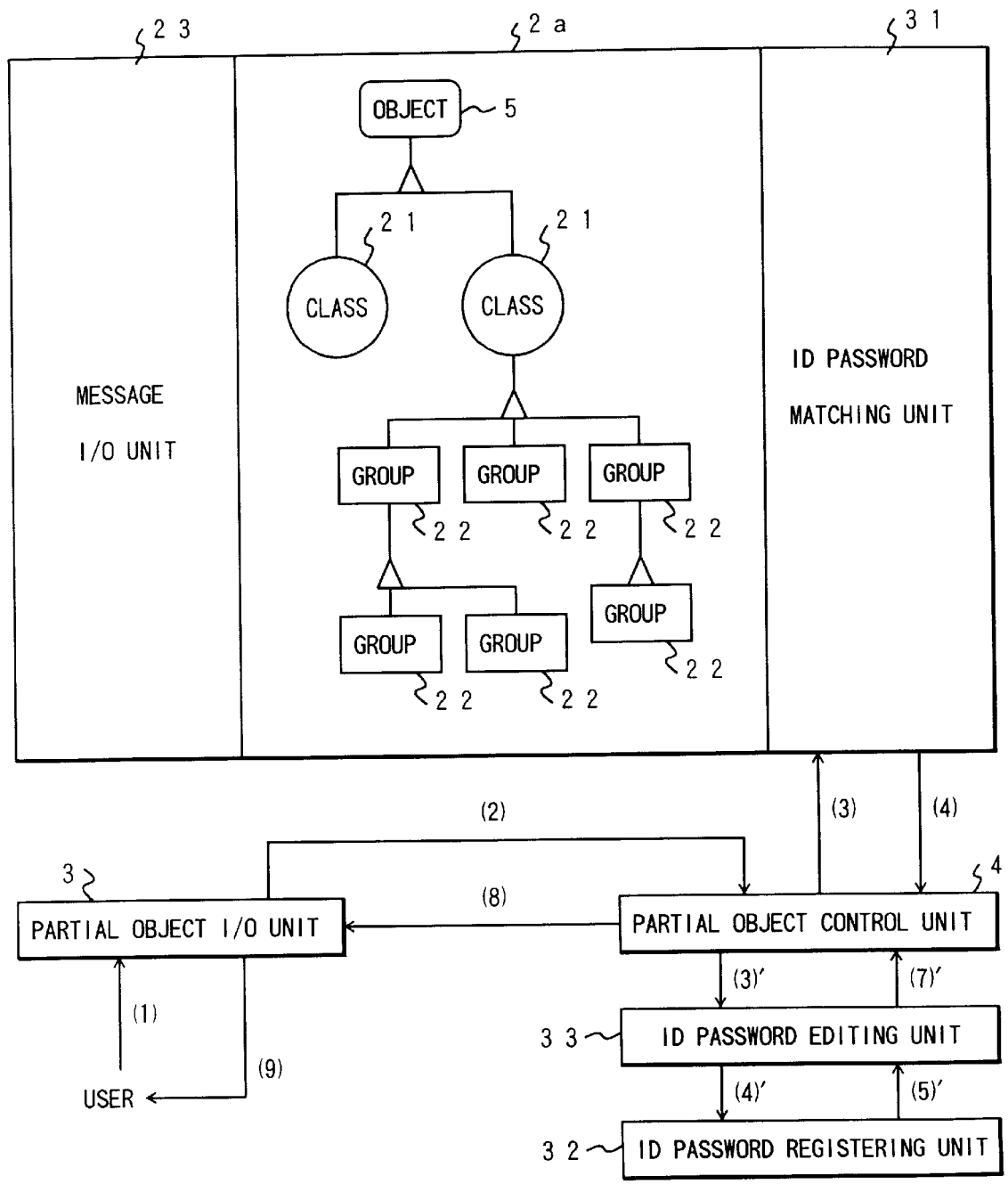
FIG. 32 is a diagram of assistance in explaining a process of registering an ID and a password.

Note that a process of registering the ID and the password is shown in FIG. 32. In this example, the ID password registering unit 32 and an ID password editing unit 33 are provided separately from the object lump 2. The ID password registering unit 32 registers and manages the ID and the password that are inputted from the user. The ID password editing unit 33 deletes and changes the ID and the password that are registered in the ID password registering unit 32.

Furthermore, ID and the password may also be registered by a man or by the object lump 2.

<Example 20 of Object Lump>

Figure 33:
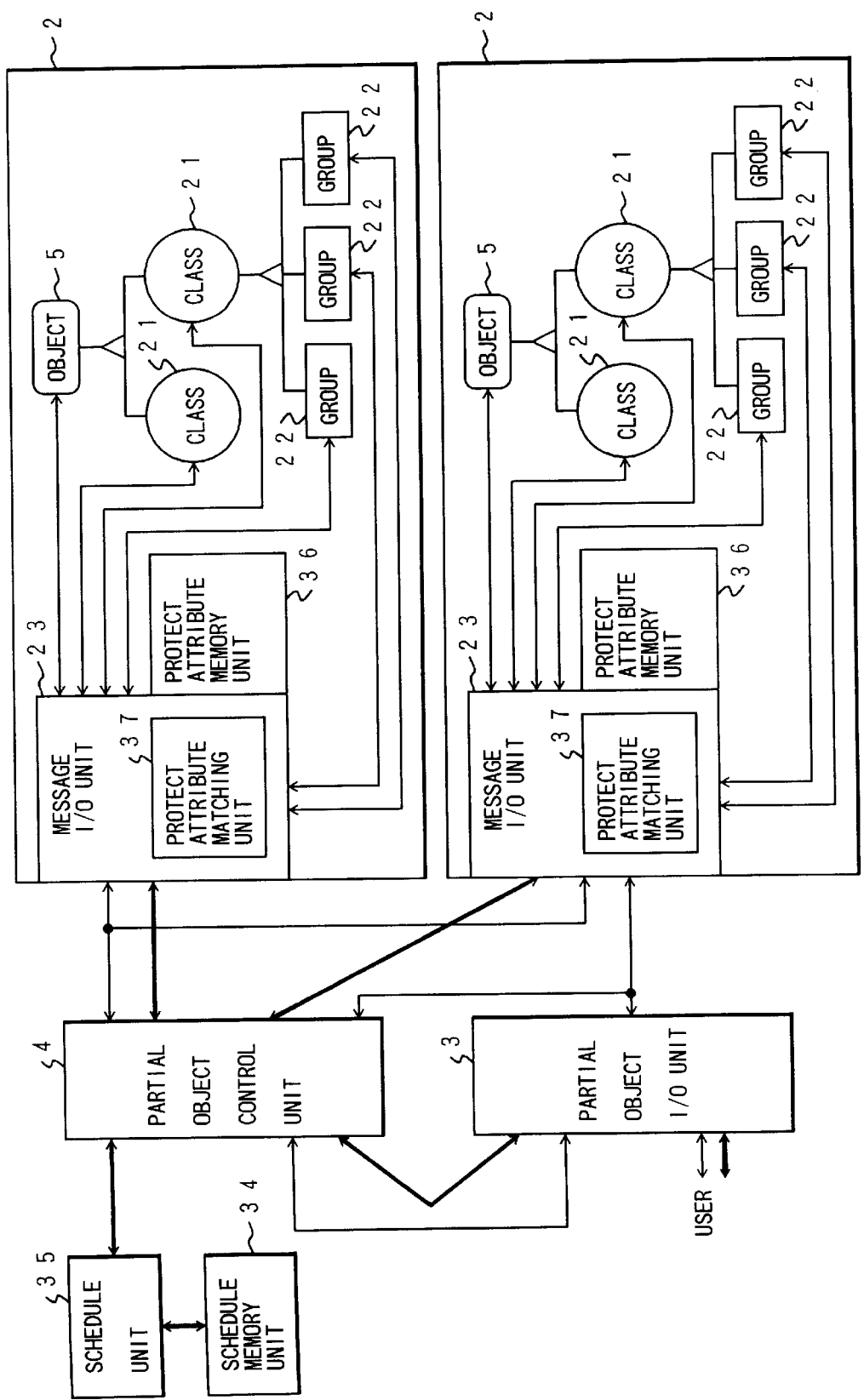
FIG. 33 is a diagram illustrating an example 20 of the object lump.

FIG. 33 illustrates an example 20 of the object lump 2. In accordance with this embodiment, a schedule memory unit 34 and a schedule unit 35 are provided. The schedule memory unit 34 stores working conditions and a working schedule of working time. The schedule unit 35 operates the object lump 2 on the basis of the working schedule stored in the schedule memory unit 34.

Further, the object lump 2 includes a protect attribute memory unit 36 and a protect attribute matching unit 37. The protect attribute memory unit 36 manages a protect attribute described while being made corresponding to the working schedule. The protect attribute matching unit 37 determines whether or not a protect attribute designated from outside is coincident with the protect attribute stored in the protect attribute memory unit 36.

If the protect attribute designated from outside is coincident with the protect attribute stored in the protect attribute memory unit 36, the protect attribute matching unit 37 permits the operation of the object lump 2. A fine line in FIG. 33 indicates a flow of the message, while bold lines indicate flows of registering and controlling the protect attribute.

Based on such a construction, the use of the object lump 2 is locked or unlocked depending on a working situation, thus obtaining a right of use of the object lump 2. Accordingly, it is possible to protect the operation of the unnecessary object lumps 2 and the object lumps 2 having similar names.

Note that the protect attribute may be checked on the object lump 2 basis or on an object 5 basis or class 21 basis or group 22 basis. Further, the protect attribute may be controlled by a man or by the object lump 2. Moreover, in accordance with this embodiment, the message is transferred and received via the partial object control unit 4 between the schedule unit 35 and the object lump 2. For example, the message may be transferred and received directly between the schedule unit 35 and the object lump 2 through no intermediary of the partial object control unit 4.

Further, in this embodiment, the single schedule unit 35 is prepared. A plurality of schedule units 35 may be prepared corresponding to cases where a plurality of works are carried out. Additionally, in this embodiment, the schedule unit 35 is managed by the partial object control unit 4. For instance, the schedule unit 35 may be constructed of the object lump 2. In this case, the object lump 2 operates according to the attribute inheritance relationship, and, therefore, the plurality of schedule units 35 can be operated in parallel.

<Example 5 of Data Processing>

Figure 34:
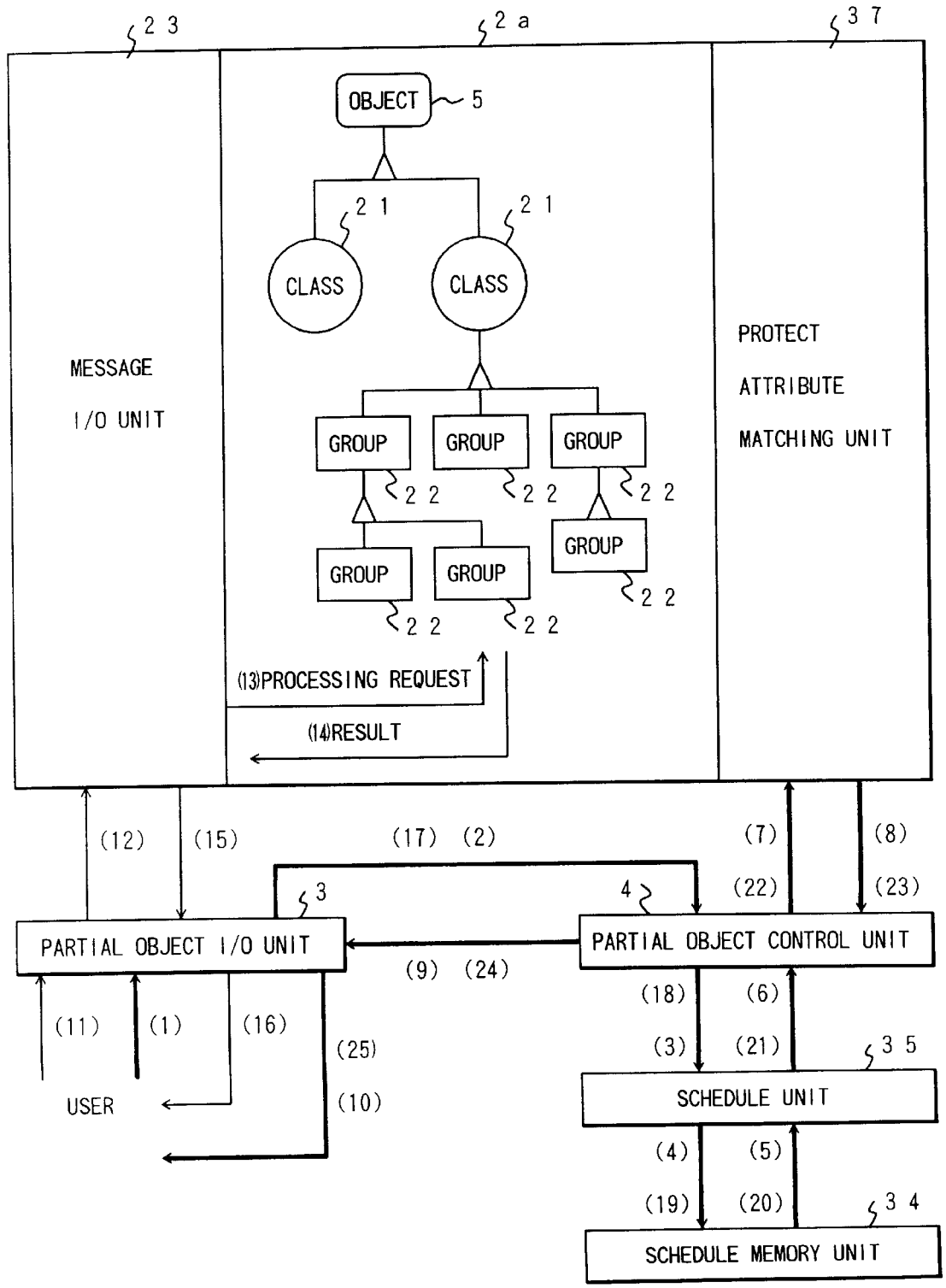
FIG. 34 is a diagram showing an example 5 of the data processing according to the present invention.

Next, an example 5 of the data processing executed by use of the object lump 2 shown in FIG. 33 will be discussed with reference to FIG. 34. A fine line in FIG. 34 indicates a flow of the message, while a bold line indicates a flow of approval of the protect attribute. Encircled numeric values show a sequence of processing.

The user makes, when the user performs the work, the schedule memory unit 34 to register a working schedule described with the protect attribute. At this time, the protect attribute is registered in the protect attribute memory unit 36 possessed by the object lump 2 on the basis of the registered working schedule.

The protect attribute matching unit 37 determines whether or not the protect attribute designated from outside is identical with the protect attribute stored in the protect attribute memory unit 36. If the object lump 2a shown in FIG. 34 is identical with the object lump assuming the same protect attribute as the protect attribute designated by the working schedule, the user is able to use this object lump 2a.

Therefore, the work is performed by operating the object lump 2a. After finishing the work, a measure to inhibit the use of the object lump 2a by changing the protect attribute possessed by the object lump 2a is taken, and the processing is ended. The object lump 2a may be employed by a man or other object lump.

<Example 21 of Object Lump>

Figure 35:
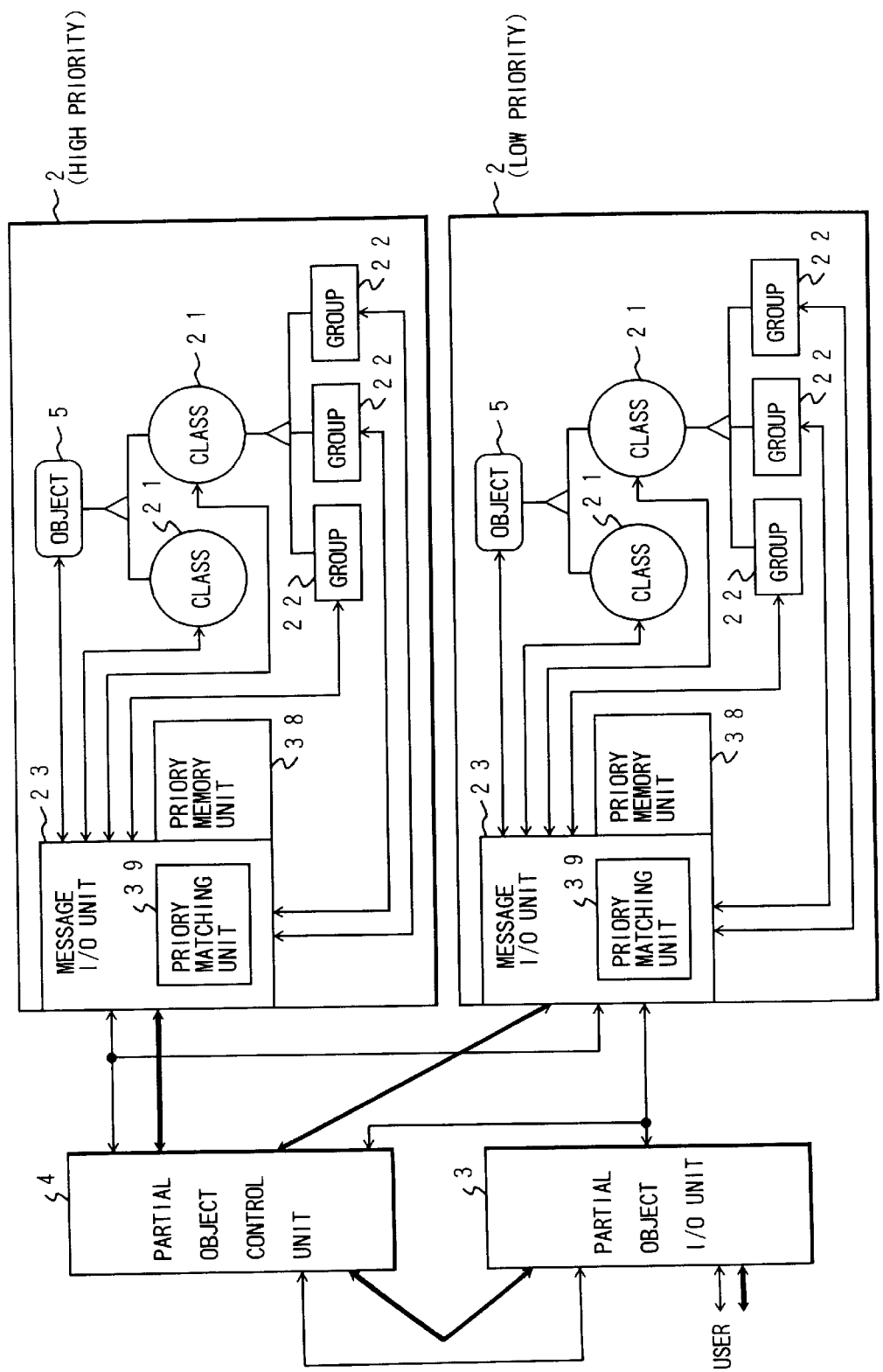
FIG. 35 is a diagram illustrating an example 21 of the object lump.

FIG. 35 is a diagram illustrating an example 21 of the object lump. In this embodiment, the object lump 2 includes a priority memory unit 38 and a priority matching unit 39. The priority memory unit 38 manages a priority. The priority matching unit 39 determines whether or not the priority designated from outside is identical with a priority stored in the priority memory unit 38.

The priority matching unit 39 permits, if the priority designated from outside is identical with the priority stored in the priority memory unit 38, the operation of the object lump 2. A fine line in FIG. 35 indicates a flow of the message, while bold lines indicate flows of registering and controlling the priority.

If the plurality of object lumps 2 having different priorities but having the same name exist, the priorities are designated from outside. It is therefore possible to operate the object lump 2 with the identified priority.

For example, if the plurality of object lumps 2 having the same name that carry out the same slip processing work exist, it is feasible to operate the object lumps 2 adapted to levels of an organization including a chief of division and a chief of section. With this operation, though the works are similar, when a specified part of the work is changed or added by the user, the work corresponding thereto can be effected.

Note that the priority may be checked on the object lump 2 basis or on the object 5 basis or class 21 basis or group 22 basis. Further, the priority may be controlled by a man or by the object lump 2.

Also, in accordance with this embodiment, the priority is controlled through the partial object control unit 4. The priority can be checked between the object lumps 2 and between the users via the partial object I/O unit 3 by making use of the management through the transfer and receipt of the message of the priority.

Furthermore, the priorities are also controllable en bloc by providing the object lump 2 for controlling the priorities. A mechanism for checking the priorities is provided in the partial object control unit 4 and in the partial object I/O unit 3, whereby the priorities can be controlled en bloc.

<Example 22 of Object Lump>

Figure 36:
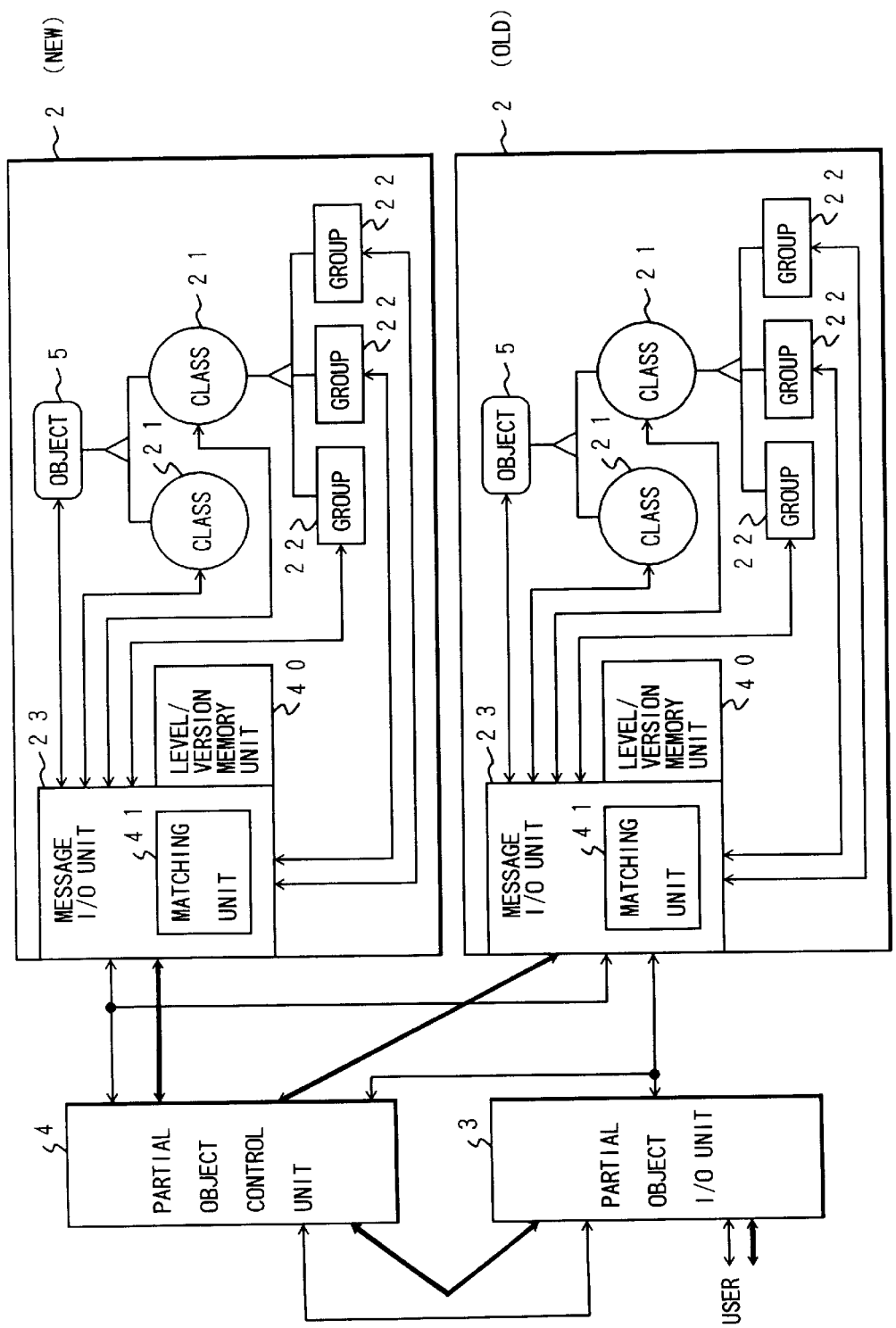
FIG. 36 is a diagram showing an example 22 of the object lump.

FIG. 36 is a diagram showing an example 22 of the object lump. In this embodiment, the object lump 2 includes a level/version memory unit 40 and a level/version matching unit 41.

The level version memory unit 40 manages a level/version. The level/version matching unit 41 determines whether or not a level/version designated from outside is identical with a level/version stored in the level/version memory unit 40. The level/version matching unit 41, if the level/version designated from outside is identical with the level/version stored in the level/version memory unit 40, permits the operation of the object lump 2. A fine line in FIG. 36 indicates a flow of the message, while bold lines indicate flows of registering and controlling the level/version.

If the plurality of object lumps 2 having different levels/versions but having the same name exist, the level/version is designated. It is therefore possible to operate the object lump 2 with the identified level/version, and hence the object lump 2 of the level/version required by the user can be operated. For example, if the data are usable only by an old level/version, and when the data can be accessed only by a new level/version, that work can be done.

Note that the level/version may be checked on the object lump 2 basis or on the object 5 basis or class 21 basis or group 22 basis. Further, the level/version may be controlled by a man or by the object lump 2.

Also, in accordance with this embodiment, the level/version is controlled through the partial object control unit 4. The level/version can be checked between the object lumps 2 and between the users via the partial object I/O unit 3 by making use of the management through the transfer and receipt of the message of the level/version.

Furthermore, the levels/versions are also controllable en bloc by providing the object lump 2 for controlling the levels/versions. In addition, a mechanism for checking the level/version is provided in the partial object control unit 4 and in the partial object I/O unit 3, whereby the levels/versions can be controlled en bloc.

<Example 23 of Object Lump>

Figure 37:
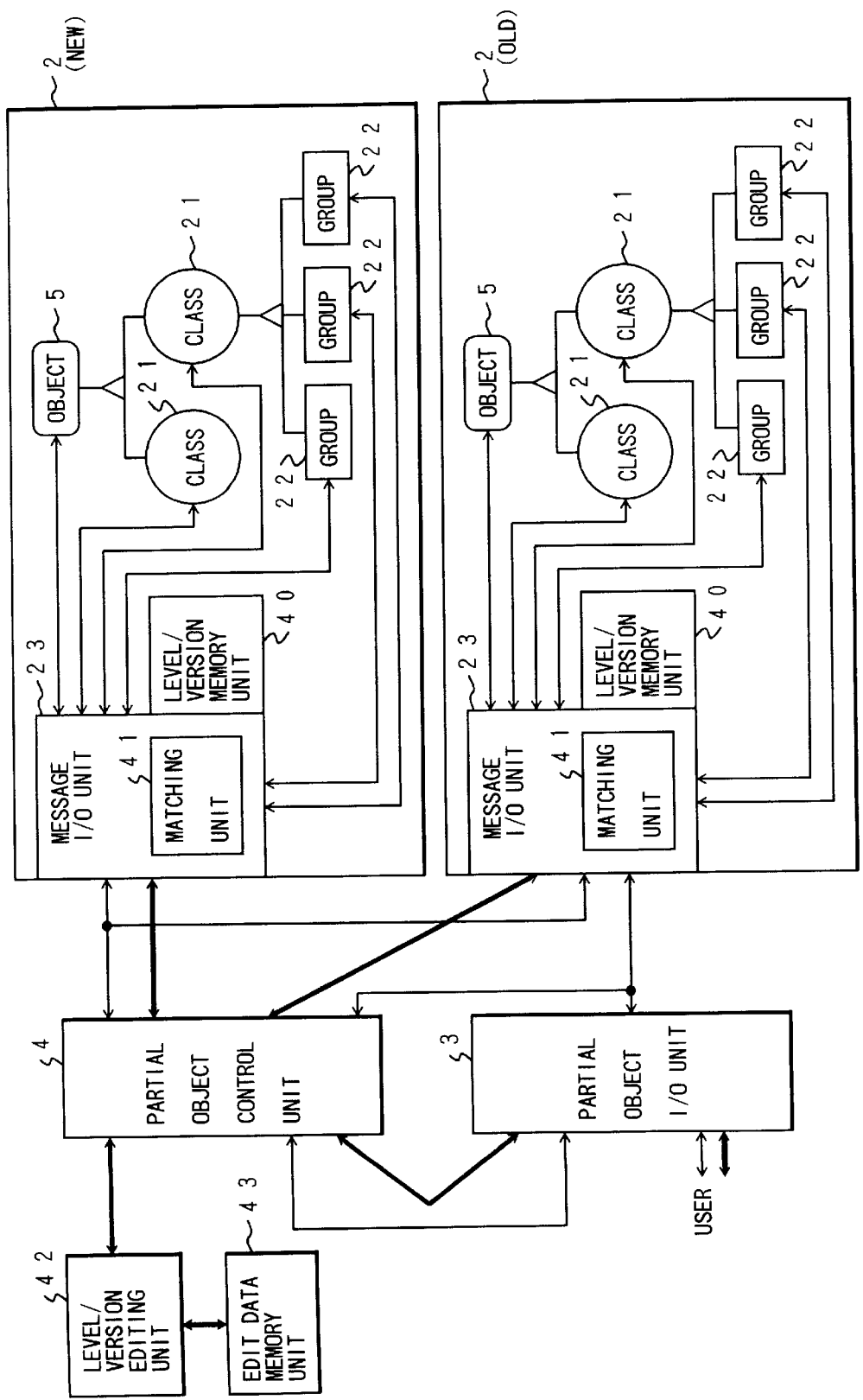
FIG. 37 is a diagram showing an example 23 of the object lump.

FIG. 37 is a diagram showing an example 23 of the object lump. In accordance with this embodiment, the object lump 2 includes, in addition to the construction in the embodiment illustrated in FIG. 36, a level/version editing unit 42 and a level/version edit data memory unit 43. The level version editing unit 42 deletes, adds and changes the level/version. The level/version edit data memory unit 43 stores pieces of data needed for an editing process of the level/version editing unit 42.

Based on this, the level/version managed by the level/version memory unit 40 can be set, unlocked and edited.

Note that the partial object control unit 4 manages the level/version editing unit 42 and the level/version edit data memory unit 43 in this embodiment. It is also possible to control the register/editing processes of the level/version en bloc by providing the object lump 2. Further, the level/version editing unit 42 and the level/version edit data memory unit 43 are provided in the partial object control unit 4 or the partial object I/O unit 3, whereby the registering/editing processes of the level/version can be controlled en bloc.

In the embodiment illustrated in FIG. 37, the level/version editing unit 42 and the level/version edit data memory unit 43 are further added to the construction of the embodiment shown in FIG. 36. For the same reason of preparing those units, an ID password editing unit and an ID password edit data memory unit may be further added to the construction of the embodiment of FIG. 30. Also, a priority editing unit and a priority edit data memory unit may be added to the construction of the embodiment shown in FIG. 35.

<Example 24 of Object Lump>

Figure 38:
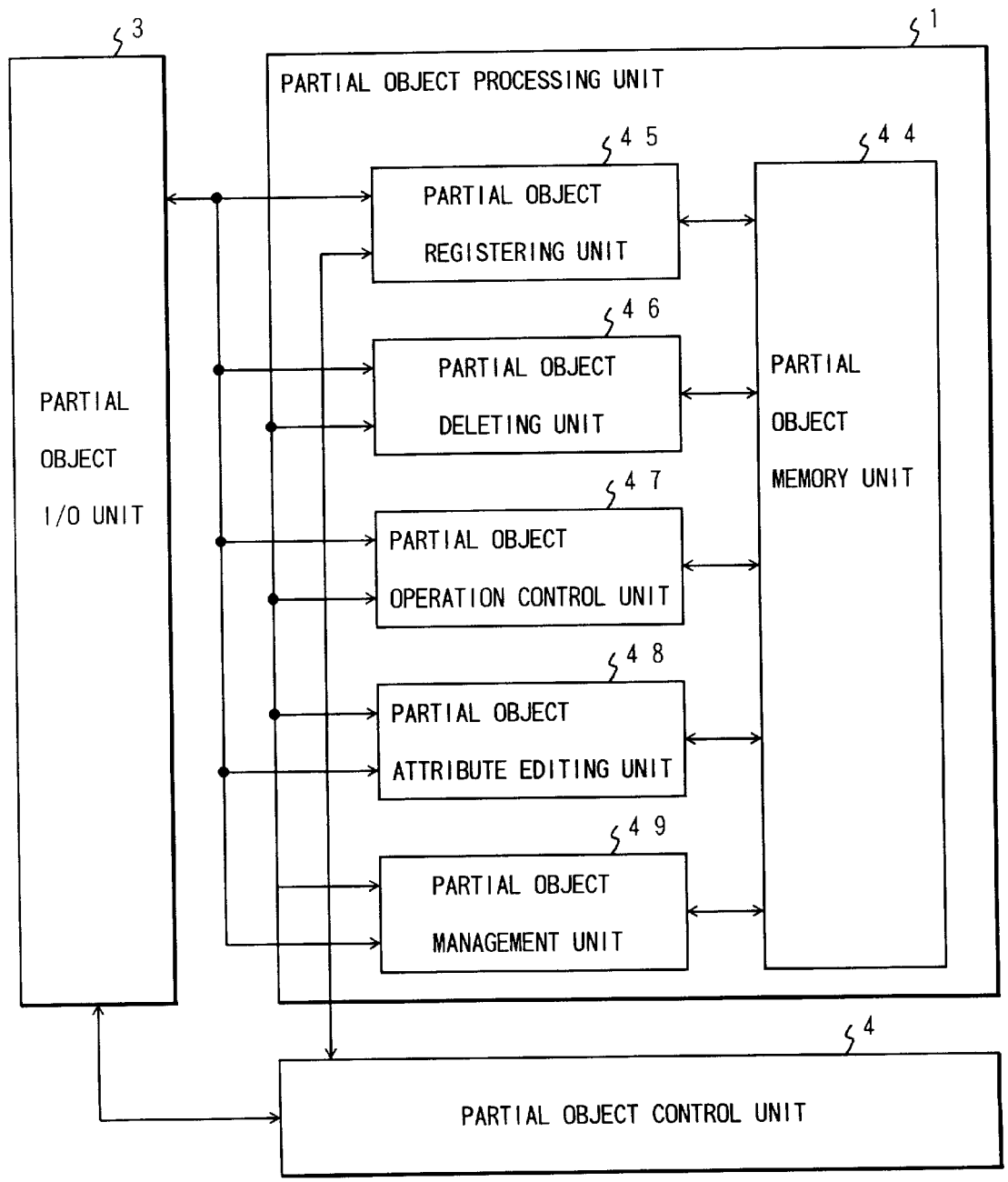
FIG. 38 is a diagram illustrating an example 24 of the object lump.

FIG. 38 is a diagram illustrating an example 24 of the object lump. In accordance with this embodiment, the partial object processing unit 1 includes a partial object memory unit 44, a partial object registering unit 45, a partial object deleting unit 46, a partial object operation control unit 47, a partial object attribute editing unit 48 and a partial object management unit 49.

The partial object memory unit 44 stores the object lumps 2. The partial object registering unit 45 makes the partial object memory unit 44 register the object lumps 2. The partial object deleting unit 46 deletes the object lump 2 from the partial object memory unit 44.

The partial object operation control unit 47 controls the operation of the object lump 2 managed by the partial object memory unit 44. The partial object attribute editing unit 48 edits a name and an attribute possessed by the object lump 2 with respect to the partial object memory unit 44. The partial object management unit 49 manages the object lump 2 stored in the partial object memory unit 44.

According to such a construction, the object lump 2 is deployed and edited in the partial object processing unit 1, and the operation thereof can be conducted.

It is to be noted that the above respective units are provided in the partial object processing unit 1 in this embodiment. The above-mentioned individual units may also be provided in the partial object control unit 4. Further, each unit is prepared as the object lump 2 and bears the closed attribute inheritance relationship, thereby making it possible to execute the processing in parallel to other object lump 2.

<Execution Mode 1 of Object Lump 2>

Next, an execution mode of the object lump 2 will be discussed. The object lump 2 assumes a nature having the closed attribute inheritance relationship. To be specific, the objects 5 constituting the object lump 2 are able to obtain necessary attributes simply by tracing to the interior of the object lump to which the objects 5 themselves belong.

Figure 39:
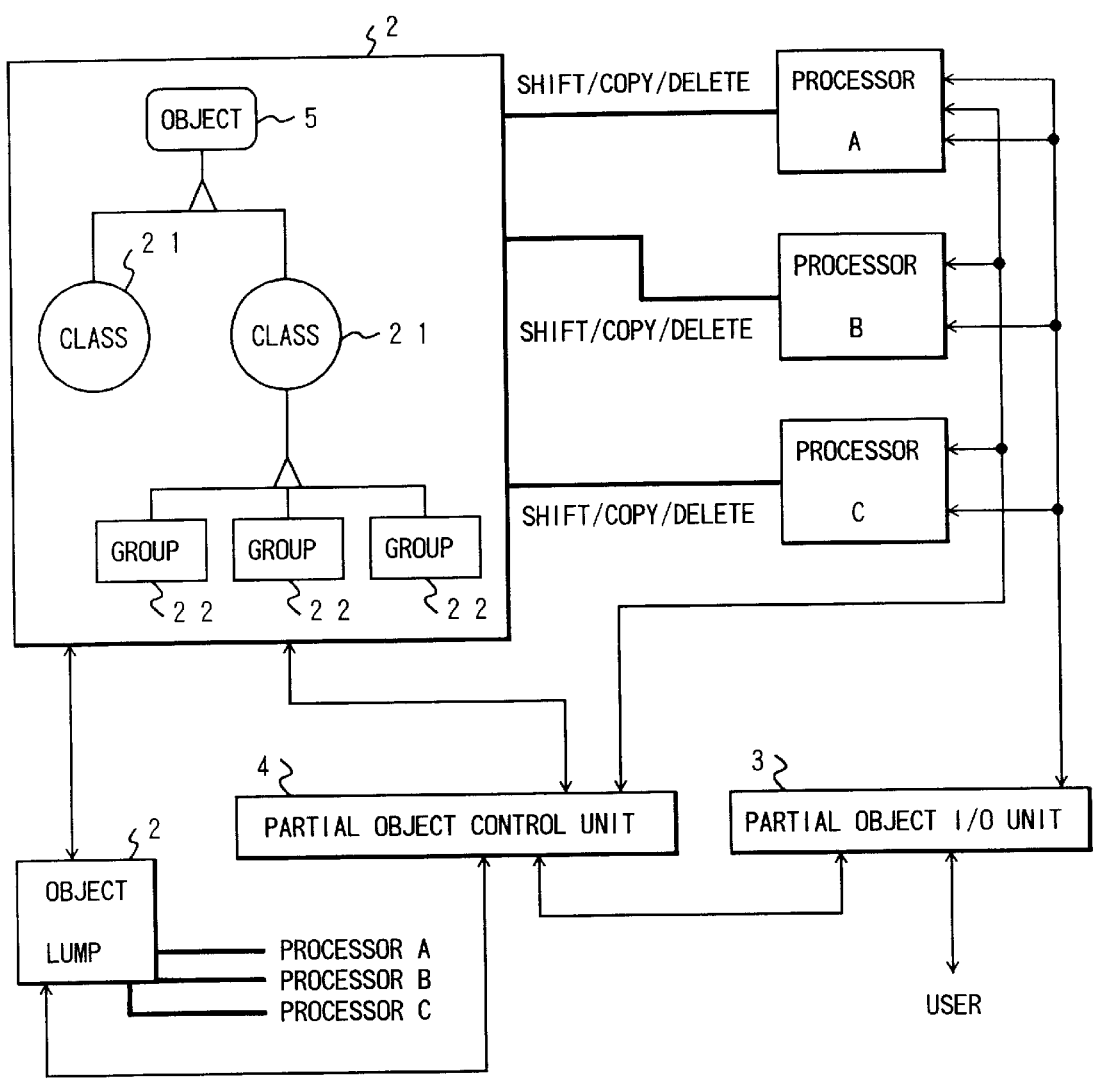
FIG. 39 is a diagram of assistance in explaining an execution mode 1 of the object lump.

According to the present invention, when a plurality of processors execute the data processing, as illustrated in FIG. 39, the object lumps 2 are shifted, copied and deleted between processors A, B and C on the object lump 2 basis. The data processing is executed by transferring and receiving the messages while operating the object lumps 2 in parallel. A fine line in FIG. 39 indicates a flow of the message, while a bold line indicates a flow of the object lump 2.

Each of the processors A to C is capable of operating the object 5 without inquiring of other processors about the attribute inheritance relationship. Therefore, complete disperse parallel processing can be actualized. For example, when a certain user transfers and receives the message to a given processor, other user is capable of transferring and receiving the message to and from other processor. Further, even when the object lump 2 has a usable CPU condition, etc., the parallel processing of the object lumps 2 can be done by operating the processors which satisfy the CPU condition. A name, an attribute and a usage of the object 5 are deployed in a specified processor, and they can be thereby managed in centralization.

<Example 6 of Data Processing>

Figure 40:
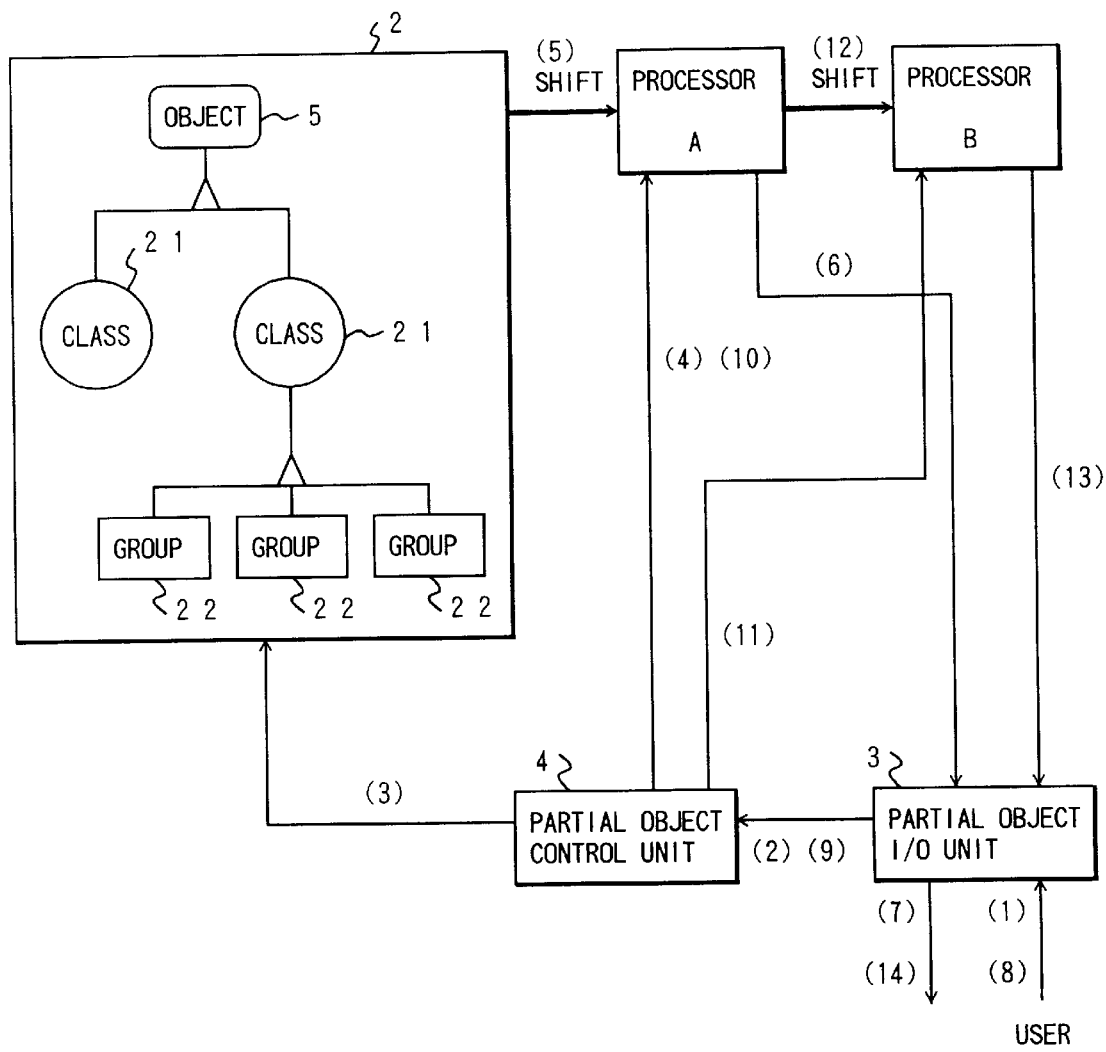
FIG. 40 is a diagram illustrating an example 6 of the data processing according to the present invention.

FIG. 40 illustrates one example of the specific data processing. A fine line in FIG. 40 indicates a flow of the message, while a bold line indicates a flow of the object lump 2. Encircled numeric values represent a sequence of processing.

When the user notifies the processor A of the effect that the work is to be conducted by the processor A via the partial object I/O unit 3 and the partial object control unit 4, the processor A deploys and operates an operation target object lump 2. The processor A notifies the user of a result of this processing via the partial object I/O unit 3.

The user, upon receiving the result of this notification, informs the processors A, B of the effect that the work is to be performed by the processor B via the partial object I/O unit 3 and the partial object control unit 4. Hereupon, the processor B shifts the object lump 2 from the processor A and then operates the object lump 2. The processor B informs the user of a result of this processing via the partial object I/O unit 3.

Thus, when the plurality of processors execute the data processing, the object lumps 2 are shifted between the processors, copied and then deleted. The object lumps 2 transfer and receive the messages while operating in parallel, thus executing the data processing.

In accordance with this embodiment, the data processing is executed by deploying the object lumps 2 bearing the closed attribute inheritance relationship in the processors. For instance, there exist a large object lump 2, an object lump 2 having a large working load and an object lump 2 which can not keep the closed attribute inheritance relationship. With resect to those object lumps 2, as depicted in FIG. 41, the data processing is executed.

That is, in conformity with the loading situations and working contents of the processors and also the condition of the CPU usable by the objects 5, objects 5A through 5C constituting the object lump 2 are deployed in the processors A–C corresponding to the objects 5A–5C, and the processors A–C execute the data processing.

Figure 42:
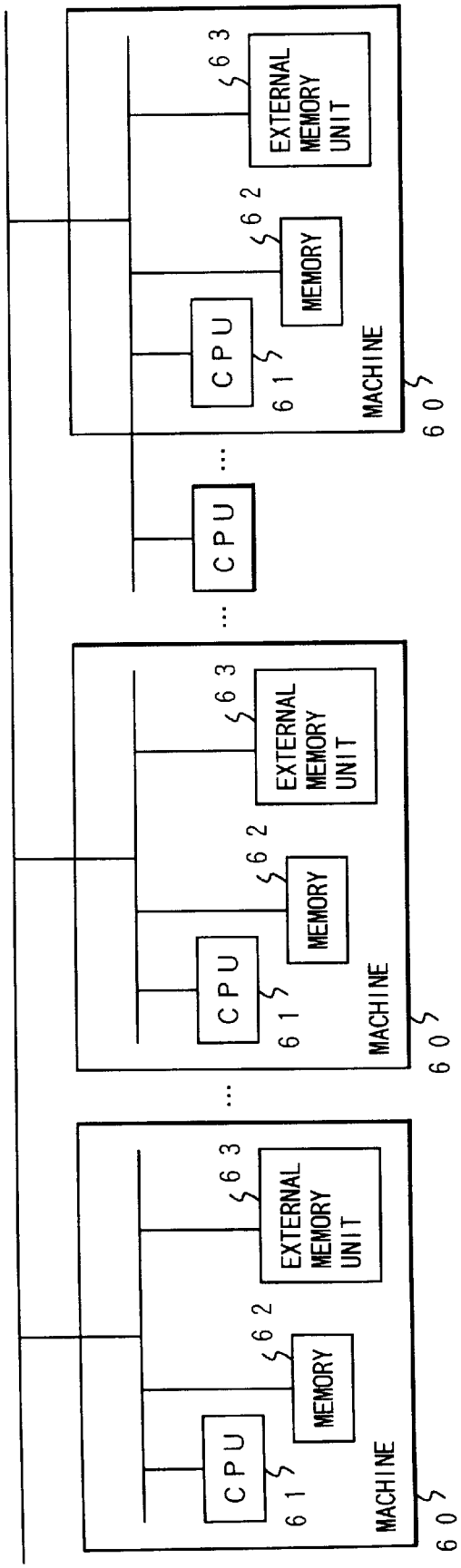
FIG. 42 is a diagram showing a system construction in terms of performing consecutive address access control.

As illustrated in FIG. 42, a plurality of machines 60 are provided. Each machine 60 includes a CPU 61, a memory 62 and an external memory device 63. The machines 60 are separately execute the objects 5 constituting the object lump 2. In this case, when tracing to the attribute inheritance relationship, it is required that memory areas of other machines 60 be referred. In accordance with this embodiment, the memory areas of other machines 60 are referred by consecutive addresses.

Figure 43:
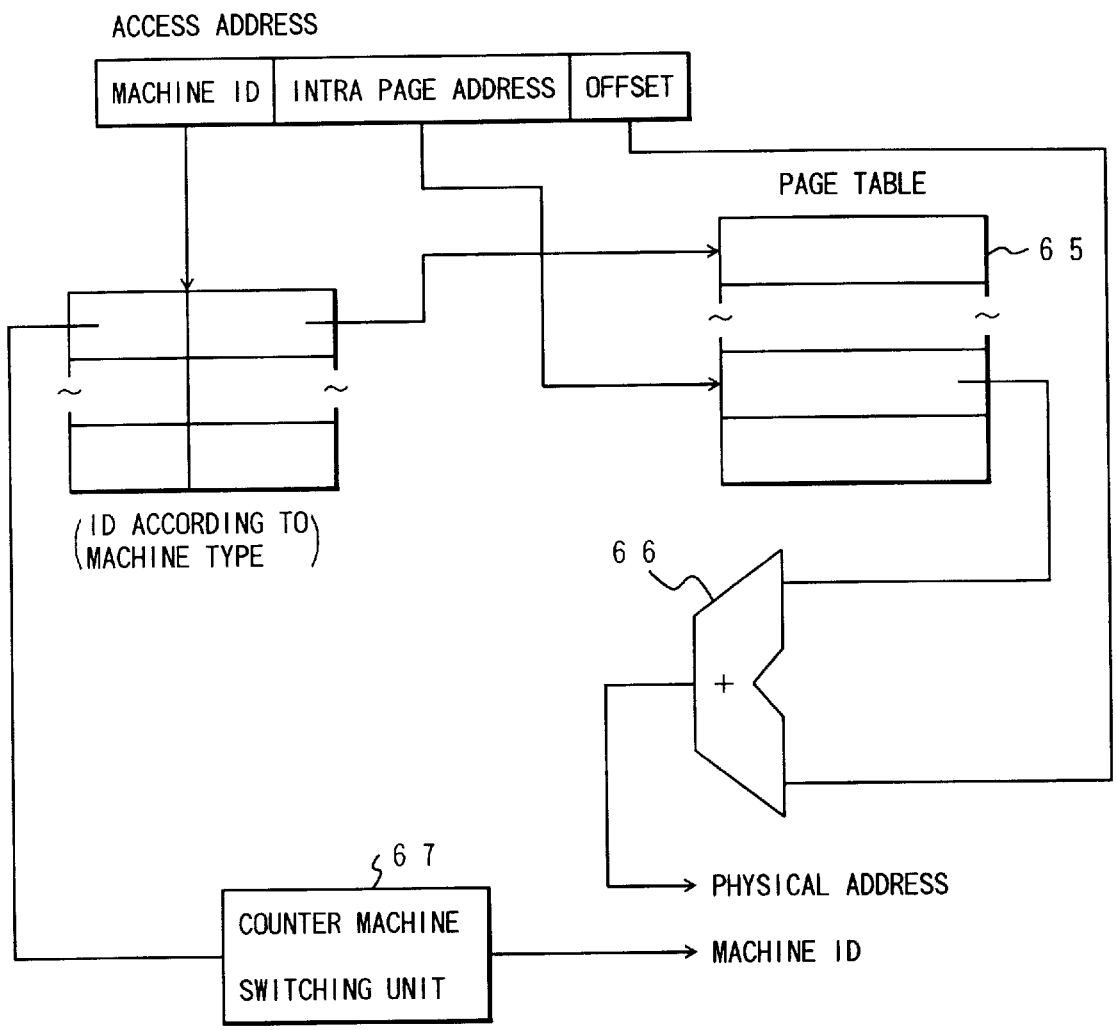
FIG. 43 is a diagram showing a construction for actualizing the consecutive address access control.

For this reason, as shown in FIG. 43, a machine ID of an accessing destination is designated in an access address, and a page table 65 is provided corresponding to the machine 60. When the access address is issued, the page table 65 indicating the machine ID possessed by the access address is specified. An address indicated by an intra-page address possessed by the access address is specified from within the specified page table 65.

An adder 66 adds the specified address to an offset possessed by the access address, thereby obtaining an address of the access destination. The thus obtained address is issued to the machine 60 designated by the access address.

A counter-machine switching unit 67 transmits the machine ID of the access destination. At this time, the page table 65 to be used manages a flag for indicating whether the page is referred or not, a flag for indicating whether the page is rewritten or not, a flag for indicating where the object exists, i.e., either the memory 62 or the external memory device 63 and a page head address as well.

The machine can be accessed in a self-address space by taking this consecutive address access control method. Hence, it is not absolutely necessary to be aware of which machine to be accessed and which network to be connected thereto. Further, the messages can be transferred and received between the object lumps 2 by use of simple consecutive address pointers.

Also, even if the CPU 61 in use is different, the objects 5 are operable while being freely referred to each other. Furthermore, the names and the attributes of the objects 5 and the objects 5 themselves are usable in the same address space. The names and the attributes of the objects 5 can be retrieved by the consecutive addresses.

Figure 44:
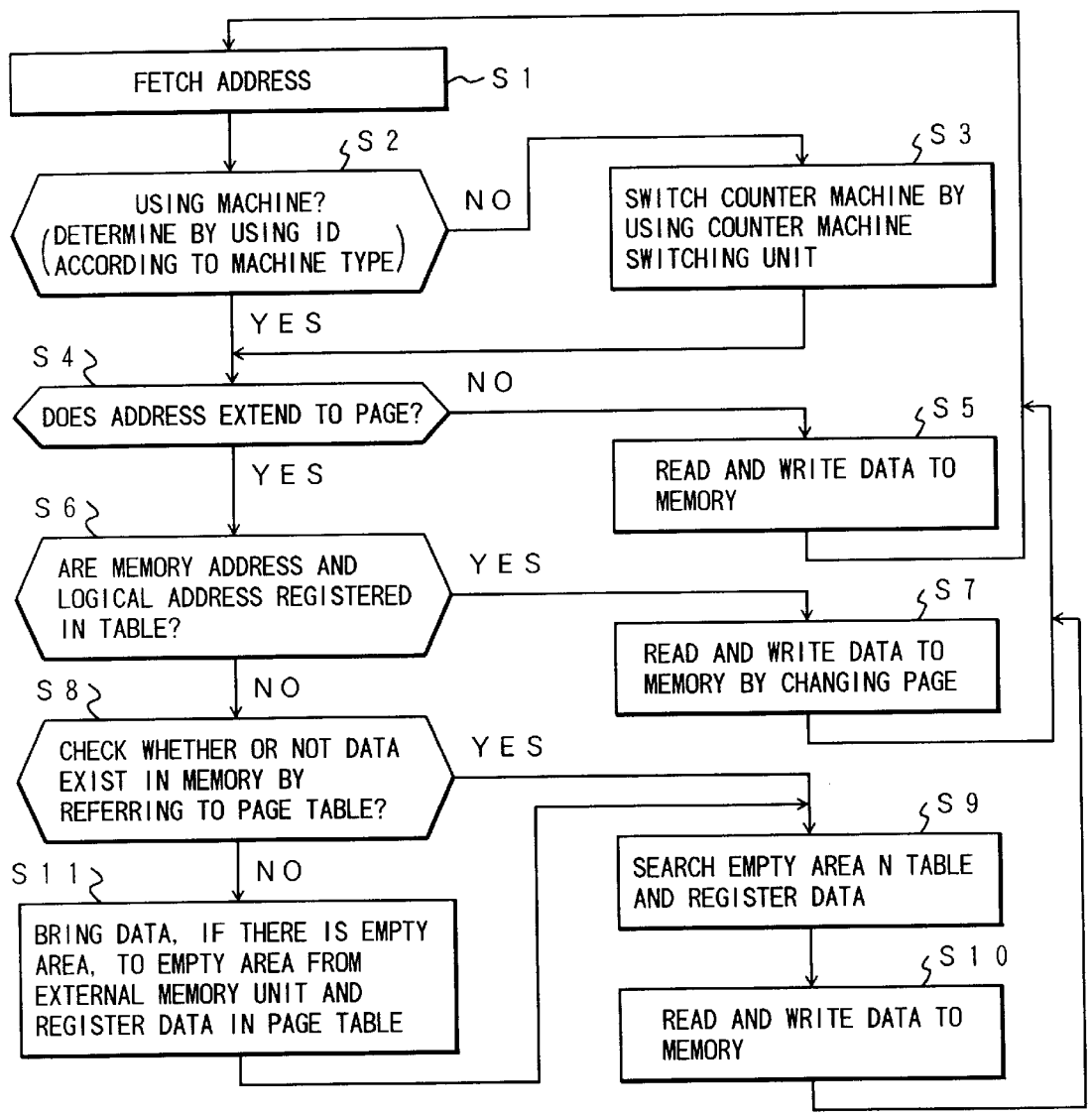
FIG. 44 is a flow of processing under the consecutive address access control.

FIG. 44 shows a flow of processes executed by this consecutive address access control method.

That is, the user at first, when the user accesses the object 5, takes out an address (S1). Next, the user determines whether or not the machine is the one used by himself or herself (S2). If the machine is not the one used by the user himself or herself, the counter-machine switching unit 67 switches over the above machine to a counter machine (S3).

An address of the counter machine is thereby usable. Next, the CPU 61 determines whether or not the address extends to a page (S4). If the address does not extend to the page, an address exists. Hence, the CPU 61 writes and reads the data to and from the memory (S5). Further, a next address is taken out (S1).

Whereas if the address extends to the page, the CPU 61 determines whether or not a correspondence relationship between a memory address and a logic address is registered in the table for managing the correspondence relationship between the physical address and the logic address (S6).

If the correspondence relationship between the memory address and the logic address is registered in the above table, the CPU 61 changes the page and effects writing/reading process of the data by using that address (S7). Further, a next address is taken out.

Whereas if the correspondence relationship between the memory address and the logic address is not registered in the above table, the CPU 61 refers to the page table 65 and thus determines whether or not the data exist in the memory 62 (S8). If the data exist in the memory 62, the CPU 61 searches an empty area of the table and registers the data in the table. Then, the CPU 61, if there is no empty area, the one exhibiting a high using rate is replaced with the one having a low using rate (S9). The CPU 61 writes and reads the data by using that address (S10). A next address is taken out.

Whereas if the data do not exist in the memory 62, the CPU 61 determines whether or not the table has the empty area. If the table has the empty area, the CPU 61 fetches the data from the external memory device 63 to the empty area and registers the data in the page table 65. Whereas if the table has no empty area, the CPU 61 fetches the data out of the external memory device 63 to the area having a low using frequency and registers the data in the page table 65 (S11). Further, after effecting the processes of steps S9 and S10, the processing returns to step S1.

<Specific Operation Example 1 of Embodiment>

Figure 45:
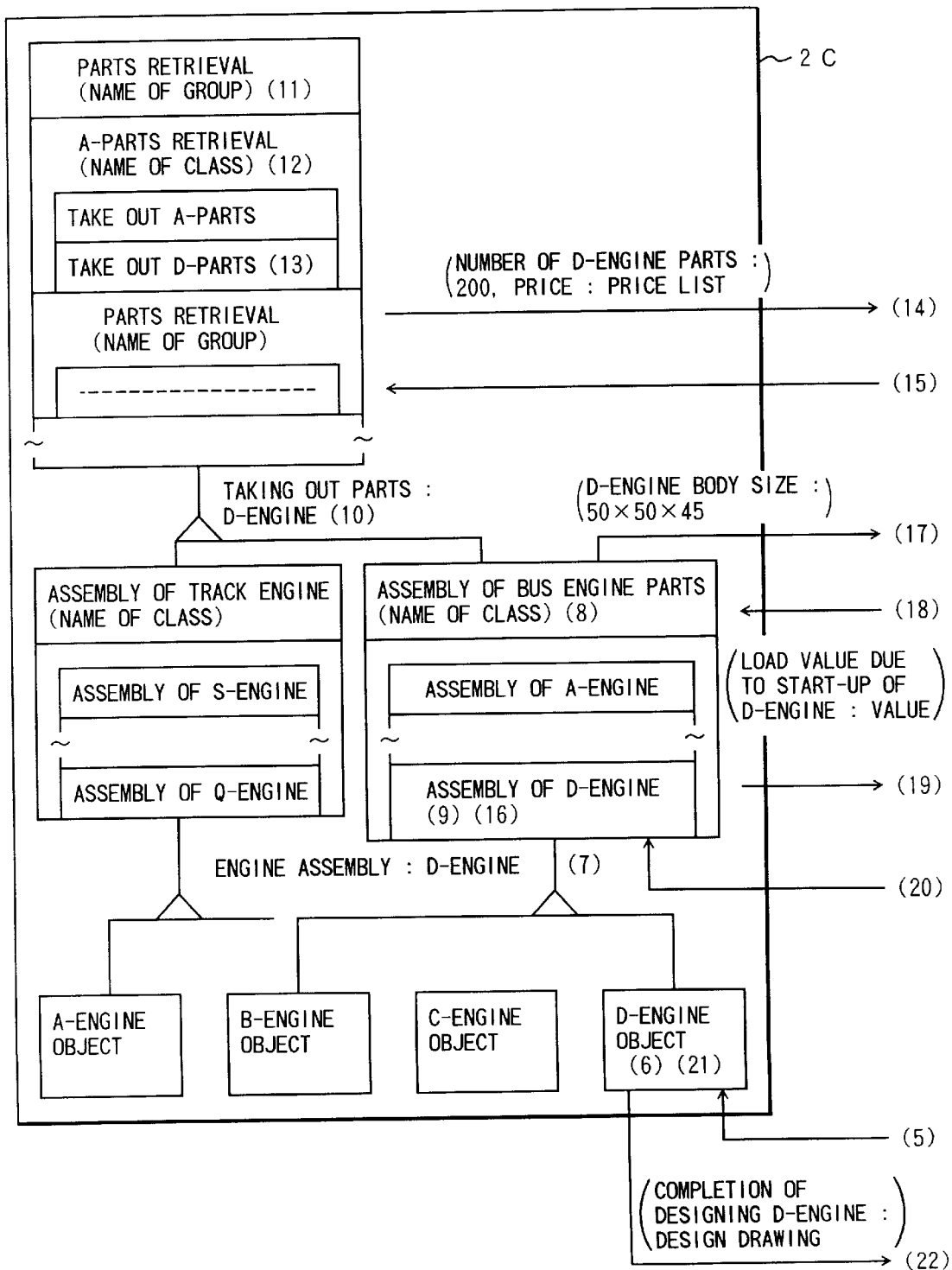
FIG. 45 is a diagram showing a specific operation example 1 of the example illustrated in FIG. 6.
Figure 46:
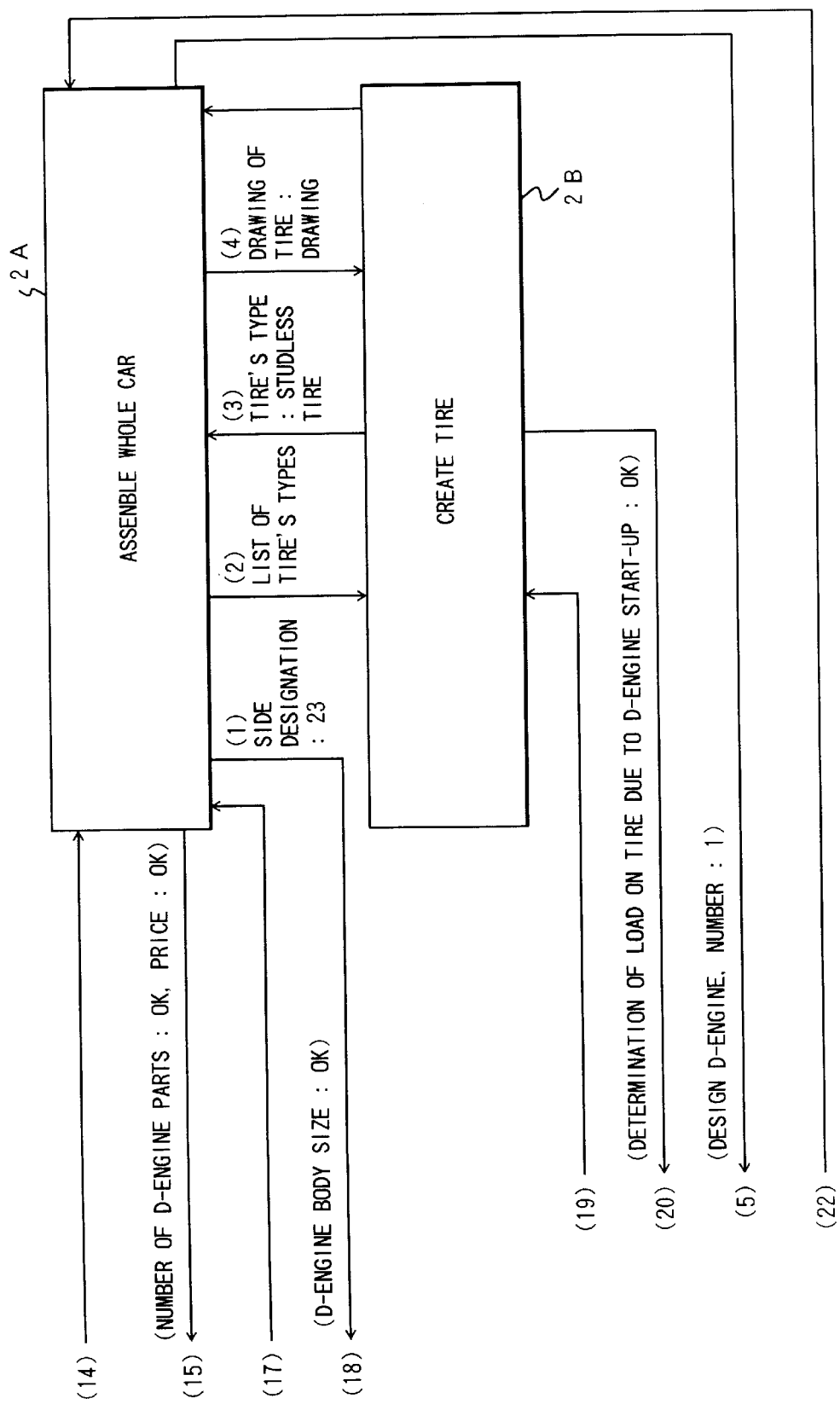
FIG. 46 is a diagram showing the specific operation example 1 of the example illustrated in FIG. 6.

FIGS. 45 and 46 illustrate a specific operation example 1 of the embodiment shown in FIG. 6. In FIGS. 45 and 46, the numeric values with parentheses indicate a sequence of processing.

The object lump 2 in the embodiment illustrated in FIG. 6 is, as discussed above, constructed in such a form that the objects 5, the classes 21 and the group 22 are mixed. The group 22 and the class 21 have the parentage-offspring attribute inheritance relationship with each other. The class 21 and the object 5 have the parentage-offspring attribute inheritance relationship with each other. The object lump 2 operates by executing the transferring/receiving process of the message to and from the I/O unit or other object lump 2.

FIG. 46 illustrates an object lump 2A for assembling a whole car and an object lump 2B for creating a tire. FIG. 45 shows an object 2C for designing an engine. The three object lumps 2A–2C transfer and receive the messages to and from each other, thus effecting the process of designing a new engine.

Next, the operation will be explained with reference to FIGS. 45 and 46. The object lump 2A, as shown by (1), designates a size of the tire to the object lump 2B. The object 2B, as indicated by (2), sends a list of types of the tires to the object lump 2A. The object lump 2A, as shown by (3), designates a type of the tire to the object lump 2B. The object lump 2B, as indicated by (4), sends a design drawing of the tire to the object lump 2A.

The object lump 2A, as indicated by (5), request a D-engine object of the object lump 2C to manufacture a D-engine. The D-engine object, as shown by (6), launches into designing the D-engine. When D-engine is designed, the D-engine object, upon knowing that there is no object for the assembly, as indicated by (7), transfers the control to an intra-self-lump bus engine parts assembly class. Next, as shown by (8) and (9), the D-engine assembly object in that class operates, and the assembly of the D-engine is executed.

At this time, the D-engine assembly object, when the parts can not be recognized, as indicated by (10), transfers the control to an intra-self-lump parts retrieval group. Next, as shown by (11), (12) and (13), the parts retrieval is conducted.

When the parts are retrieved, the parts retrieval group, as indicated by (14), informs the object lump 2A as a process requesting element of the number of parts and a price thereof and inquires if there is any problem. In response to this inquiry, as shown by (15), when the object lump 2A notices that there is no problem, the D-engine assembly object, as shown by (16), assembles the D-engine by use of the retrieved parts.

When the assembly of the D-engine finishes, the D-engine assembly object, as indicated by (17), informs the process requesting object lump 2A of a body size of the thus assembled D-engine and inquires if there is any problem. In response to this inquiry, as shown by (18), when the object lump 2A notices that there is no problem, the D-engine assembly object, as indicated by (19), obtains a load value of the tire due to a start-up of the D-engine and inquires the process requesting object lump 2A as to whether or not there is any problem in that load value.

In response to this inquiry, as shown by (20), when the object lump 2A informs the D-engine assembly object of the effect that there is no problem, the D-engine assembly object transfers the control back to the D-engine object. The D-engine object, as indicated by (21), performs the remaining processes, thereby creating the D-engine. The D-engine object, as shown by (22), informs the requesting object lump 2A of the created D-engine design drawing, and the processing is thus ended.

<Specific Operation Example 2 of Embodiment>

Figure 47:
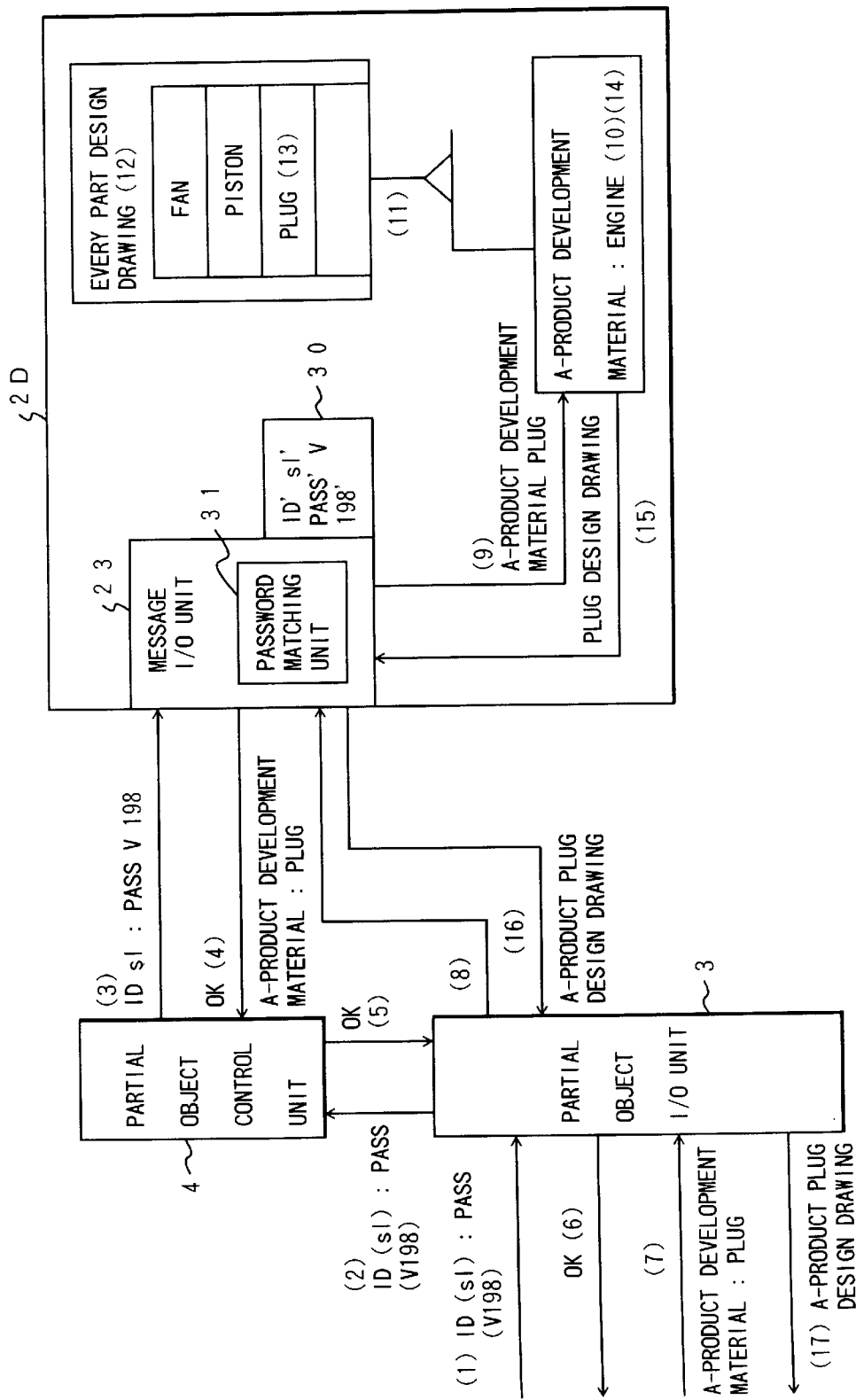
FIG. 47 is a diagram showing a specific operation example 2 of the example illustrated in FIG. 30.

FIG. 47 illustrates a specific operation example 2 of the embodiment shown in FIG. 30. The object lump 2 illustrated in FIG. 30 includes, as mentioned above, the ID password memory unit 30 and the ID password matching unit 31. Only the specified user with the identified ID and password is capable of operating the object lump 2.

Referring to FIG. 47, an object lump 2D for offering a parts design drawing of a product A takes the construction given above.

The operation will be explained with reference to FIG. 47. The user, when the user obtains a necessary parts design drawing from the object lump 2D, as indicated by (1), (2) and (3), informs the object lump 2D of the ID and the password via the partial object I/O unit 3 and the partial object control unit 4.

The ID password matching unit 31 determines whether or not the informed ID and password are identical with the ID and the password that are stored in the ID password memory unit 30. If the informed ID and password are identical with the ID and password stored in the ID password memory unit 30, as indicated by (4), (5) and (6), the ID password matching unit 31 informs the user of an accessible status and a deploying position of the object lump 2D via the partial object control unit 4 and the partial object I/O unit 3.

Next, the user, as shown by (7) and (8), demands the object lump 2D to obtain a necessary Product-A plug design drawing via the partial object I/O unit 3. The message I/O unit 23 judges that the above demand is a request for having a right of access and accepts this request. Further, as indicated by (9), the message I/O unit 23 designates the plug as a target to be retrieved and sends a message to an intra-self-lump product-A development material object. The product-A development material object retrieves the plug as indicated by (10).

When the product-A development material object knows, that the plug is not managed from the retrieving process, as indicated by (11), the object transfers the control to an intra-self-lump every part design drawing object. The every part design drawing object, as shown by (13), retrieves a design drawing of the plug. Then, when the plug design drawing is retrieved, the every part design drawing object, as shown by (14), returns the control to the product-A development material object. The product-A development material object, as indicated by (15), (16) and (17), notifies the user of the plug design drawing via the partial object I/O unit 3, thus finishing the processing.

<Specific Operation Example 3 of Embodiment>

FIGS. 48 and 49 illustrate a specific operation example 3 of the embodiment shown in FIG. 33. Referring to FIG. 33, as stated earlier, when the schedule memory unit 34 and the schedule unit 35 are provided, the object lump 2 includes the protect attribute memory unit 36 and the protect attribute matching unit 37. Only the specified user with the identified protect attribute is capable of operating the object lump 2.

FIG. 48 shows an object lump 2E for designing and assembling a G-engine and an object lump 2F for designing and assembling the body. The schedule memory unit 34 designs the body during a period from 0:00 to 13:00 and stores a working schedule of designing the engine during a period from 13:00 to 0:00.

Next, the operation will be explained with reference to FIGS. 48 and 49. When the user designs and assembles the G-engine, as indicated by (1) and (2), the user sends a message for designing an assembling the G-engine to the partial object control unit 4 via the partial object I/O unit 3. The partial object control unit 4, as shown by (3) and (4), inquires the schedule unit 35 for a schedule situation.

The schedule unit 35, as shown by (5), (6) and (7), refers to the working schedule stored in the schedule memory unit 34. If the working schedule is managed on a time basis, the schedule unit 35 obtains a name of the object lump possessed by the working schedule and a protect attribute shown by a present time among the protect attributes.

Then, as indicated by (8), the schedule unit 35 informs the partial object control unit of its name and the protect attribute. In this example, the name of the object lump 2E corresponding to the present time "13:50" and the protect attribute "11495" are obtained.

The partial object control unit 4, as shown by (9), transmits the informed protect attribute "11495" to the object lump 2E informed thereof. The protect attribute matching unit 37 of the object lump 2E, as indicated by (10), determines whether or not the transmitted protect attribute "11495" is identical with the protect attribute stored in the prot If the pre memory unit 36.

If the protect attribute "11495" is identical with the protect attribute stored in the protect attribute memory unit 36, the protect attribute matching unit 37, as shown by (11), sends a message for designing and assembling the G-engine to the intra-self-lump assembly object.

The assembly object, as indicated by (12), comes into designing and assembling the G-engine. If there is no assembly of the G-engine, the assembly object, as shown by (13), transfers the control to the intra-self-lump engine assembly class. As shown by (14) and (15), the engine assembly class goes into the assembly of the G-engine in accordance with the G-engine assembly object. When the parts are required to be retrieved, the G-engine assembly object, as indicated by (16), transfers the control to an intra-self-lump parts retrieval group. The parts retrieval group, as shown by (17), executes a parts retrieving process.

Then, when a result of the parts retrieval is obtained, the G-engine assembly object, as indicated by (18), executes the remaining processes, thus assembling the G-engine. The assembly object, as shown by (19), executes the remaining processes, thus designing and assembling the G-engine. Then, the design of the G-engine is ended, the assembly object, as indicated by (20), (21), (22) and (23), informs the user of the design drawing of the G-engine via the partial object control unit 4 and the partial object I/O unit 3, and the processing is thus ended.

<Specific Operation Example 4 of Embodiment>

Figure 50:
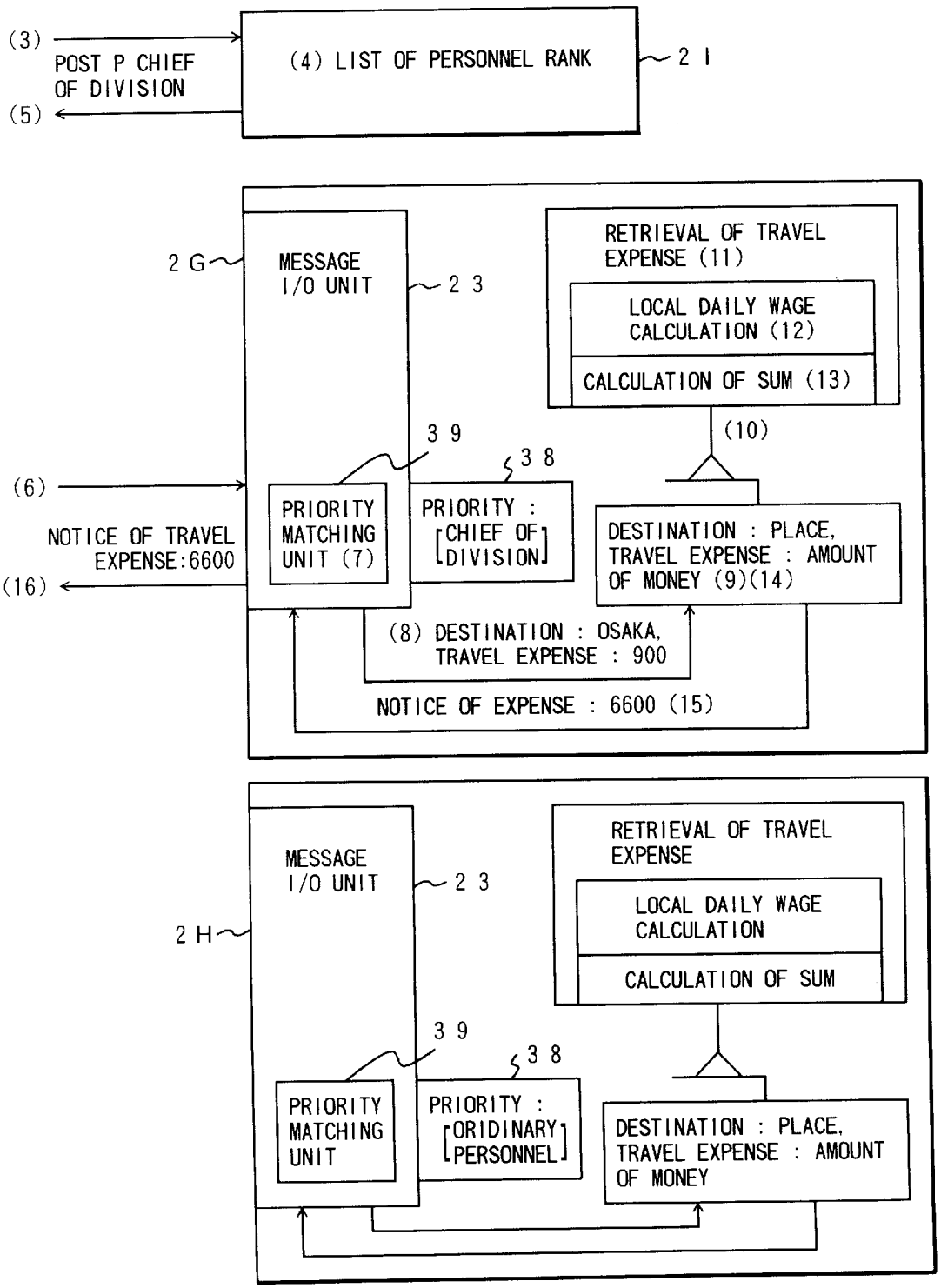
FIG. 50 is a diagram showing a specific operation example 4 of the example illustrated in FIG. 35.
Figure 51:
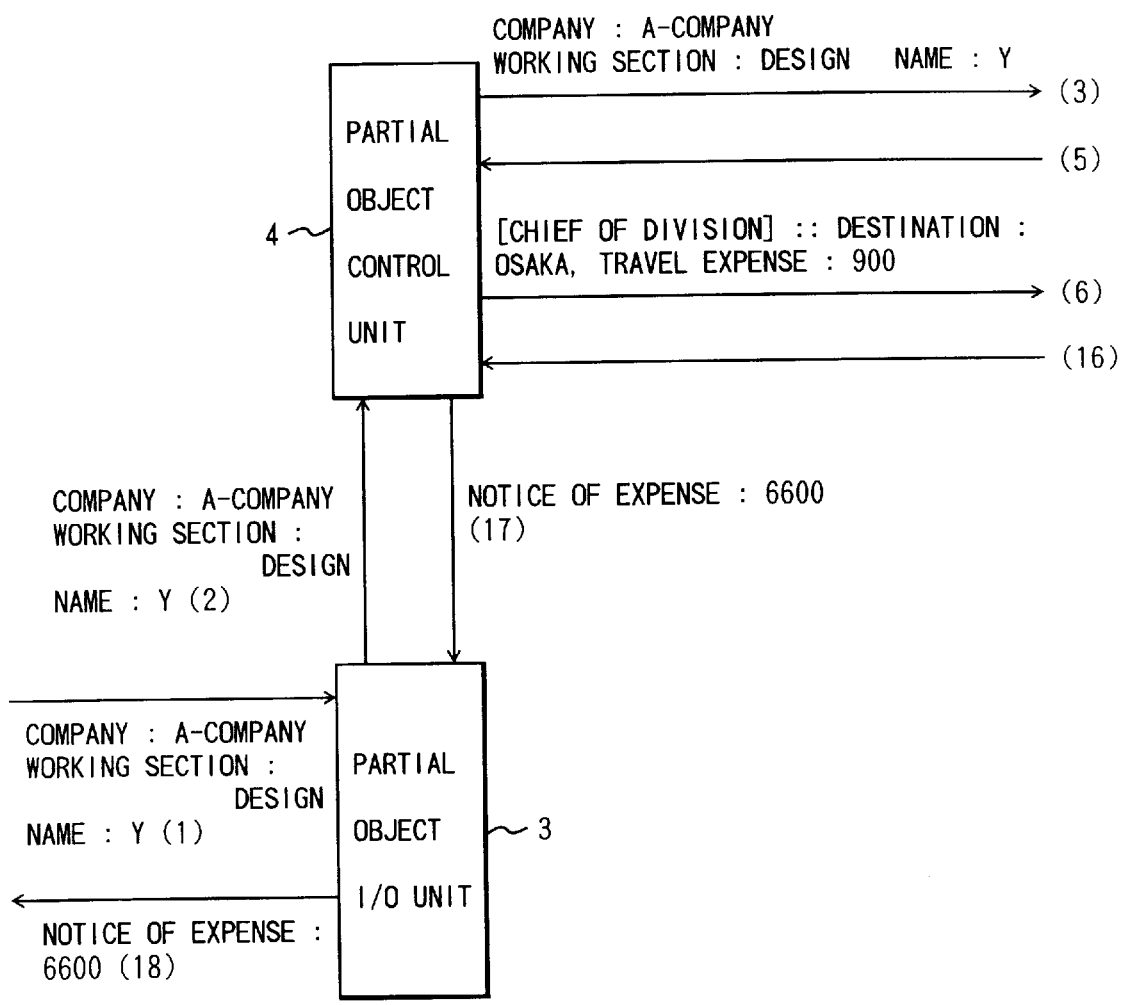
FIG. 51 is a diagram showing the specific operation example 4 of the example illustrated in FIG. 35.

FIGS. 50 and 51 illustrate a specific operation example 4 of the embodiment illustrated in FIG. 35. The object lump 2 shown in FIG. 35, as described above, includes the priority memory unit 38 and the priority matching unit 39. Only the user with the identified priority is capable of operating the object lump 2.

FIG. 50 shows an object lump 2G (having a chief-of-division priority) for paying off travel expenses of chiefs of division who have the same name and an object lump 2H (having ordinary employee priority) for paying off travel expenses of ordinary employees. Prepared further is an object lump 2I for managing a list of employee statuses.

Next, the operation will be explained with reference to FIGS. 50 and 51. The user, when paying off the travel expenses, as indicated by (1) and (2), notifies the partial object control unit 4 of a name of company of a travel expense pay-off target person, a name of division to which this person is assigned and a name of this person via the partial object I/O unit 3. The partial object control unit 4, as indicated by (3), inquires of the object lump 2I what kind of priority the travel expense pay-off target person has. The object lump 2I, as shown by (4), retrieves the priority of the travel expense pay-off target person and, as indicated by (5), informs the partial object control unit 5 of a result thereof. Herein, it is assumed that the priority of the travel expense pay-off target person is a chief of division.

The partial object control unit 4, as indicated by (6), notifies the object lump 2G of the chief-of-division priority and the data needed for paying off the travel expense. The priority matching unit 39 of the object lump 2G, as shown by (7), determines whether or not the notified chief-of-division priority is identical with the priority stored in the priority memory unit 38.

If the notified chief-of-division priority is identical with the priority stored in the priority memory unit 38, the priority matching unit 39 of the object lump 2G, as indicated by (8), designates a necessary item of data for paying off the notified travel expense and sends a message to the intra-self-lump travel expense pay-off object.

The travel expense pay-off object, as shown by (9), enters a travel expense pay-off process. When this process is effected, and if daily wages are not managed, the travel expense pay-off object, as indicated by (10), transfers the control to the intra-self-lump travel expense retrieval object.

As shown by (11), (12) and (13), the daily wages are retrieved. When the daily wages are retrieved, the travel expense retrieval object returns the control to the travel expense pay-off object. The travel expense pay-off object, as shown by (14), obtains a travel expense by executing the remaining processes and, as indicated by (15), (16), (17) and (18), informs the user of the travel expense via the partial object I/O unit 3 as well as via the partial object control unit 4. Then, the processing comes to an end.

<Specific Operation Example 5 of Embodiment>

Figure 52:
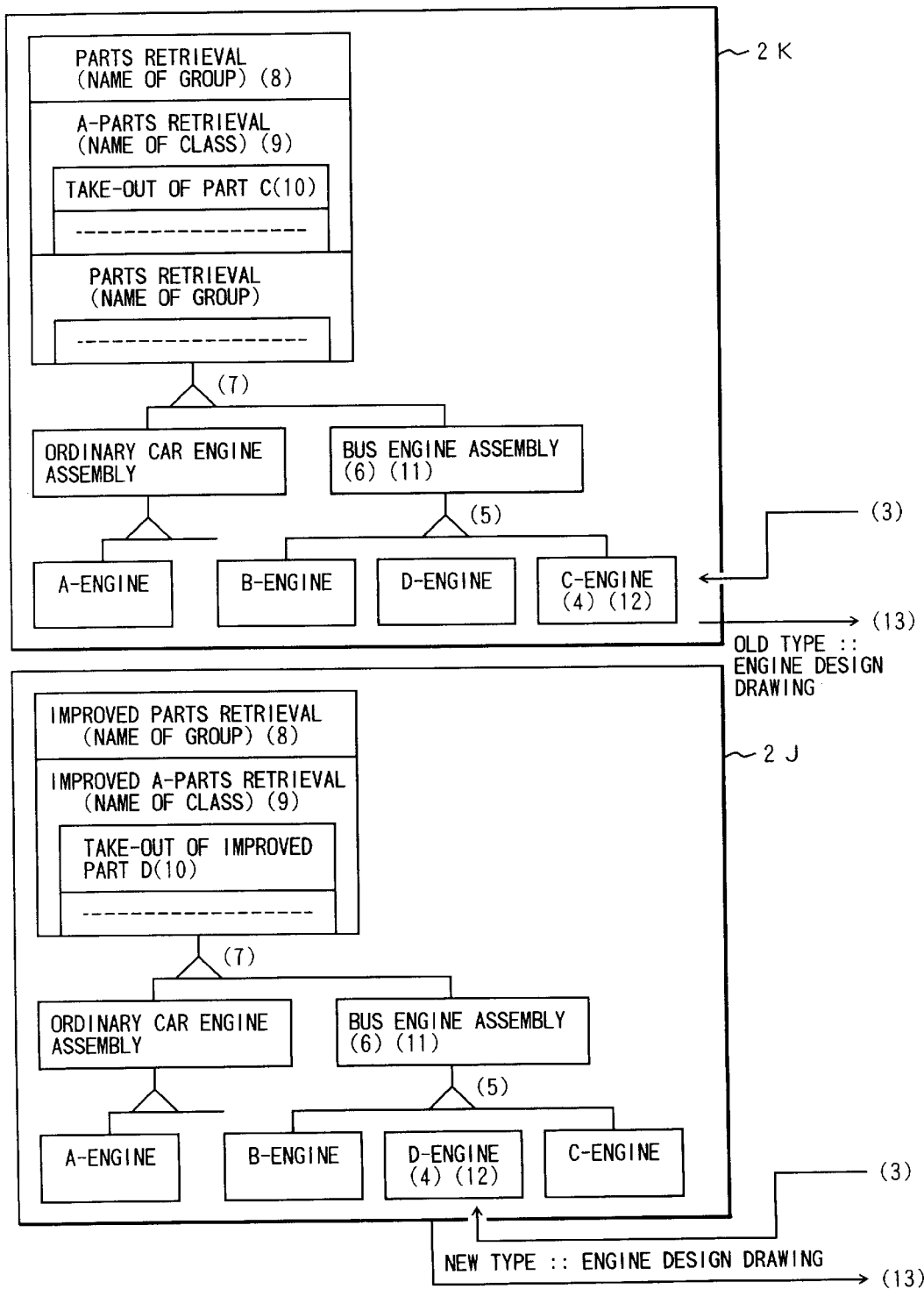
FIG. 52 is a diagram showing a specific operation example 5 of the example illustrated in FIG. 36.
Figure 53:
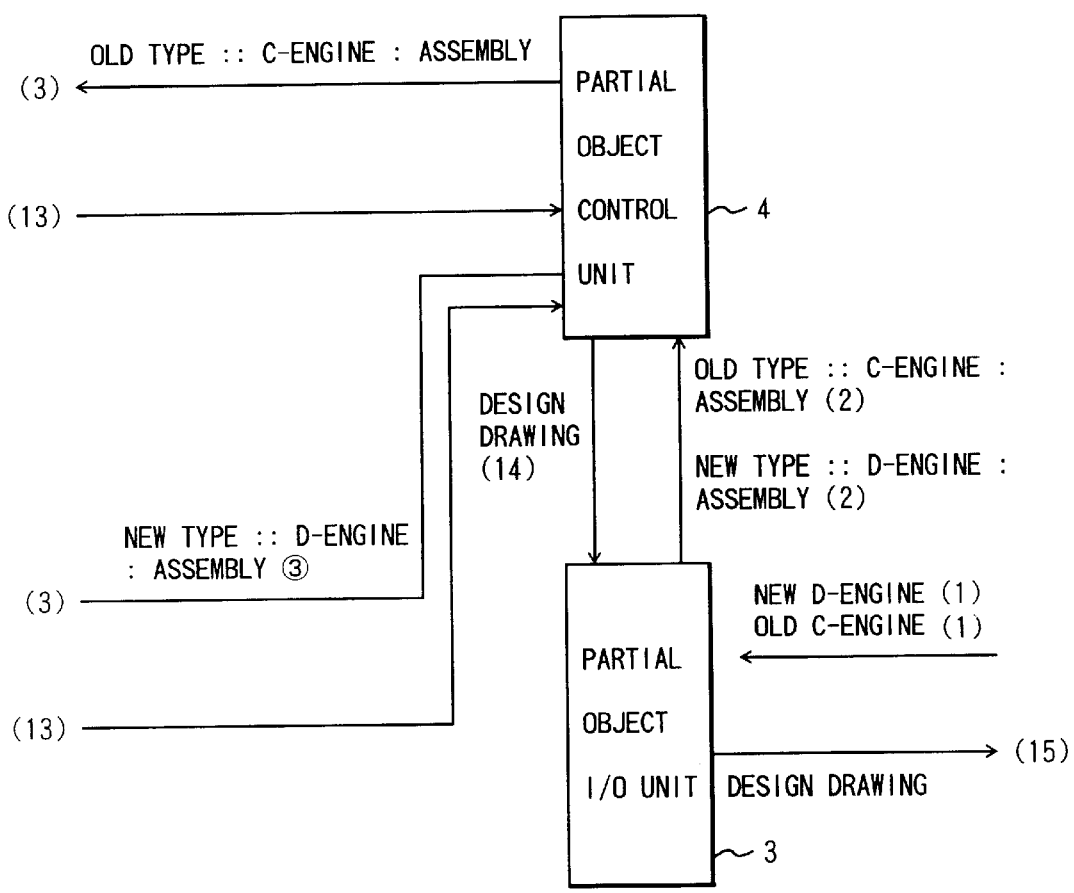
FIG. 53 is a diagram showing the specific operation example 5 illustrated in FIG. 36.

FIGS. 52 and 53 illustrate a specific operation example 5 of the embodiment shown in FIG. 36. In FIG. 36, only the specified user with the identified level/version is able to operate the object lump 2.

FIGS. 52 and 53 show an object lump 2J for creating a design drawing of a new type engine having the same name and an object lump 2K for creating a design drawing of an old type engine.

The operation will be described with reference to FIGS. 52 and 53. The user, a new type D-engine is designed, as shown by (1), (2) and (3), requests the object lump 2J for designing the new type D-engine via the partial object I/O unit 3 and the partial object control unit 4.

The D-engine object of the object lump 2J, as shown by (4), launches into designing the D-engine. The D-engine object, if there is no assembly object, as indicated by (5), transfers the control to the intra-self-lump bus engine assembly object. As shown by (6), the assembly of the D-engine is executed.

In case the parts are not recognized, the bus engine assembly object, as indicated by (7), transfers the control to an intra-self-lump improved parts retrieval group. As shown by (8), (9) and (10), improved parts are retrieved. When the improved parts are retrieved, the improved parts retrieval group transfers the control back to the bus engine assembly object.

The bus engine assembly object, as indicated by (11), executes the assembly of the D-engine by performing the remaining processes. When this processing is ended, the bus engine assembly object returns the control to the D-engine object. The D-engine object, as indicated by (12), creates the D-engine by effecting the remaining processes and, as shown by (13), (14) and (15), notifies the user of the design drawing of the created new type D-engine via the partial object control unit 4 and the partial object I/O unit 3. Subsequently, the processing is finished.

On the other hand, the user, when an old type C-engine is designed, as indicated by (1), (2) and (3), requests the object lump 2K for designing the old type C-engine via the partial object I/O unit 3 and the partial object control unit 4.

The C-engine object of the object lump 2K, as shown by (4), comes into designing the C-engine. The C-engine object, if there is no assembly object, as indicated by (5), transfers the control to the intra-self-lump bus engine assembly object. As shown by (6), the assembly of the C-engine is implemented.

In case the parts are not recognized, the bus engine assembly object, as indicated by (7), transfers the control to the intra-self-lump improved parts retrieval group. As shown by (8), (9) and (10), the improved parts are retrieved. When the improved parts are retrieved, the improved parts retrieval group transfers the control back to the bus engine assembly object.

The bus engine assembly object, as indicated by (11), executes the assembly of the C-engine by performing the remaining processes. When this processing is ended, the control is returned to the C-engine object. The C-engine object, as indicated by (12), creates the C-engine by effecting the remaining processes and, as shown by (13), (14) and (15), notifies the user of the design drawing of the created old type C-engine via the partial object control unit 4 and the partial object I/O unit 3. Subsequently, the processing is finished.

<Obviation of Problems of Prior Art>

Explained next are effects of the above-discussed embodiments of the present invention. Herein, the effects of the embodiments will be described in sequence of the above-mentioned problems inherent in the prior art.

(a) According to the present invention, the target work software can be taken out by providing the mechanism for managing the name and attribute possessed by the object lump 2, and, therefore, the worker is capable of simply executing the target work of the worker's own. Accordingly, the worker is, even if the worker does not know which file the software for performing the work exists in, capable of searching the object and carrying out the target work.

(b) According to the present invention, the work is done based on the processing unit of the object lump 2 and by transferring and receiving the message with the designation of the name of the object lump 2. It is possible to flexibly perform the work in accordance with the content of the work by selecting the object lump adapted to the necessary item of the work.

Further, according to the present invention, the objects can be allocated and employed even if the object lump to be used has the same name by giving the using condition of the object lump. In conformity with the working condition, the lump of the objects having the same object name can be effectively used. The works are grouped, thereby making it possible to actualize the enhancement of the performance of each work and the effective utilization of resources.

Moreover, if the condition is not matched even when the objects have the same name, the processing is entrusted to the exceptional process, thereby simplifying the structure possessed by the object lump. An error due to the operation can be prevented, and the reliability is improved.

(c) According to the present invention, the plurality of object lumps 2 are prepared on the processing unit of the object lump 2, and the processing is carried out in accordance with the name of the object lump 2. Besides, the object lump 2 bears the closed attribute inheritance relationship, and, because of the inheritance relationship being variable, the shared resources are effectively shared, whereby the work can be speeded up.

Further, according to the present invention, the work is proceeded by transferring and receiving the messages between the object lumps having the closed attribute inheritance relationship, and the allocation to the hardware is done on the object lump basis. Accordingly, the parallel processing, the speed-up and the enhancement of performance are attained.

(d) Also, according to the present invention, including the network environment, the multimedia in the form of the voices, the moving pictures and the still pictures can be used as part of the control, and hence it is possible to perform not only the character-only messages transfer and receipt but also the voice-assisted object transfer and receipt.

(e) Moreover, according to the present invention, when the database is used, the data and the procedure can be operated in the closed form as one object, and, therefore, the linkage to other database can be simply attained without effecting any object-assimilated replacement. Additionally, according to the present invention, when the database is used, the plurality of object lumps are capable of retrieving the data while transferring and receiving the messages to and from each other.

Accordingly, as the database, there is no necessity for forcibly allocating unified interfaces for the transferring/receiving processes. Since the objects have the inheritance relationship within the object lump 2, the object lumps can be functionally disposed for a variety of interfaces. When linked to the database, the using side carries out the processing through the same interface, and it is therefore possible to attain the effective utilization of the resources, the decrease in the price and the enhancement of performance.

Further, according to the present invention, the messages are transferred and received with the object lump closed structure. In the case of retrieving the data, the different retrieval mechanism can be thereby used by transferring and receiving one unified item of data, and the retrieval mechanism for the exclusive use can be also actualized by transferring and receiving the unified data. Accordingly, it is feasible to attain the rationalized work, the reduction in the price, the enhancement of performance and the effective utilization of the resources.

(f) Moreover, according to the present invention, including the space operating as a server in the network and the multi-processors, that space is usable as one address space.

Further, the memory space suspending above the network and the multiprocessor is usable as one consecutive address space. That address space is set as one consecutive address space with the object lumps, and a plurality of aggregated consecutive address spaces are prepared. Executed are the transferring/receiving processes of the messages between the plurality of aggregated consecutive address spaces.

Accordingly, the plurality of work stations and personal computers can be employed as one computer. It is feasible to attain the effective utilization of resources, the reduction in the price and the enhancement of performance. Besides, even when the object lump can not be operated by only a specified machine, the variety of CPUs are capable of operating the intrinsic object lumps as operating them in one space. Hence, it is possible to attain the effective utilization of resources, the enhancement of reliability and the improvement of efficiency.

(g) According to the present invention, including the operation in the statically inherited relationship, the object lump 2 is operable as one agent.

Further, according to the present invention, the parallel processing can be done while shifting and copying the object lumps, and, hence, there can be conducted a processing assignment (agent-oriented process of controlling a partial function group as one lump) on the basis of the working load. The works can be allocated in consideration of the loads employed by the CPU, the work station and the personal computer, and it is therefore possible to attain the rationalization, the speed-up and efficiency improvement of the work.

(h) In the present invention, only the user who is permitted to use according to the version, the function, the security and the working step performs the work by transferring and receiving the message to and from the object lump 2. Accordingly, it is feasible to effectively utilize the resources and unify the management.

(i) Further, according to the present invention, the format of the document data and a part of document contents are inherited as differences, and this item of data is treated as one object lump. Hence, only the necessary portions can be added, changed and deleted in accordance with the attribute inheritance relationship, and this is available for creating the document exclusive of the application. This in turn makes it possible to improve both the creation of the document and the working efficiency through the effective management, etc. of the document and enhance the reliability.

(j) According to the present invention, in the real-time working also, the plurality of object lumps 2 are provided and classified into the sharable lumps and the lumps solely for the respective control, and therefore the messages can be transferred and received between those lumps.

It is apparent that, in this invention, a wide range of different working modes can be formed based on the invention without deviating from the spirit and scope of the invention. This invention is not restricted by its specific working modes except being limited by the appended claims.

What is claimed is:

1. An object data processing apparatus comprising:
   an I/O device;
   partial object processing means for carrying out data processing by executing transferring/receiving processes of messages between a plurality of object lumps, each object lump formed of a plurality of objects having a data structure including a pointer to a parent object, if present, of each object; managing a structure of the plurality of objects in accordance with the data structure, whereby an inheritance relationship of an attribute possessed by the plurality of objects is closed in each other lump; and for executing the transferring/receiving processes of the messages only between each object lump of said plurality of object lumps and said I/O device such that the objects in an object lump do not pass messages between themselves;
   partial object I/O means for interfacing with said I/O device; and
   partial object control means for controlling said partial object processing means and controlling communication between said partial object processing means and said partial object I/O means.

2. An object data processing apparatus according to claim 1, wherein the objects in each of said object lumps are formed only of data.

3. An object data processing apparatus according to claim 1, wherein the objects in each of said object lumps has a class of an object aggregation.

4. An object data processing apparatus according to claim 3, wherein the objects in each of said object lumps has a group of a class aggregation.

5. An object data processing apparatus according to claim 1, wherein said object lump includes one message I/O means used as a message I/O port.

6. An object data processing apparatus according to claim 1, wherein said object lump includes a plurality of message I/O means used as a plurality of message I/O ports in accordance with a configuration of object.

7. An object data processing apparatus according to claim 1, wherein said object lump includes one exceptional message I/O means used as an exceptional process message I/O port for performing an exceptional process.

8. An object data processing apparatus according to claim 1, wherein said object lump includes a plurality of exceptional message I/O means used as a plurality of exceptional process message I/O ports for performing exceptional processes in accordance with exceptional events.

9. An object data processing apparatus according to claim 1, further comprising:

exceptional process executing means for executing an exceptional process of an object operation separately from said partial object processing means.

10. An object data processing apparatus according to claim 1, wherein said partial object processing means has one or more object lumps for executing an exceptional process of an object operation.

11. An object data processing apparatus according to claim 1, wherein one of said object lumps includes memory means for storing object data processed by objects constituting the object lump.

12. An object data processing apparatus according to claim 11, wherein one of said object lumps includes referring means for an exclusive use for executing a referring process to said memory means.

13. An object data processing apparatus according to claim 1, wherein said partial object processing means has another object lump including memory means for managing and storing object data possessed by objects constituting said object lump.

14. An object data processing apparatus according to claim 13, wherein said another object lump for managing the object data includes referring means, called directly from outside, for an exclusive for executing a referring process to said memory means for storing the object data.

15. An object data processing apparatus according to claim 1, wherein one of said object lumps includes:

managing means for managing a protect attribute described while being made corresponding to a using schedule of said object lump; and determining means for determining whether a protect attribute designated from outside is identical with the project attribute managed by said managing means, said object lump executes, if the protect attribute designated from outside is identical with the protect attribute managed by said managing means, a process designated by the message.

16. An object data processing apparatus according to claim 1, wherein one of said object lumps includes:

managing means for a level and a version of said object lump; and determining means for determining whether a level and a version that are designated from outside are identical with the level and the version that are managed by said managing means, said object lump executes, if the level and the version that are designated from outside are identical with the level and the version that are managed by said managing means, a process designated by the message.

17. An object data processing apparatus according to claim 1, wherein one of said object lumps includes:

managing means for managing an identifier and a password that are allocated to said object lump; and determining means for determining whether an identifier and a password that are designated from outside are identical with the identifier and the password that are managed by said managing means, said object lump executes, if the identifier and the password that are designated from outside are identical with the identifier and the password that are managed by said managing means, a process designated by the message.

18. An object data processing apparatus according to claim 1, wherein one of said object lumps includes:

managing means for managing a priority for indicating a priority of using said object lump; and determining means for determining whether a priority designated from outside is identical with the priority managed by said managing means, said object lump executes, if the priority designated from outside is identical with the priority managed by said managing means, a process designated by the message.

19. An object data processing apparatus comprising:

a plurality of objects divided into object lumps, each object lump having a data structure including a pointer to a parent object, if present, of each object, and wherein an inheritance relationship of an attribute possessed by the plurality of objects is closed in each object lump, such that objects required for data processing are in the same object lump and wherein the objects in an object lump do not pass messages between other objects in the object lump; and a plurality of processors for executing said objects needed for the data processing, wherein each of said plurality of processors executes the data processing on an execution unit of said object lump.

20. A computer program embodied on a computer readable storage medium, said computer program comprising the functions of:

forming object lumps from a plurality of objects having a data structure including a pointer to an parent object, if present, of each object to form a structure of the plurality of objects in accordance with the data structure, whereby an inheritance relationship of an attribute possessed by the plurality of objects is closed in each object lump;

causing the computer to carry out data processing on object data by executing transferring/receiving processes of messages between a plurality of object lumps; and executing the transferring/receiving processes of messages only between each object lump in the plurality of object lumps and a I/O device such that the objects in an object lump do not pass messages between themselves.

* * * * *

UNITED STATES PATENT AND TRADEMARK OFFICE
CERTIFICATE OF CORRECTION

PATENT NO. : 5,819,279
DATED : October 6, 1998
INVENTOR(S) : Togawa

It is certified that error appears in the above-identified patent and that said Letters Patent is hereby corrected as shown below:

Col. 25, line 60, change "prot" to --protect attribute memory unit 36--.

line 62, delete "If the pre memory unit 36."

Signed and Sealed this

Sixteenth Day of March, 1999

Attest:

Q. TODD DICKINSON

Attesting Officer     Acting Commissioner of Patents and Trademarks